(12) United States Patent
Michael

(10) Patent No.: US 8,350,663 B1
(45) Date of Patent: Jan. 8, 2013

(54) ROTARY SWITCHABLE MULTI-CORE ELEMENT PERMANENT MAGNET-BASED APPARATUS

(75) Inventor: Jim G Michael, Parker, CO (US)

(73) Assignee: Creative Engineering Solutions, Inc., Parker, CO (US)

( * ) Notice: Subject to any disclaimer, the term of this patent is extended or adjusted under 35 U.S.C. 154(b) by 0 days.

(21) Appl. No.: 13/313,315

(22) Filed: Dec. 7, 2011

(51) Int. Cl.
  *H01F 7/02* (2006.01)
  *H01F 7/04* (2006.01)

(52) U.S. Cl. ........ 338/288; 335/287; 335/295; 335/302; 335/306; 29/607

(58) Field of Classification Search .......... 335/285–295, 335/302–306; 29/607
See application file for complete search history.

(56) References Cited

U.S. PATENT DOCUMENTS

| | | | |
|---|---|---|---|
| 2,287,286 A | 6/1942 | Bing et al. | |
| 4,055,824 A | 10/1977 | Baermann | |
| 4,251,791 A | 2/1981 | Yanagisawa et al. | |
| 4,329,673 A | 5/1982 | Uchikune et al. | |
| 5,266,914 A | 11/1993 | Dickson et al. | |
| 6,084,494 A * | 7/2000 | Chew et al. | 335/283 |
| 6,331,810 B1 * | 12/2001 | Jung | 335/288 |
| 7,009,480 B2 * | 3/2006 | Tsui et al. | 335/287 |
| 7,012,495 B2 | 3/2006 | Underwood et al. | |
| 7,161,451 B2 | 1/2007 | Shen | |
| 8,183,965 B2 * | 5/2012 | Michael | 335/288 |
| 2009/0027149 A1 | 1/2009 | Kocijan | |

* cited by examiner

*Primary Examiner* — Bernard Rojas
(74) *Attorney, Agent, or Firm* — Christopher A. Taravella

(57) ABSTRACT

A method for creating and a device for a rotary switchable multi-core element, permanent magnet-based apparatus, for holding or lifting a target, comprised of two or more carrier platters, each containing a plurality of complementary first and second core elements. Each core element comprises permanent magnet(s) with magnetically matched soft steel pole conduits attached to the north and south poles of the magnet (s). Core elements are oriented within adjacent carrier platters such that relative rotation allows for alignment in-phase or out-of-phase of the magnetic north and south fields within the pole conduits. Aligning a first core element "in-phase" with a second core element, that is, north-north/south-south, activates that core element pair, allowing the combined magnetic fields of the pole conduits to be directed into a target. Aligning the core element pair "out-of-phase," that is, north-south/south-north, deactivates that core element pair by containing opposing fields within the pole conduits.

13 Claims, 40 Drawing Sheets

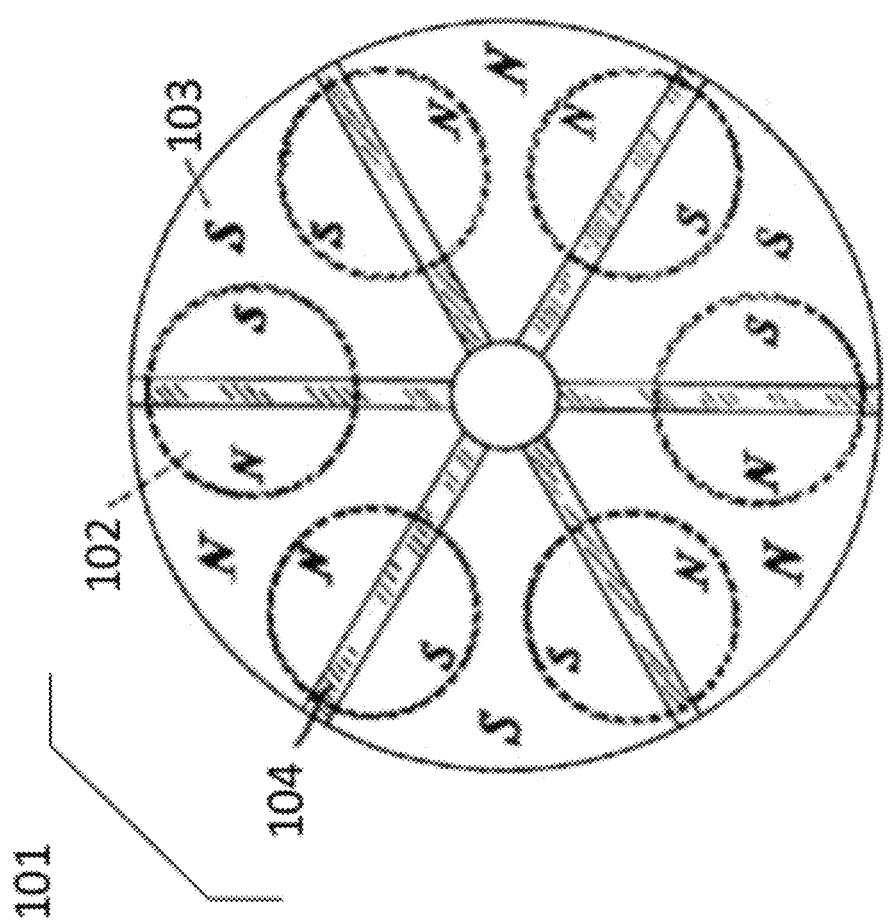

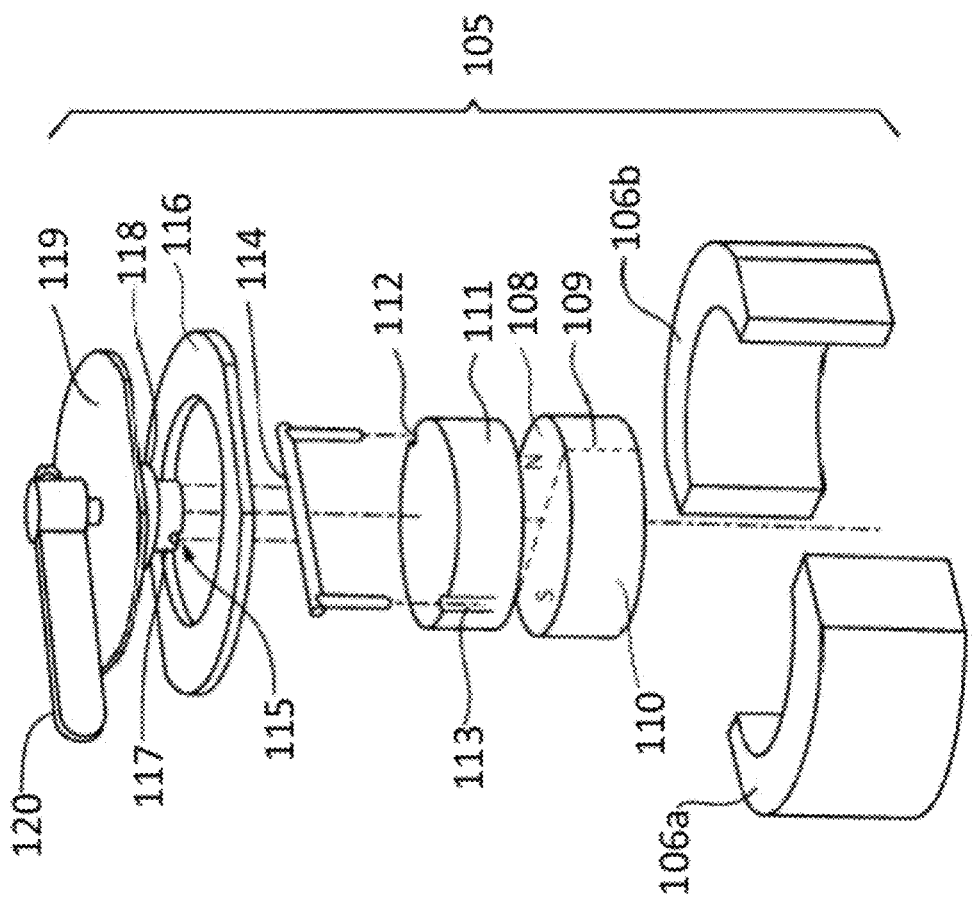
Fig. 2A – Prior Art

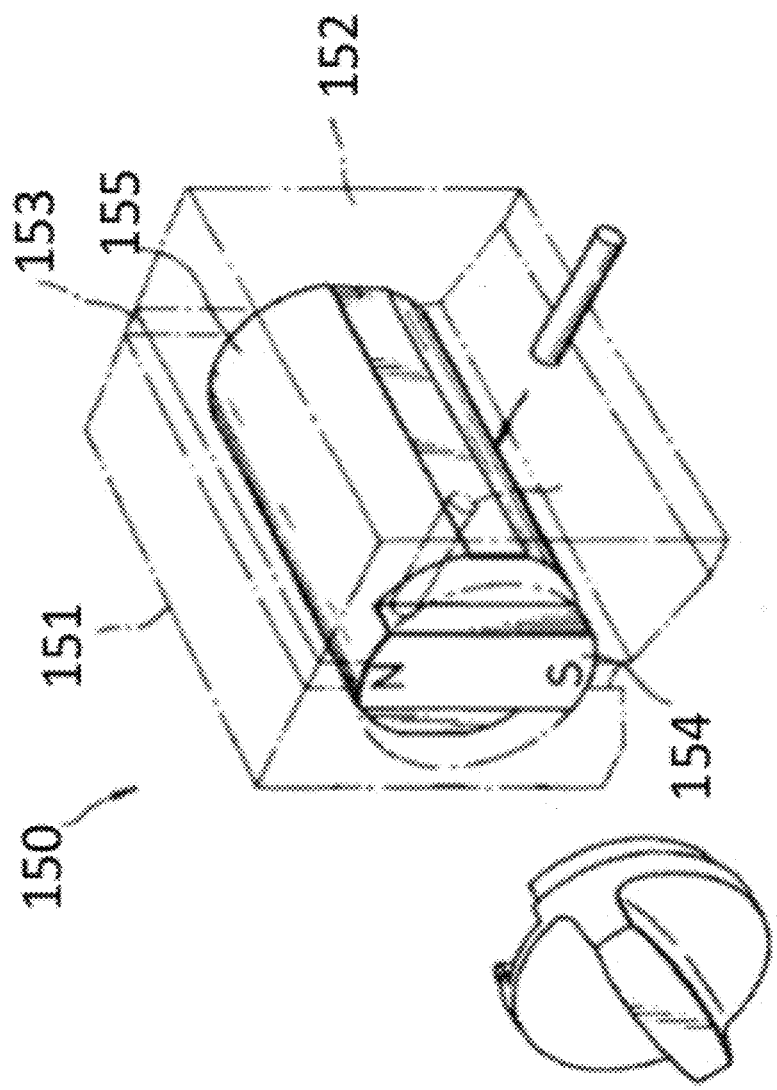
Fig. 3 - Prior Art

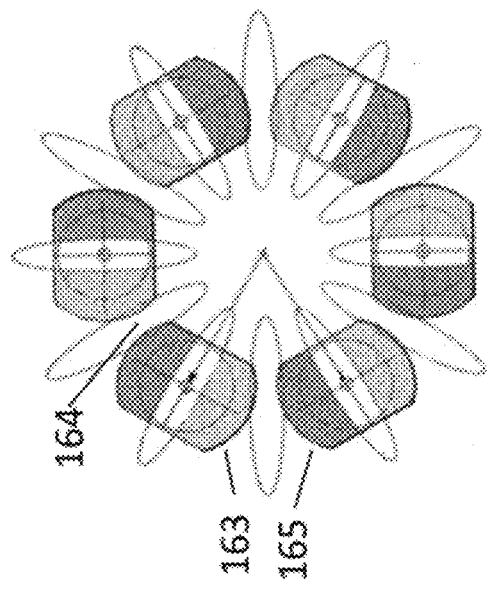
Fig. 4B – Prior Art
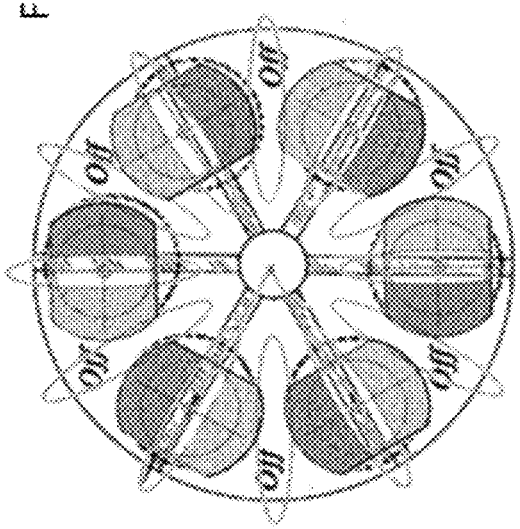
Fig. 4C – Prior Art
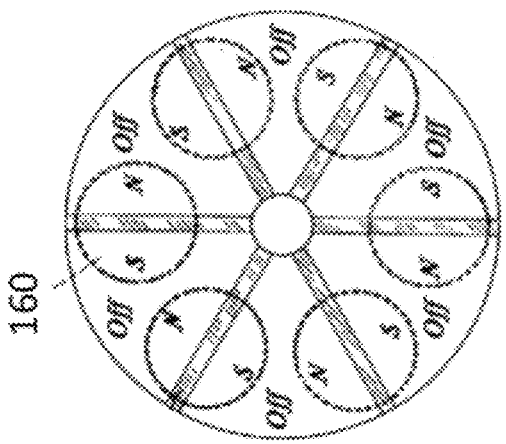
Fig. 4A – Prior Art

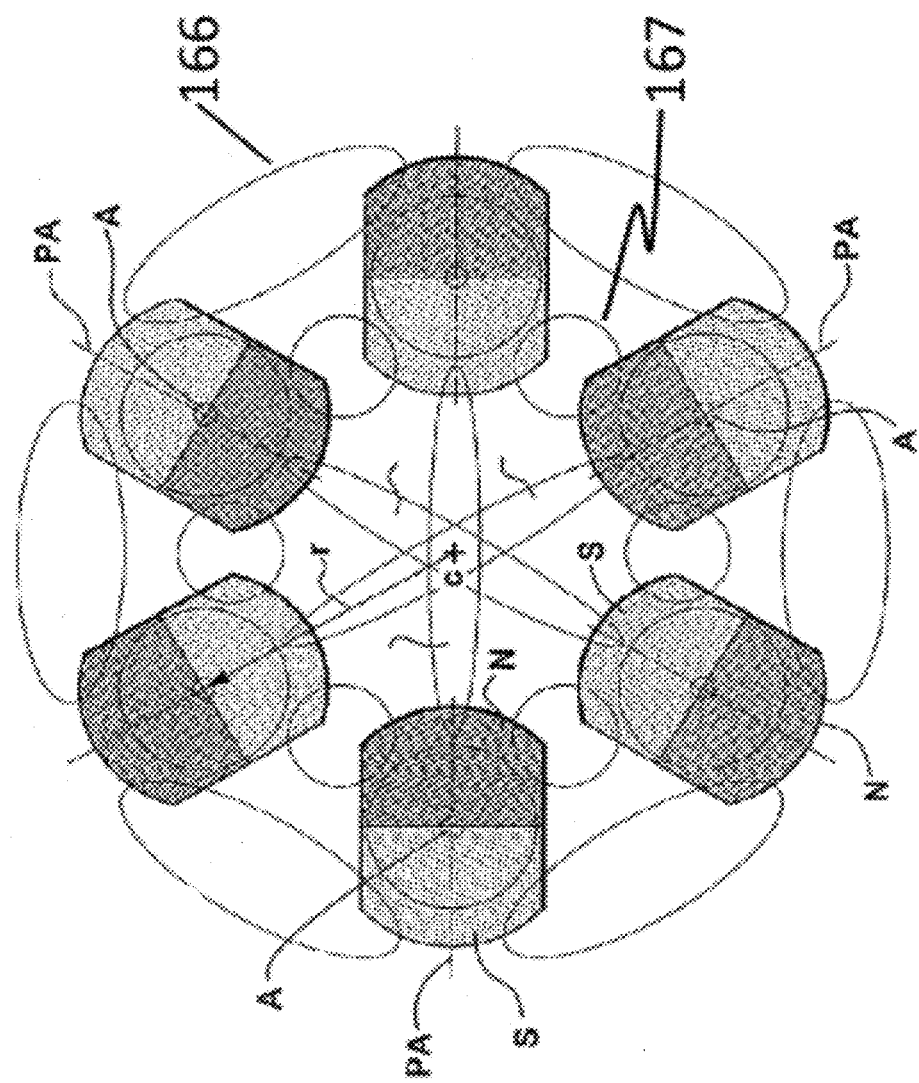
Fig. 5 – Prior Art

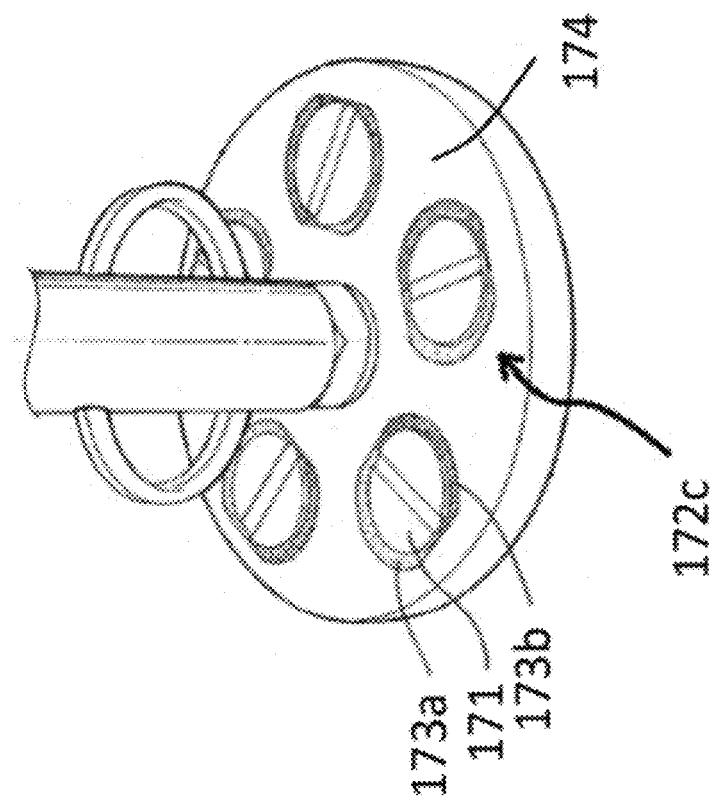
Fig. 6B - Prior Art
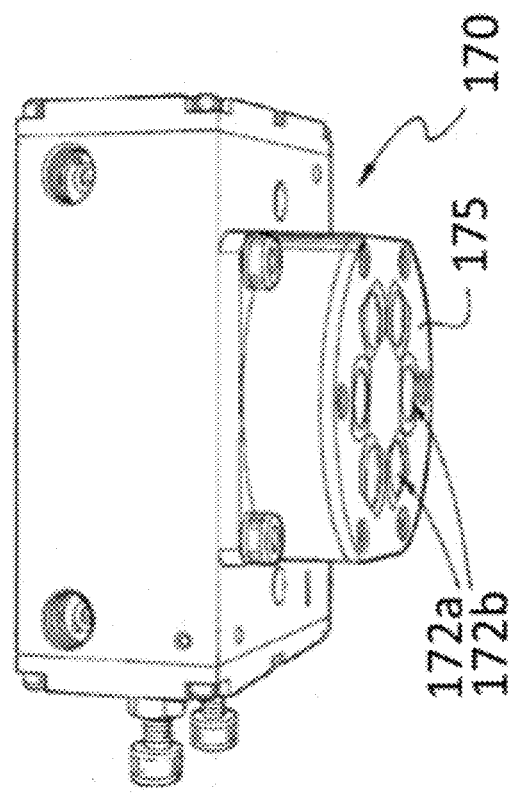
Fig. 6A - Prior Art

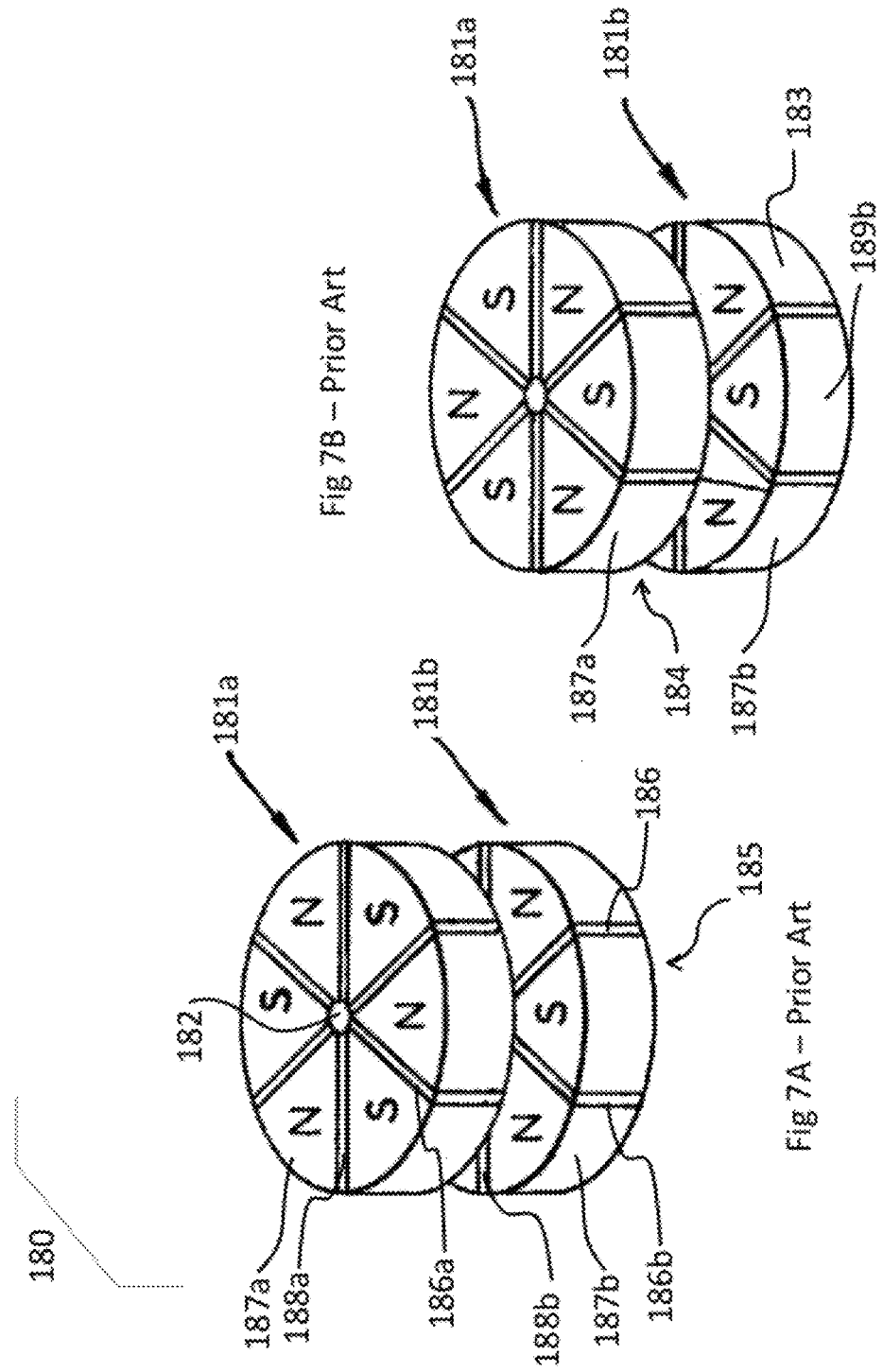

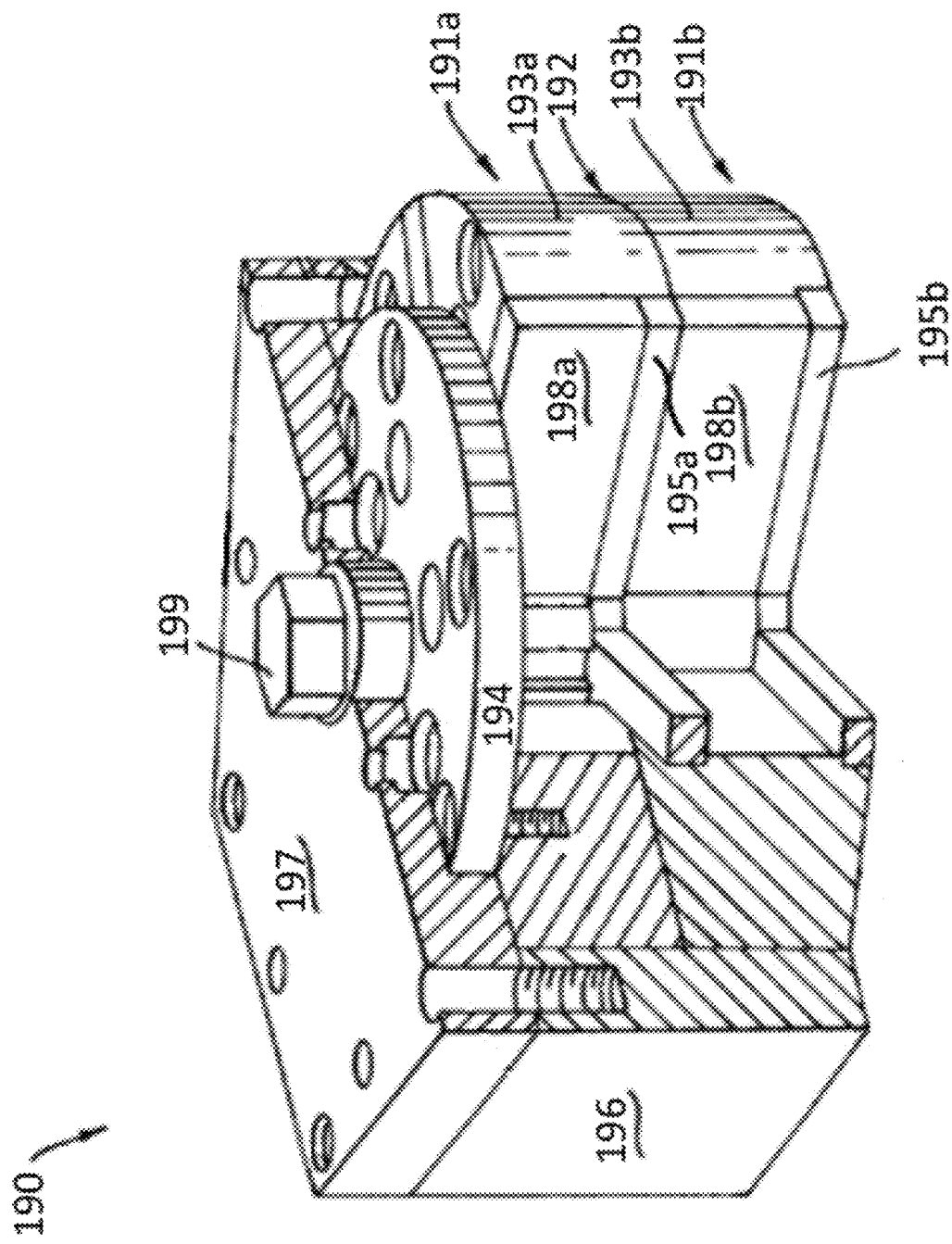
Fig. 8 – Prior Art

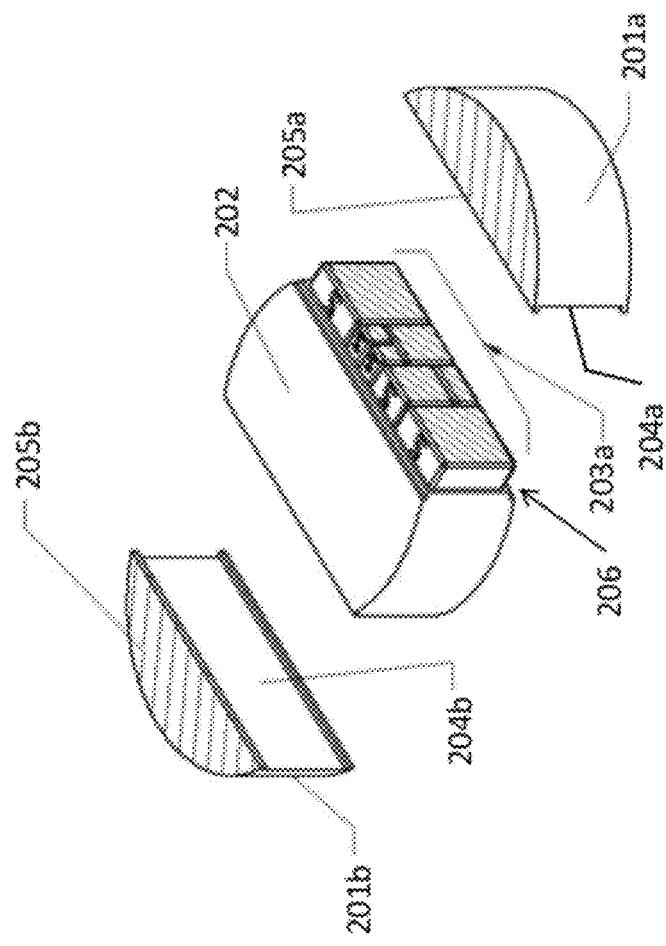
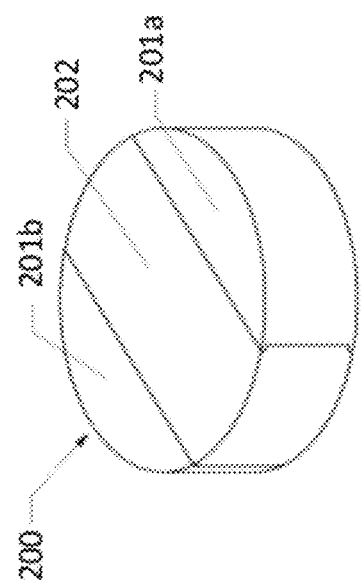
Fig. 9B
Fig. 9A

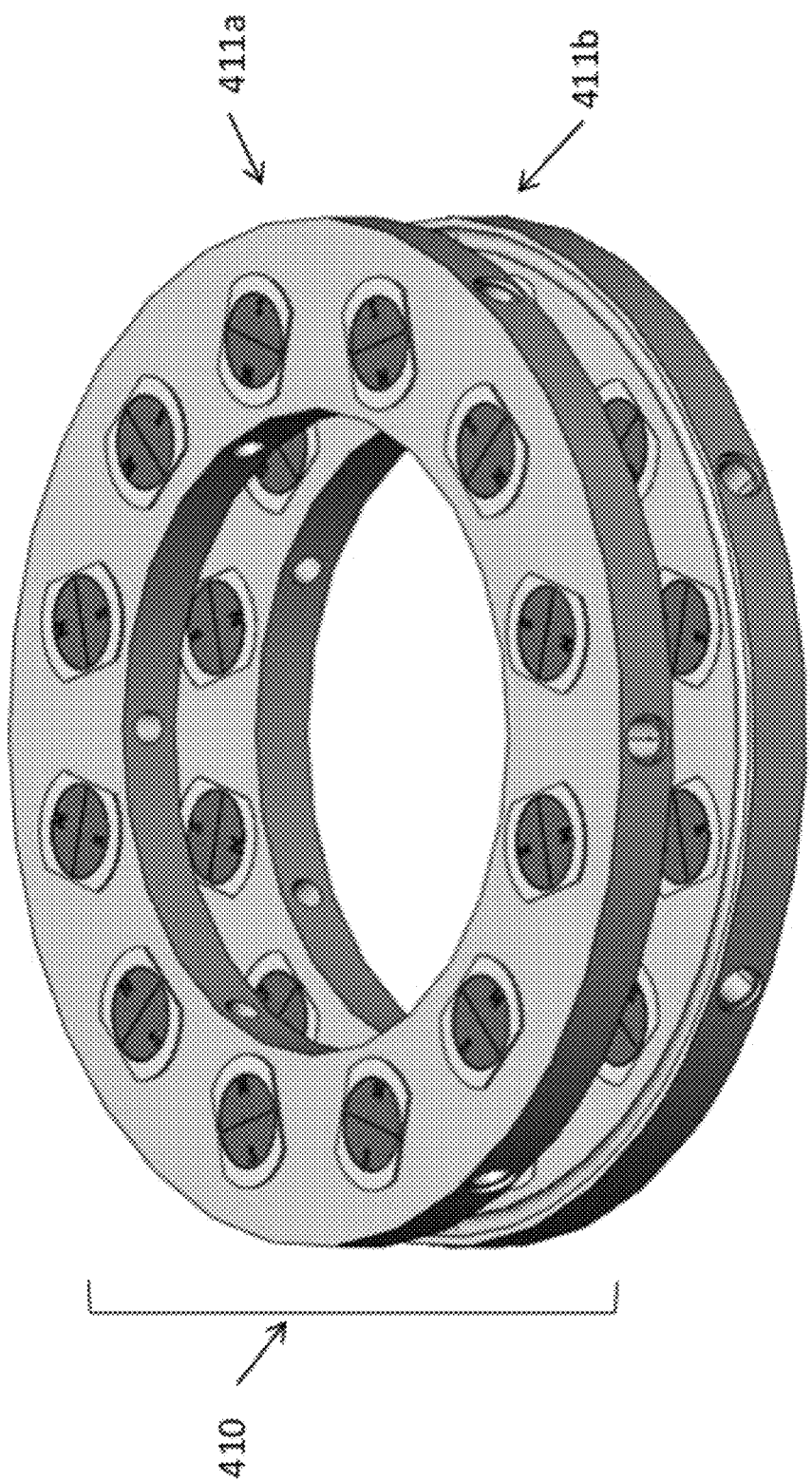

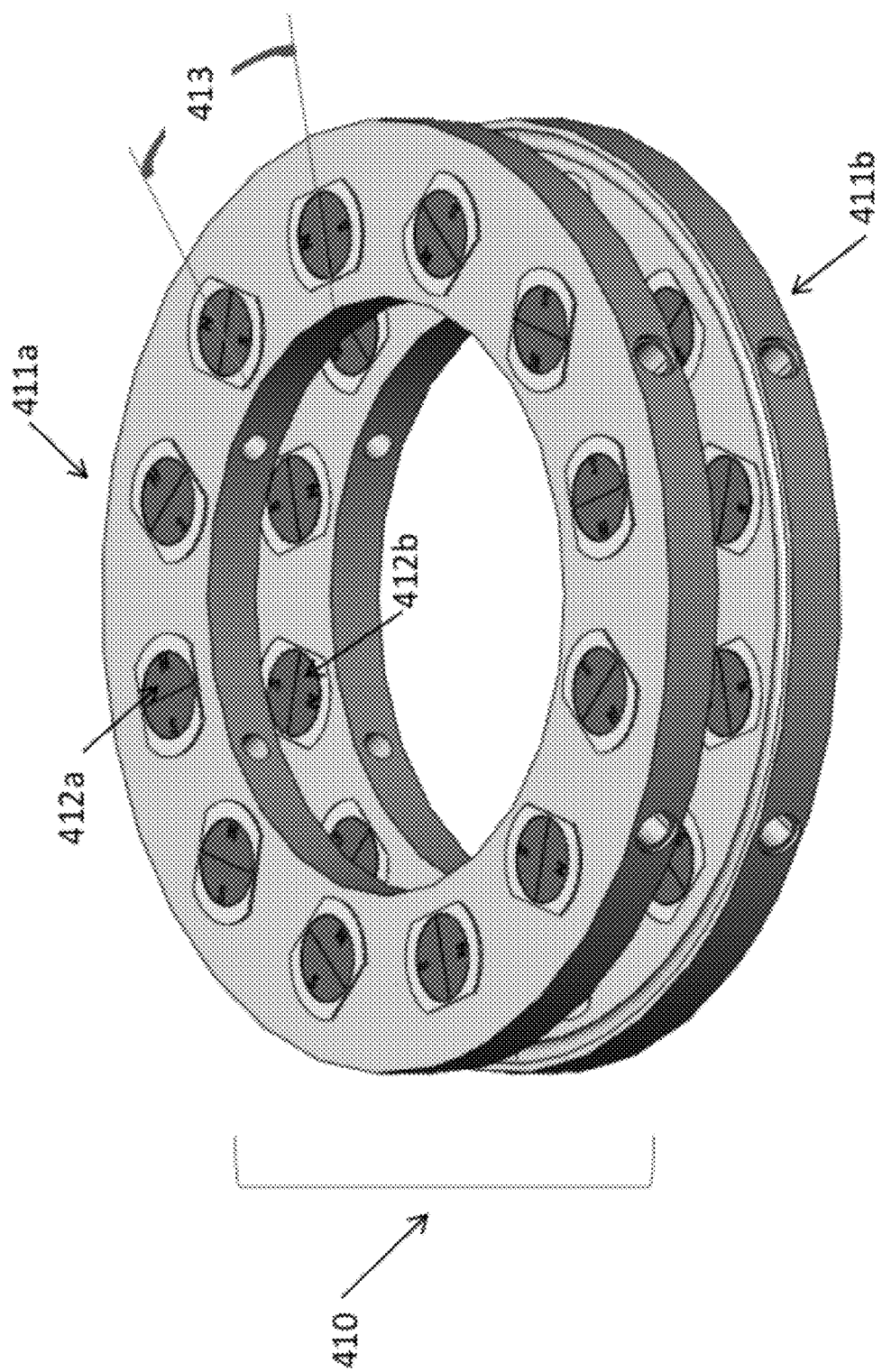

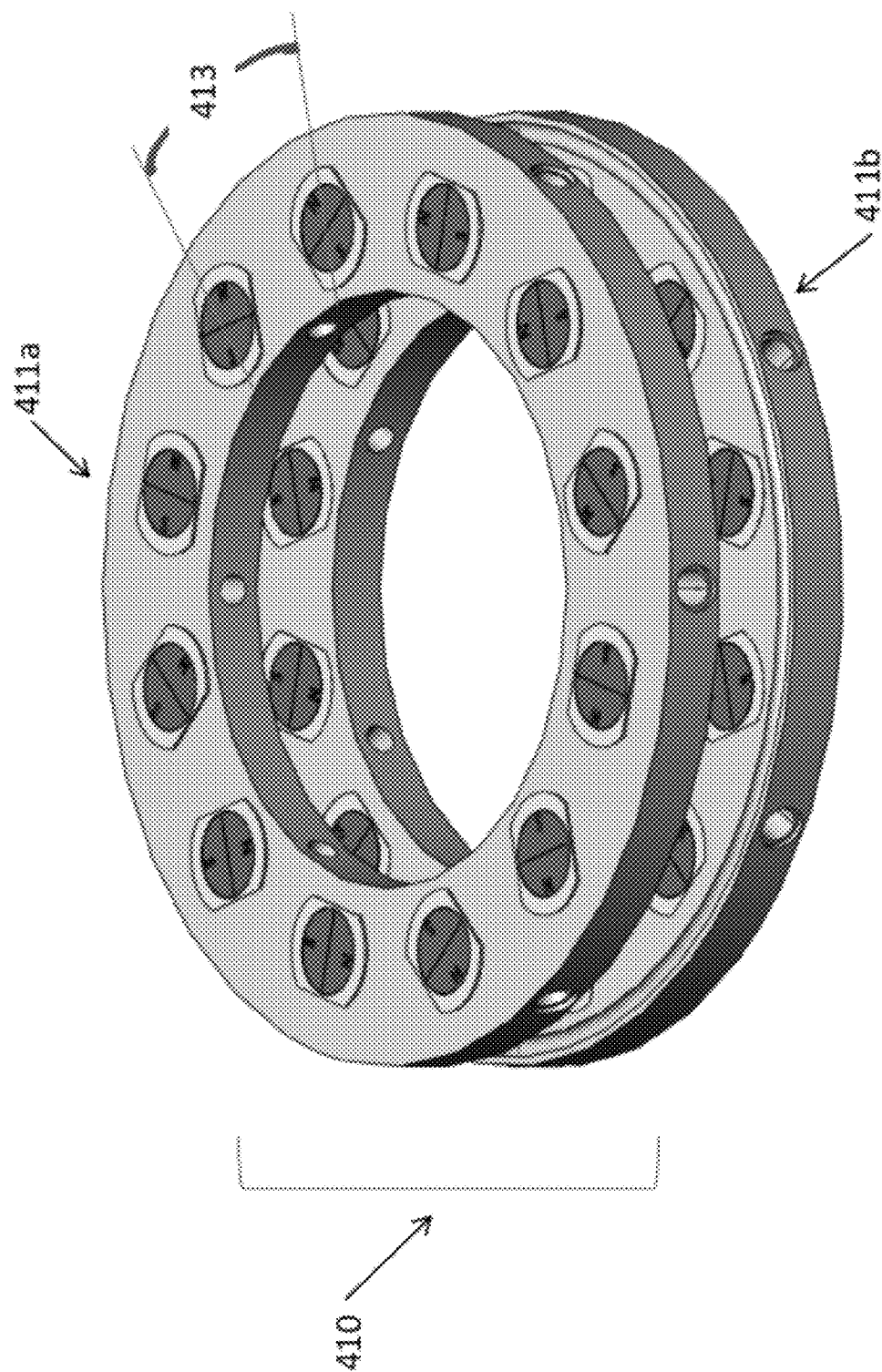

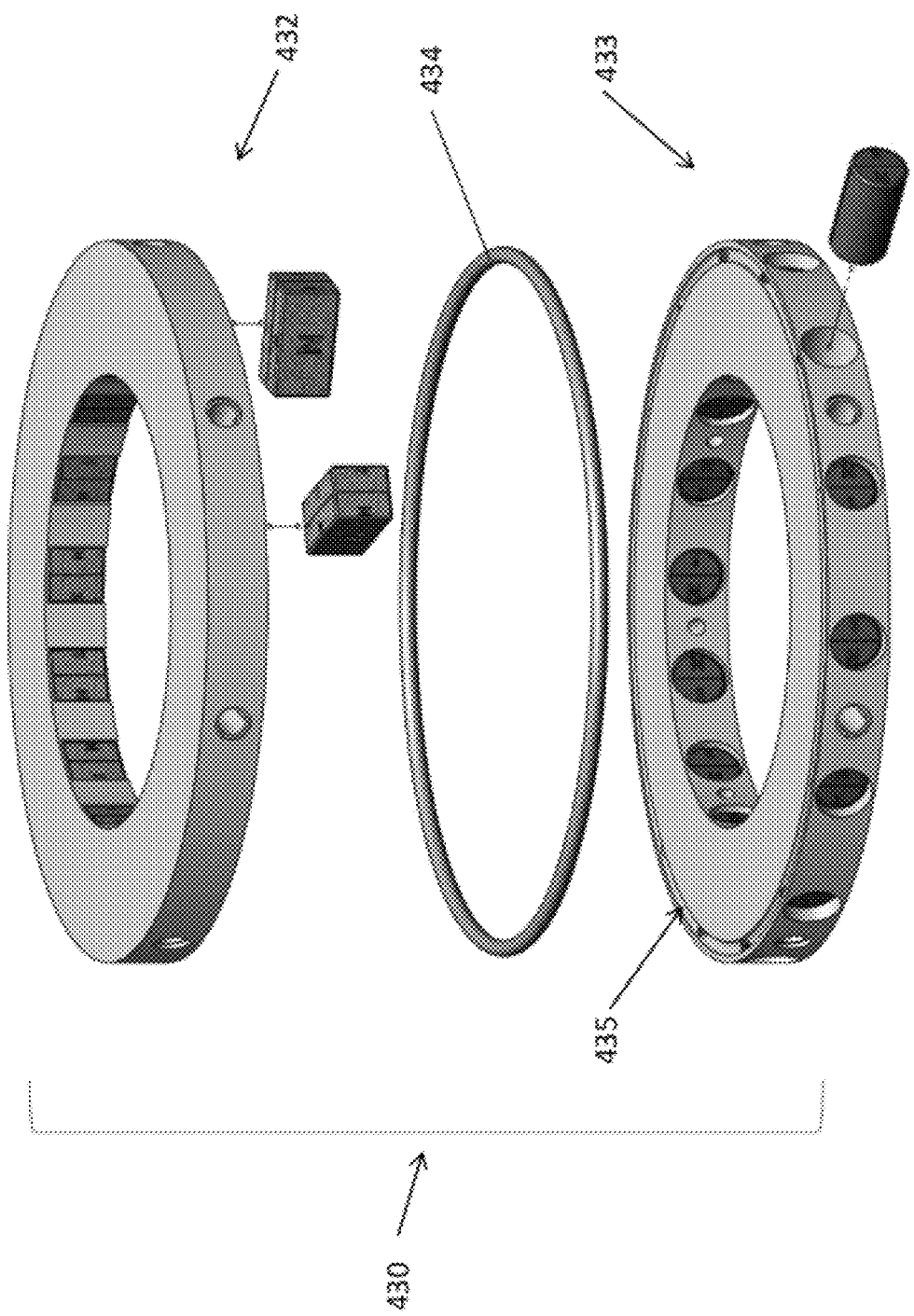

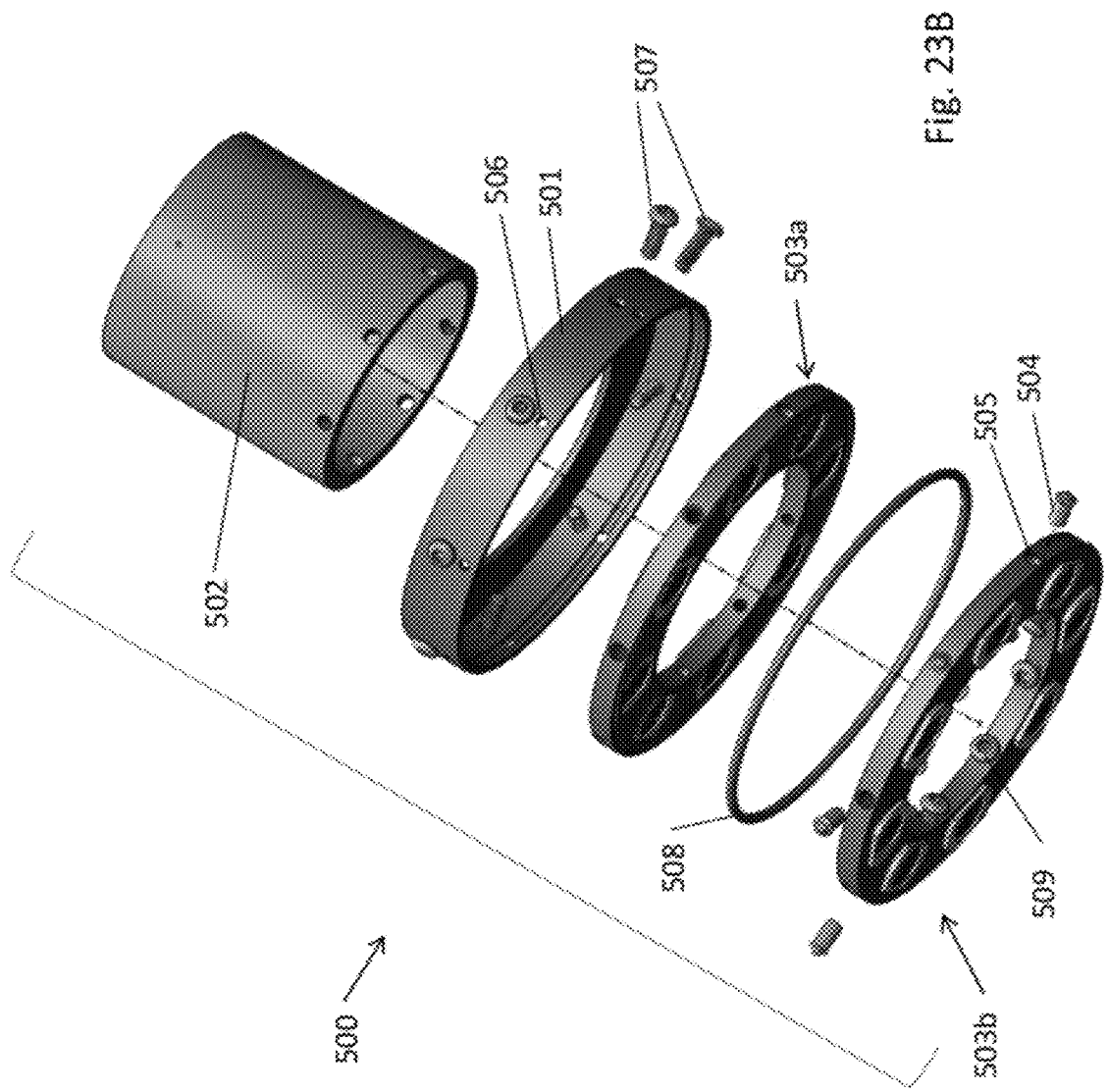

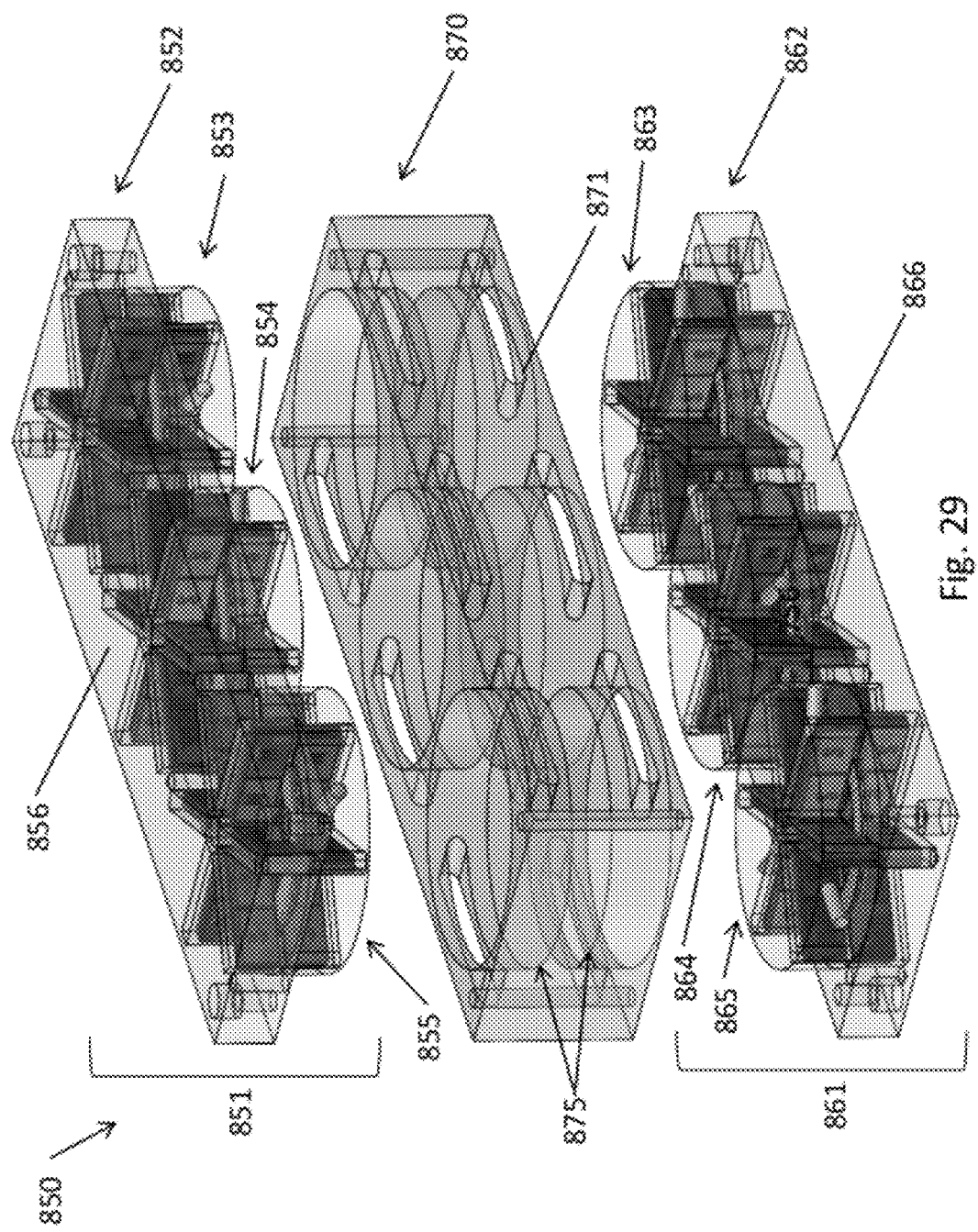

ROTARY SWITCHABLE MULTI-CORE ELEMENT PERMANENT MAGNET-BASED APPARATUS

FIELD OF THE INVENTION

Manually actuated magnetic fields in permanent magnet chucks, holders and lifting devices have been used for decades on ferromagnetic materials (targets). Common applications are seen on mills, grinders, lathes, drills, and other industrial and commercial equipment. Other applications include fixtures, tool and gauge holders, material alignment, and holding fixtures. Various magnet-based lifters are used for material handling and robotic pick-and-place equipment. Unfortunately, the majority of switchable permanent magnet arrays are expensive, difficult to manufacture, structurally weak, or relatively heavy. Consequently, use of switchable permanent magnet arrays is quite limited in commercial and retail markets. Prohibitive costs present a substantial barrier for integrating the switchable permanent magnet arrays into end user products. Attempts have been made to use these devices in automated fixtures and hoist applications, but the cost and difficulty to automate the actuation prevent real product acceptance. Efforts to develop switchable permanent magnet arrays for robotic holding have run into issues with excessive field depth, reliability of mechanically actuating multiple gears and inflexible magnetic performance that could not provide the desired target holding performance needed to cover a desired range of material thickness, shapes and sizes, along with actuation torque issues.

Permanent magnets produce their own magnetic fields. Permanent magnets have both a north ("N") and a south ("S") pole. By definition, the direction of the local magnetic field is the direction that the north pole of a compass (or of any magnet) tends to point. Magnetic field lines exit a magnet near its north pole and enter near its south pole. Inside the magnet, the field lines return from the south pole back to the north pole. The "magnetic pole separation line" is used to depict a theoretical plane between the north and south poles of the permanent magnet. Permanent magnets are made of ferromagnetic materials such as iron and nickel that have been magnetized. The strength of a magnet is represented by its magnetic moment ("M"). For simple magnets, M points in the direction of a line drawn from the south to the north pole of the magnet. "Like" magnetic poles repel when brought near each other (for example, N and N or S and S), while "opposite" magnetic poles attract (for example, N and S).

All permanent magnets and materials that are strongly attracted to them are ferromagnetic. When the magnetic moment of atoms within a given material can be made to favor one direction, they are said to be "magnetizable." Ferromagnetism is the basic mechanism by which certain materials form or exhibit strong interactions with magnets.

A material that is magnetically soft is similar to permanent magnets in that it exhibits a magnetic field of its own when in the influence of an external magnetic field. However, the material does not continue to exhibit a magnetic field once the applied field is reduced to zero. Such materials act as a "conduit" carrying, concentrating, and shaping magnetic fields.

Affixing a properly matched pole conduit (as described in the Detailed Description of the Invention) to each side of a permanent magnet's or magnets' magnetic poles defines a basic core element. Pole conduits contain and perpendicularly redirect a permanent magnet's north and south magnetic field to the upper and lower faces of the pole conduits. Each pole conduit affixed to the permanent magnet now contains the magnetic field and pole direction of the permanent magnet so that one pole conduit of the core element contains the permanent magnet's north field and the other pole conduit contains the permanent magnet's south field.

By containing and redirecting the magnetic field within the pole conduits, like poles have a simultaneous level of attraction and repulsion. Relative positioning of an upper core element with an adjacent lower core element defines a core element pair. Two or more core element pairs are critical for proper operation of the apparatus. Aligning upper core elements pole conduits with lower core elements pole conduits "in-phase," that is, north-north/south-south (N-N/S-S), activates the core element pair by making the combined magnetic fields of the adjacent pole conduits available to attract a target. Aligning an upper and lower core element pair "out-of-phase," that is, north-south/south-north (N-S/S-N), results in the adjacent pole conduits containing opposing fields and deactivating the core element pair. In this disclosure, "deactivation" refers to a substantial cancellation of the magnetic field emanating from the work surface.

A core element must function as a single entity and may require containment of its separate components into a "core element housing" in order to facilitate the relative positioning of two or more core elements with respect to each other.

DETAILED DESCRIPTION OF THE INVENTION

Ferromagnetic materials like iron that show saturation are composed of magnetic domains in microscopic regions that act like tiny permanent magnets. Before an external magnetic field is applied to the material, the magnetic domains are oriented in random directions and thus cancel each other out. When an external magnetizing field "H" is applied to the material, it penetrates the material and aligns the domains, causing their tiny magnetic fields to turn and align parallel to the external field, adding together to create a large magnetic field which extends out from the material. This is called "magnetization" (the stronger the external magnetic field, the more the domains align). Saturation occurs when practically all of the magnetic domains are aligned, so that further increases in the applied field cannot cause further alignment of the magnetic domains.

Target saturation is very similar to magnetic saturation in that once all of the magnetic domains in the target material directly under the pole conduit or magnet are saturated, any excess magnetic field cannot be absorbed. If a switchable permanent magnet produces a field in excess of what a target can absorb, the excess magnetic field will result in an increased actuation force. Actuation force is the force required to overcome the magnetic resistance between two or more adjacent upper and lower core elements when orienting one core element with respect to the adjacent core element so as to be aligned in-phase (N-N/S-S). This excess magnetic field must be overcome when rotating adjacent upper and lower carrier platters in-phase. Actuation force to align core element pairs can be ten times greater in air or on a very thin target than when on a target that does not fully saturate, that is, one that does not absorb the entire magnetic field.

Breakaway force is the force required to separate a magnet perpendicularly from a target. Most magnets are tested on a target with sufficient thickness to avoid oversaturation in the area directly under the pole or poles. Since the breakaway strength is primarily a function of the pole conduit area and the saturation of the material, it is the material and not the magnetic field that determines the breakaway force once a target thickness has become saturated. For example a magnet that has a breakaway force of 100N (Newtons) on material 25 mm in thickness may also have a breakaway force of 100N on material 12 mm in thickness, but the breakaway force may drop to 70N on material 6 mm in thickness and 10N on material 2 mm in thickness.

Magnetic permeability (dimensionless as it is relative to magnetic permeability of a vacuum or air) can often be considered as magnetic conductivity. There are essentially four categories of magnetically permeable substances: (1) Substances whose magnetic permeability is less than one are said to be diamagnetic. These substances to a very small extent produce an opposing magnetic field in response to a strong magnetic field. Because this response is often extremely weak, most non-physicists would consider diamagnetic substances to be nonmagnetic; (2) Substances whose magnetic permeability is exactly one (1.00) are said to be nonmagnetic. Air or a vacuum has a magnetic permeability of one; (3) Substances with a magnetic permeability greater than one are said to be paramagnetic; and (4) Substances with a magnetic permeability much greater than one (100 to 100,000) are said to be ferromagnetic. This invention primarily deals with targets that are ferromagnetic.

Phase alignment occurs when two or more core elements' pole conduits in a lower platter are aligned and effectively adjacent to the same number of core elements' pole conduits in an upper platter. For example, referring to FIG. 19, first core element 403a and second core element 403b are aligned out-of-phase when the first north pole conduit 405a of the upper core element is directly above second south pole conduit 404b of the lower core element and the first south pole conduit 404a of the upper core element is directly above second north pole conduit 405b of the lower core element.

Conversely, core elements are aligned in-phase when first north pole conduit 405a of the first core element 403a is directly above second north pole conduit 406b of the lower core element and first south pole conduit 404a of the first core element 403a is directly above second south pole conduit 407b of the second core element 403b. In-phase alignment of core elements results in a repulsive force between the pole conduits (magnetic repulsion) in addition to a moderately strong external magnetic field. Out-of-phase alignment of core elements results in a strong attractive force (magnetic coupling) between the pole conduits along with very little external magnetic field.

As previously illustrated, aligning or placing one core element in-phase with another core element activates (or actuates) a very strong external magnetic field, provided by an in-phase "magnetic coupling" between the pole conduits that have a simultaneous attractive and repulsive force. Core elements that are aligned out-of-phase also provide a "magnetic coupling," This out-of-phase "magnetic coupling" provides a very strong attractive force between the adjacent pole conduits with little or no external magnetic field; that is, the external magnetic field is deactivated or de-actuated. In-phase core elements in contact with an unsaturated ferromagnetic target have a mildly attractive force between the core elements.

Magnetic field lines provide a simple way to depict or draw the magnetic field. The magnetic field can be estimated at any point using the direction and density of the field lines nearby: Typically the stronger the magnetic field, the higher the density of the magnetic field lines. The magnetic field lines depicted in FIG. 25 provide a visible two-dimensional representation of a typical magnetic field. The "visible" field line depicted is not precisely the same as that of an isolated magnet. The introduction of metal filings alters the magnetic field by acting as a pole conduit and redirecting the magnetic field. While the filings are shown in a two-dimensional perspective, a three-dimensional field would look similar to an hourglass.

BACKGROUND

Prior Art

Many patents containing multiple magnets (now in the public domain) have the orientation of adjacent magnets in a north-south/north-south repetitive pattern, which is generally required to enable activation and deactivation of the devices. Examples of prior art often show a north-south/south-north soft iron pole orientation to maximize depth of field, as shown in U.S. Pat. No. 2,287,286 issued to J. Bing ET AL (1942) FIG. 1—Prior Art ("the '286 patent"), as well as the newer apparatus such as U.S. Pat. No. 7,161,451 B2 submitted by Shen (2007) FIGS. 7A and 7B ("the '451 patent"). Configurations between adjacent magnets with an alternating north-south/south-north orientation should be avoided with the exception of those having space or actuation angle constraints when using core elements in nonferrous platters. In those cases, efforts should be taken to minimize interaction between adjacent pole conduits to avoid damaging or impacting the available magnetic field.

U.S. Pat. No. 2,287,286 issued to J. Bing ET AL (1942) (FIG. 1—Prior Art) ("the '286 patent") identifies a switchable magnetic chuck 101 comprised of a plurality of soft iron sectors 103 attached to and extending axially from a nonmagnetic disk-shaped plate with said sectors being circumferentially spaced providing diametrically opposed gaps 104 extending throughout the length of said sectors. Diametrically polarized cylindrical shaped magnets 102 are positioned in openings within soft iron sectors 103 slightly larger than the cylindrical diameter of the magnets 102 to allow rotation of the diametrically polarized magnets within the apparatus. Orienting the magnets 102 such that each soft iron sector 103 contains either two north or two south magnetic poles activates the soft iron sector 103, making the combined magnetic field available to attract a ferrous target. Orienting the magnets such that each soft iron sector 103 contains a north and south magnetic pole deactivates the soft iron sector. This basic principle is used in most modern multi-magnet switchable magnet designs today.

U.S. Pat. No. 7,012,495 B2 issued to Kocijan (2006) (FIG. 2A—Prior Art) ("the '495 patent") identifies a switchable magnet configuration 105 comprised of a housing 106a and 106b that contains a first permanent magnet 109, a second permanent magnet 111, locating features 112 and 113, and actuation means (114,115,116,117,118,119 and 120) to cause relative rotation between the first and second magnets. The permanent magnets 109 and 111 are diametrically polarized such that the south pole 110 of the lower permanent magnet 109 is aligned with housing 106a and north pole 108 of the lower magnet is aligned with housing 106b. When compared to the single magnet version of the '286 patent, the primary difference is the use in the '495 patent of a second magnet for field cancellation rather than shunting of the fields. The relative rotation between the upper permanent magnet 111 and the lower permanent magnet 109 allows for a more effective means of cancelling the magnetic field when the magnets are oriented north-south.

The functional design described by the '495 patent is commercially available and depicted by FIG. 2B—Prior Art and FIG. 2C—Prior Art. Lower magnet 126 is affixed to the single piece housing 121 (press fit and/or bonded) with diametrically polarized magnetic field line 127 perpendicular to the thin wall of the housing 125. A low friction disk 128 is inserted into single piece housing 121 in between lower magnet 126 and upper magnet 129. Rotation of the upper magnet 129 is accomplished through the use of drill holes 130 and 131 to accommodate a mechanical linkage 132. In order to rotate upper magnet 129 with respect to the lower magnet 126, a clearance 124 is required between the single piece housing 121 and the upper magnet 129. The clearance can be accomplished by machining a larger diameter around the position of the upper magnet 129 into the single piece housing 121 or by using an upper magnet 129 with a smaller diameter than the lower magnet 126. The magnetic fields of the upper and lower magnets 129 and 126 respectively, are directed into south pole conduit 122a and north pole conduit 122b.

That said, the design described by the '495 patent requires tight manufacturing tolerances and is relatively expensive to produce. Manufacture of the single piece housing 121 is both material and labor intensive. Machining of single piece housing 121 (FIGS. 2B and 2C—Prior Art) requires the use of relatively thick solid material (over twice the thickness of either magnet) that is mostly machined away. The clearance 124 must have a very smooth finish and/or high performance lubricants, to avoid quick scraping off of the upper magnet's 129 plating when rotated. The clearance 124 must also accommodate the tolerances of the upper magnet 129. Rotation of the upper magnet 129 also requires that drill holes 130 and 131 or other actuation feature, be machined into the upper magnet 129. These features not only weaken the upper magnet's integrity (exposing it to possible breakage), but negatively affects the quality of the magnetic field. Permanent magnets are made of exceptionally hard brittle materials that oxidize rapidly in air. This is particularly true of neodymium magnets (NdFeB—neodymium iron boron). By having to attach a mechanical linkage 132 to the upper magnet 129, the magnet manufacturer must produce custom magnets that have drill holes 130 and 131 or as depicted in FIG. 2A—Prior Art other locating features 112 and 113 machined into the permanent magnet 111 before magnetizing and plating. This often requires long lead times, costly tools, large volume purchases, and high prototype expenses, due to the difficulty of machining the very hard NdFeB material. Furthermore, the drill holes 130 and 131 must be accurately located on the magnetic field line. This is often challenging as the magnets blanks have not been magnetized at this point. Orientation of the magnet blanks requires iso-static pressing in the presence of a magnetic field. Locating drill holes accurately along the magnetic field line 127 (FIGS. 2B and 2C—Prior Art) is often difficult, and if the location is off more than a few degrees, results in poor performance of the switchable permanent magnet devices. The required diametrically polarized disc magnets also have inherently reduced magnetic efficiencies as size increases.

A further drawback to the '495 patent is the need for top actuation. By having upper magnet 129 (FIG. 2C—Prior Art) inset into the housing, actuation must take place above the housing. It is often desirable to affix a device to the top surface of the switchable magnet apparatus. Attachment to the device described in the '495 patent is often done to one of the vertical sides (resulting in off-center loading) or to a larger yoke-style mount that is affixed to opposite vertical surfaces of south pole conduit 122a and north pole conduit 122b. Care must be taken to ensure that a ferrous target does not come into contact with the vertical flat surface of the single piece housing 121, as it will draw the magnetic field into the ferrous target, substantially weakening the magnetic grip at the desired work surface at the bottom of the housing.

U.S. Pat. No. 4,329,673 issued to Uchikune (1982) ("the '673 patent"), (FIG. 3—Prior Art) describes a switchable magnet 150 using a magnetic shunt method of deactivating a switchable magnet apparatus. This method of actuation is still in use today, however its performance is not as efficient as the '495 patent and other patents using magnetic field cancellation methods from adjacent permanent magnets and their respective pole conduits. This design operates on a shunting principle, which combines the north pole 155 and south pole 154 magnetic fields contained within a magnet into a relatively large pole conduit 151 and 152 for magnetic field cancellation. The pole conduits 151 and 152 are separated by a nonferrous material 153. The pole conduits are relatively large since magnetic field cancellation occurs by combining north pole 155 and south pole 154 magnetic fields from a single magnet rather than a magnetic field from a separate magnet positioned out-of-phase with respect to a fixed magnet. When shunting a single magnet, the north pole magnetic field and south pole magnetic field are oriented at opposite ends, 180° apart. In order for the fields to "shunt" or neutralize each other, they must completely reverse direction within the pole conduits 151 and 152. In order to adequately turn off the device, enough steel must be used to allow the fields to reverse direction and absorb any residual magnetic field entirely within each pole conduit, as there is no magnetic field negation occurring within the magnet itself as is the ease with the newer patents such as "the 495 patent" and the "451 patent". By reducing the size of pole conduits 151 and 152, more of the magnetic field is available to attract the target, thereby improving the magnet performance-to-weight ratio.

U.S. Pat Application Publication No. US 2009/0027149 A1 (Kocijan) (Jan. 29, 2006) ("the '149 Publication") describes a method and device for self-regulated flux transfer using an array of switchable permanent magnets. In this design, the author uses different orientations of the magnets and respective pole pieces to create a "self-regulating" flux transfer, the goal of which is to have an automatically adapting magnetic depth of field to match the target material's saturation level. This complex magnetic pole orientation and geometric spacing of individual switchable magnets apparently was developed in an attempt to avoid an excessively deep magnetic field penetrating through more than one sheet of metal, thereby gripping two or more sheets when intending to lift only one. FIG. 4B—Prior Art demonstrates one of the preferred embodiments of this Publication. In this configuration, each adjacent switchable magnet is oriented with opposing magnet fields located adjacent to each other; that is, north-south/north-south etc. In theory, this configuration is intended to enable the switchable permanent magnets to lift a single piece of sheet metal off of a stack of thin sheet metal. The theory is that once a thin metal target becomes magnetically saturated, any residual excess magnetic flux or field remaining would be redirected "automatically" to the adjacent opposite magnetic poles and not be available to attract other sheet metal below the first sheet. While careful experimentation under precise conditions shows that this is possible, the resultant field gripping of the intended thin target is diminished substantially, as there is no method to stop redirecting the magnetic field once the sheet metal has been separated from the stack of sheet metal, reducing the maximum performance dramatically.

Comparing the switching magnet pole orientations (FIG. 4B—Prior Art) of the "self-regulated flux transfer" method presented by the '149 Publication, to the magnetic pole arrangement presented by the '286 patent (FIG. 4A—Prior Art) shows that the layout depicted in the '149 Publication has been in use since the '286 patent. Magnets 160 are rotated by 180° to illustrate the similarities in magnet orientations between the '286 patent and the '149 Publication. FIG. 4A—Prior art shows the apparatus in a deactivated configuration. FIG. 4C—Prior Art is a depiction of FIG. 4A—Prior Art ('286 patent), superimposed onto FIG. 4B Prior Art ('149

Publication). In FIG. 4A, the magnets are oriented in the same fashion as FIG. 4B for the purpose of deactivating the apparatus. However, in FIG. 4B a gap 164 is intentionally created between the north pole conduit 163 and the south pole conduit 165 for the purpose of reducing or weakening the magnetic field as opposed to deactivating it when there is no separation between north pole conduit 163 and south pole conduit 165. Sufficient gap 164 provides separation between opposing south and north pole conduit fields that will render the field weakening effect negligible as the magnetic field cancellation drops off in a an exponential relationship in nonferrous materials. Furthermore, performance of the apparatus defined in the '149 Publication on thicker materials is typically less than 50% of the performance of the combined holding force of the individual switchable magnets.

FIG. 5—Prior Art depicted in the '149 Publication identifies another possible orientation referred to as a "star array" of permanent magnets whereby the magnetic poles are positioned radially to the center and alternating north-south/north-south in adjacent magnets. A purpose of the "star-array" configuration depicted in FIG. 5—Prior Art is not identified by Kocijan in the '149 Publication due to the substantial, unpredictable imbalance of the inner magnetic field 167 and outer magnetic field 166 caused by the different spacing of opposing magnetic fields; however, the '149 Publication identifies the "star array" as another variation of a "closed system" without identifying a possible purpose for this configuration. Closed magnetic field systems such as the one described by the '149 Publication have been in the public domain for over 40 years.

Limitations of the design described by the '149 Publication are substantial. The maximum performance of the unit is limited to the sum of the individual permanent magnets and respective poles. The difficulty of activating the individual magnets is substantial as described in more detail below. Optimizing a broad-based solution is extremely difficult, if not impossible. Tolerance requirements are excessive. Flexure of thin materials during lifting would likely cause a lifting failure as the individual magnets and poles cannot maintain intimate contact due to the small diameter of contact.

While the '149 Publication' makes no attempt to patent the actuation method identified shown in FIGS. 6A and 6B—Prior Art, it depicts and highlights the complex and challenging nature of activating an array of individual switchable magnets. The cost of the pneumatic gear switching mechanism 170 is easily 50 times the cost of the switchable magnets and pole conduits. Actuation of this apparatus requires rotating each slotted upper magnet 171 180° in all of the switchable magnets 172a, 172b and 172c. Nonmagnetic gears or drives must be attached to each slotted upper magnet 171 in each switchable magnet 172a, 172b and 172c, along with a central gear to drive them simultaneously. Accurate attachment of a gear or drive to the nickel plated, slotted upper magnet 171 is challenging to say the least. Moreover, clearance requirements of the slotted upper magnet 171 to the single piece housing south pole conduit 173a and north pole conduit 173b results in considerable play within the gear mechanism, allowing for the possibility of skipping gear teeth. To complicate matters, one of the claims advises "a carrier 174 and 175 to be devised to allow limited displacement of the magnets with respect to one another." This is highly unrealistic due to the inflexible mounting nature of the drive mechanism required to rotate all of the individual upper magnets. Similarities in Magnet Orientation—The patent application presented for a Rotary Switchable Multi-Core Element Permanent Magnet-Based Apparatus, hereinafter referred to as a Rotary Switchable Magnet or RSM, has many magnet orientation configurations, with the preferred embodiment being alternating pairs; that is, north-north/south-south, north-north/south-south. However, since the mechanism by which the core elements actuate requires orientation reversals, some configurations may be positioned in a north-south/north-south.

The RSM demonstrates far simpler methods of actuating a multitude of magnets and poles, and does so without the need for costly or complex actuation mechanisms such as the apparatus described in FIG. 6A. While it may appear that there are slight similarities in core element orientation between the RSM (FIG. 11) and the "star array" described by the "149 Publication (FIG. 4), the purposes for the orientations are completely different. As shown earlier in the "286 patent" an alternating north-south arrangement between adjacent magnets and respective pole conduits, dates back to 1942. In the RSM design, an alternating arrangement is used to enable super positioning of upper and lower core elements for the purpose of activating or deactivating the core element pairs. Core element position is dictated by apparatus size, target thickness range, target weight or desired holding force, magnet availability and economics. It is the intent of the application to maximize the gripping force of each magnet. In the case of the "149 Publication" the Star Array" merely has an "unique" field layout that has unusual varying magnetic characteristic depending on where the magnetic field is measured Inner magnetic field 167 (FIG. 5—Prior Art) would have little magnetic strength, while outer magnetic field 166, would be stronger.

The inventor of the RSM acknowledges the need to avoid excessive depth of field when the desire is to lift a single thin sheet of steel off of a stack of sheet metal. The proposed RSM design also provides a method that is capable of dynamically adapting its depth of field over a predefined range without operator intervention. This will be discussed further in the section Detailed Description of the Invention. U.S. Pat. No. 7,161,451 B2 issued to Shen (2007) (FIGS. 7A, 7B and 8—Prior Art) ("the '451 patent") identifies a magnetic chuck 180 comprised of an upper chuck layer 181a and lower chuck layer 181b with a common center of rotation 182, a common periphery 183 and flat parallel upper and lower surface 184, where one of the chuck layer flat surfaces is the working surface 185. Each permanent magnet plate 186a having an inner end at the center of rotation 182 extending outward to the periphery 183, with the soft magnet blocks 187a larger than the adjacent permanent magnet plate 186a. The upper chuck layer 181a is comprised of a soft magnetic block 187a, interposed between each pair of magnetized permanent magnet plates 186a and 188a around the center of rotation 182. The second chuck layer is comprised of soft magnet block 187b, interposed between permanent magnet plates 186b and 188b that are complimentary in shape and position to soft magnet block 187a interposed between permanent magnet plates 186a and 188a of the first chuck layer.

Rotating upper chuck layer 181a with respect to affixed lower chuck layer 181b so that upper soft magnet blocks 187a in each layer are aligned north on north with lower soft magnet block 187b results in activation. Conversely, rotating upper chuck layer 181a with respect to the affixed lower chuck layer 181b so that the upper soft magnet blocks 187a in each layer are aligned north on south with respect to the lower soft magnet blocks 189b results in deactivation of the apparatus. The functional design described by the '451 patent is not known to be commercially available. While it is theoretically a viable design, the design described by the '451 patent has considerable issues which are difficult to overcome. More importantly as depicted in FIG. 8—Prior art, deactivation of the chuck 190 by rotating upper chuck layer 191a relative to lower chuck layer 191b when no target or a thin target is on the work surface, results in very high friction in the contact area 192 between the chuck plates, making actuation very difficult and causing premature wear or galling between the two chucks. Surface finish of the upper and lower magnet blocks 193a and 193b respectively, are critical to minimize actuation torque and is once again an expensive and difficult production process. The design requires very tight manufacturing tolerances and is expensive to produce. Moreover, the use of separate multiple upper and lower magnet blocks 193a and 193b substantially weaken the integrity of each chuck layer, thereby requiring supplemental upper and lower plate reinforcement 195a and 195b respectively, as well at the use of upper platter support 194 and structural exterior housing 196 and 197 that also require a considerable number of nonferrous fasteners and holes. The fasteners used, unless specifically made of magnetically soft materials, will retain magnetic flux that will hinder full deactivation. Very small machining variations in producing the individual upper and lower magnet blocks 193a and 193b respectively, as well as the upper permanent magnet plates 198a and lower permanent magnet plates 198b will result in mechanical interference during rotation, potentially causing binding of chuck layers in the exterior housing, further compounded by the very strong attractive force between the chuck layers. Tolerance thickness variations of the permanent magnet plates will also cause upper and lower chuck layers 191a and 191b respectively, to no longer be cylindrical or flat on the upper and lower surfaces of the chuck layers, due to the change in dimension and shape when assembled. This would likely require a post machining process of the assembled chuck plates with active magnetic components to ensure a flat upper and lower surface on each chuck—a daunting production operation. A further drawback with the '451 patent design is the need for top actuation 199. The use of separate upper and lower magnet blocks 193a and 193b respectively, and upper permanent magnet plates 198a and lower permanent magnet plates 198b mandates that a structural exterior housing 196 and 197 and upper platter support 194 be used to encapsulate all of the separate components, particularly the lower chuck layer 191b. Often an eye hook or other attachment method is needed at the top surface of the chuck where the top actuation 199 takes place and it would be highly preferential to actuate from the side while leaving the top surface available for attachment means. While a side-actuated unit is possible with this design, it would complicate the support structure even further.

Comparison of the Invention to Prior Art—The RSM described and claimed herein has significant advantages when compared with the prior art:

Ease of actuation: Actuation can be performed by rotational movement of the upper carrier platter including the top and the sides, allowing far more flexibility for integration into products and fixtures, and for easier attachment of peripherals to the apparatus. Reduced friction means have also been developed, as well as magnetic balancing methods to accommodate their implementation;

Reduced magnet cost: The highly flexible architecture of the invention allows for immediate adaptation of off-the-shelf magnets. As an added benefit, the use of multiple smaller magnets in each core element can result in a greater magnetic force than a larger single magnet. Prototyping is now reduced to days instead of months;

Reduced manufacturing tolerances: Core elements are an integral part of the carrier platters. Simpler magnet shapes that do not require complex machining and field orientation substantially reduce the risk of product failure;

Stronger, more robust design: Elimination of features machined into the magnet substantially increases the magnet's structural strength. Incorporation of magnets into a ferrous or nonferrous carrier platter dramatically reduces abrasive damage caused by rotating a magnet against a steel surface or the risk of magnet damage due to impact or tensional stress forces from the mechanical linkage 132 (FIG. 2B—Prior Art) or as described by actuation means 114-120 (FIG. 2A—Prior Art);

Extreme size flexibility: Magnet size is no longer a primary constraint for producing very large switchable magnets. The flexible architecture of this invention allows the combination of multiple smaller magnets of different sizes and geometries to behave as a single permanent magnet as depicted in FIGS. 9A and 9B. The reduction in magnetic strength-to-volume ratio, observed with larger magnets, is no longer a factor due to the ability of combining multiple sizes and geometries of permanent magnets to emulate a single permanent magnet with a higher strength-to-volume ratio;

Improved stability: For many fixtures, a wider base is often as important as or more important than the overall magnetic strength. Magnetic lifting of thin metal sheets or structures is ideally spread across a large surface area with minimal magnetic penetration of the sheet metal. Current switchable magnetic designs for thin sheets or larger parts are very costly, difficult to produce and difficult to actuate. This invention allows for simple actuation of many individual core elements placed into a low cost nonferrous structure. The outer dimensions can be many feet in diameter, extremely thin and have a variable inner diameters;

Efficient use of rare earth magnets: The invention architecture allows for the development of larger low profile apparatus. Being able to select the minimum magnet size needed to achieve the optimal depth of field allows production of an apparatus weighing considerably less and using far less rare earth material to achieve the same or better breakaway performance than a substantially larger, heavier and more costly traditional switchable magnet with the same footprint. Furthermore, by properly selecting magnets with a larger pole face area than height or width, the pole conduit work surface area can be proportionally increased without sacrificing performance, while reducing the actuation torque.

Ease of integration into products: The invention architecture allows for the development of a combined housing and carrier platter designed for specific applications. By using the basic carrier platter configuration as a template, a new carrier platter configuration can be devised, which incorporates mounting features, ergonomic or styling shapes and leverage or other performance enhancements.

BRIEF SUMMARY OF THE INVENTION

This invention pertains to a RSM apparatus. Specifically, the invention pertains to a magnetic holding device comprised of adjacent carrier platters. Each carrier platter contains an even number of core elements (two or more) located in geometrically similar positions as in the adjacent carrier platter. Each core element is comprised of one or more permanent magnets with opposite poles north (N) and south (S). The magnets may vary in shape; for example, they may be shaped like a bar, disk, trapezoid, cube, sphere, semi-sphere or cylinder. Each core element has pole conduit work surfaces perpendicular to the magnetic pole separation line of the permanent magnet or magnets, such that both the north and south poles of the permanent magnet or magnets have their respective magnetic fields directed through the pole conduits to the top and bottom surfaces of each carrier platter. The pole conduits are comprised of a magnetically soft ferrous material, magnetically matched to contain the field of the adjacent magnet or magnets, positioned on the face of each magnet or magnet's pole and isolated from the opposite pole. The conduit size and shape is based on the relative strength and shape of the permanent magnet or magnets used.

The RSM design provides a highly flexible, unique construction that allows for a range of switchable magnets that vary from extremely compact to extremely large, while offering an exceptional performance-to-weight ratio, highly flexible architecture, reduced cost, stream-lined and rapid path to production, improved safety, robust design, and simple rotary actuation.

BRIEF DESCRIPTION OF THE DRAWINGS

FIG. 1—Prior Art is a switchable magnetic chuck depicted in U.S. Pat. No. 2,287,286.

FIG. 2A—Prior Art is a switchable magnet configuration depicted in U.S. Pat. No. 7,012,495 B2.

FIG. 3—Prior Art is a switchable magnet design depicted in U.S. Pat. No. 4,329,673.

FIG. 4A—Prior Art illustrates a magnetic pole arrangement depicted in U.S. Pat. No. 2,287,286.

FIG. 4B—Prior Art is a preferred embodiment depicted in U.S. Patent Application Publication No. US 2009/0027149 A1.

FIG. 4C—Prior Art depicts FIG. 4A—Prior Art superimposed onto FIG. 4B—Prior Art.

FIG. 5—Prior Art depicts a "star array" of permanent magnets as described in U.S. Patent Application Publication No. US 2009/0027149 A1.

FIG. 6A—Prior Art depicts a pneumatic gear switching mechanism as described in U.S. Patent Application Publication No. U.S. 2009/0027149 A1.

FIG. 6B—Prior Art depicts a pneumatic gear switching mechanism as described in U.S. Patent Application Publication No. US 2009/0027149 A1.

FIG. 7A—Prior Art is a magnetic chuck as depicted in U.S. Pat. No. 7,161,451 B2.

FIG. 7B—Prior Art is a magnetic chuck as depicted in U.S. Pat. No. 7,161,451 B2.

FIG. 8—Prior Art is a magnetic chuck as depicted in U.S. Pat. No. 7,161,451 B2.

FIG. 9A is an oblique view of a core element comprising a nonferrous holder and cylindrical shaped pole conduits for use with nonferrous carrier platters.

FIG. 9B is an oblique exploded view of the embodiment depicted in FIG. 9A.

FIG. 20A is an oblique view of a stacked (separated in the figure for clarity) pair of nonferrous carrier platter assemblies, either of which is depicted in FIG. 12, shown with the core elements aligned out-of-phase and the magnetic fields deactivated.

FIG. 20B is an oblique view of a stacked (separated in the figure for clarity) pair of nonferrous carrier platter assemblies as depicted in FIG. 20A, shown with the core elements aligned partially out-of-phase and the magnetic fields partially deactivated.

FIG. 20C is an oblique view of a stacked (separated in the figure for clarity) pair of nonferrous carrier platter assemblies as depicted in FIGS. 20A and B, shown with the core elements aligned partially in-phase and the magnetic fields partially activated.

FIG. 22B is an oblique exploded view of the embodiment depicted in FIG. 22A with friction reducing means.

FIG. 23B is an oblique exploded view of the embodiment described in FIG. 23A.

FIG. 29 is an oblique partially exploded view of a dual layer array of ferrous carrier platter assemblies, each of the layers comprised of a layer array of ferrous carrier platter assemblies, each of said layer array of ferrous carrier platter assemblies comprised of a layer of ferrous integrated carrier platter housing assembly and a layer of rotatable carrier platter assemblies.

DETAILED DESCRIPTION OF THE INVENTION

Figure 2C:
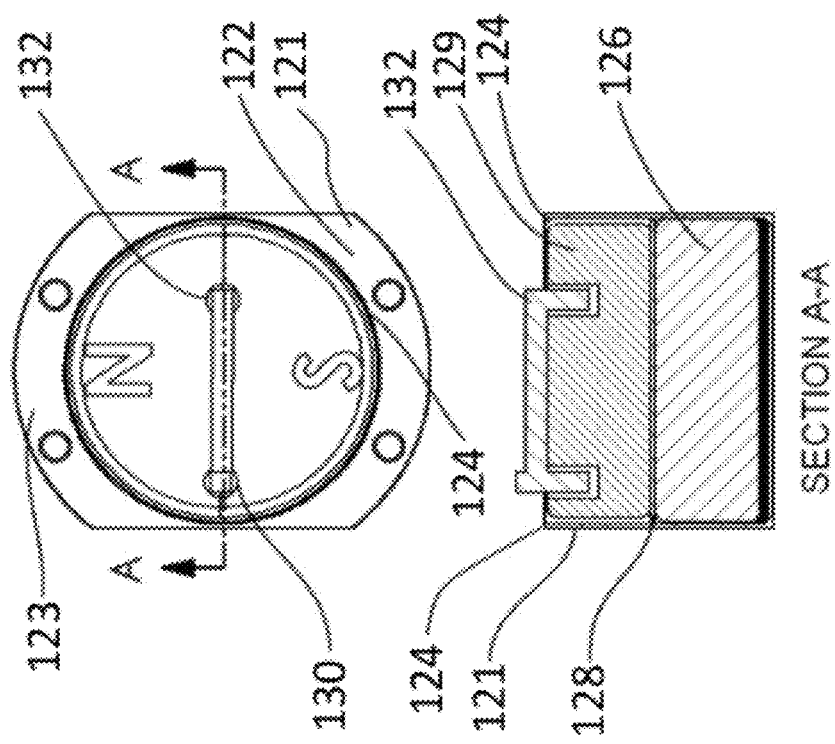
FIG. 2C—Prior Art is a functional design described by U.S. Pat. No. 7,012,495 B2 that is commercially available.
Figure 2B:
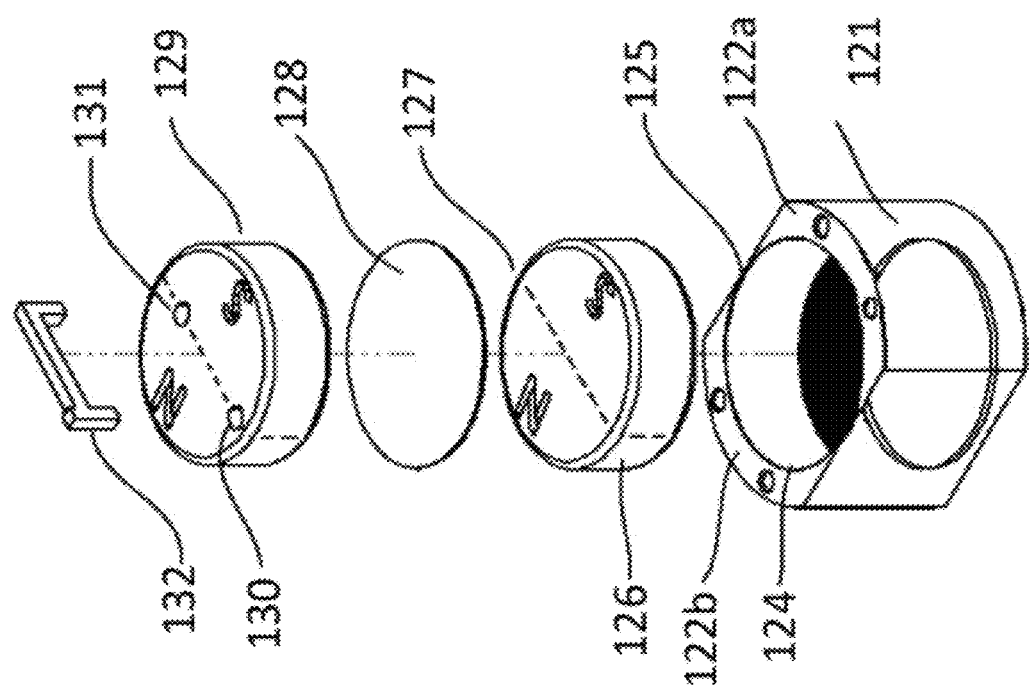
FIG. 2B—Prior Art is a functional design described by U.S. Pat. No. 7,012,495 B2 that is commercially available.

The RSM has various preferred embodiments as described herein. However, invariably the steps in making the different embodiments of the invention are the same. The steps in making the different embodiments comprise: design and operational considerations; selection of permanent magnet size and shape; determination of friction reducing means; matching of pole conduits; designing the core elements; determining the carrier platter configuration; and housing configurations.

Design and Operational Considerations

The highly flexible architecture of the invention allows for rapid configuration of the apparatus to be optimally suited to the application or end product design. Combining the desired grip strength, holding position and offset loading (moment) with the typical properties of the desired target will aid in selecting the appropriate elements needed in the RSM to achieve those goals. Target specifications such as material, thickness, composition, finish, stiffness, size and weight need to be identified in advance.

Selection of Permanent Magnet Size and Shape

Initially, permanent magnet size and shape selection should be based on published specifications of a particular strength and grade of permanent magnet. However, orientation of the magnetic field line and core element configuration can have a dramatic effect on the core element performance. As an example, traditional calculations and or specifications using two magnets identical in size (0.5" width×0.5" depth× 1" length) would indicate that a magnet magnetized through the 1" length (N42=50 lbs) has considerably better holding force against a steel plate than a magnet magnetized through the 0.5" width (37 lbs). This is reasonably accurate if we desire to use only the bare magnet without pole conduits.

However, since the magnetic field is being directed through pole conduits, performance is often better using a magnet that is magnetized through the width (0.5"). Since the pole conduit's surface area is directly based on the surface area of the permanent magnet's pole face, the pole conduit area of the magnet magnetized along the 1" length would be based on 0.25 square inches of magnet pole face area (0.5" width×0.5" depth). The pole conduit area of the magnet magnetized along the 0.5" width would have a magnet pole face of 0.5 square inches (0.5" depth×1" length). In this case, the theoretically weaker magnet performs equally or better than the identically sized magnet with the smaller magnetic pole surface area.

Since permanent magnets are considerably more expensive than steel, the general preference is to use magnets that are magnetized along the thin axis, in this case the 0.5" width and not the 1" length. This provides comparable or better performance while using less magnet material. Lm or magnet length is defined as the distance from the south pole to the north pole, and is not to be confused with the length of the magnet (longest dimension). Air-gap is defined as the distance separating the work surface of the RSM from the target. The magnetic length Lm of the permanent magnets should be based on the desired air-gap performance. Items such as paint, plating and or other finishes act as a physical separation between the RSM and the target. A 0.010" air-gap can reduce the breakaway force from less than 10% to as high as 75%. A larger Lm can increase the air-gap performance substantially. Use of larger magnet lengths (Lm) with the same surface area typically increases air-gap performance, which can be useful when attempting to lift painted, plated, or rough and uneven targets.

Magnetic depth of field is related to the average distance between opposing pole conduits. It may be advantageous to substitute multiple smaller magnets with the same magnetic length and approximately the same volume. This often yields superior performance to that of a single large magnet. Since the strength of a magnet is often specified in terms of infinitely thick targets, the particular magnets should be tested on the intended target thickness for verification of performance prior to selection.

While the preferred embodiment uses Neodymium magnets primarily due to price and performance, most magnet compositions can be used as long as they do not degauss (lose their magnetism) when subjected to an equally or slightly stronger magnetic field of the opposite polarity. This is known as coercivity. Other considerations involve temperature rating of the magnets or the point at which they begin to demagnetize if taken above that temperature, i.e., the Curie point. For basic Neodymium magnets, it is important that the storage temperature remain below 310° C. and to avoid use at temperatures above 80° C. as the magnetic strength will steadily degrade above that point. As long as the magnet was not subjected to temperatures above the Curie point, the magnets should return to normal when cooled down.

Matching of Pole Conduits

There are two primary functions for pole conduits. The first is to contain the out-of-phase (N-S/S-N) magnetic field alignment of two or more desired magnets so that no magnetic flux emanates from the pole conduit's contact surface area, thereby deactivating the apparatus. The second function of the pole conduit is to redirect the aligned in-phase magnetic pole combined fields of two or more magnets, activating the apparatus. The pole conduits are ideally constructed of a magnetically soft material such as mild steel or solenoid steel. Ideally, south pole conduit 201a and north pole conduit 201b must come into contact with each of the magnets' pole faces as depicted in FIG. 9A. Means to isolate the north and south pole conduits must be used to provide adequate separation between opposing poles. FIG. 9H identifies an isolation means by having a north pole conduit 252b separated from the south pole conduit 252a by gap 253. The gap 253 must be sufficiently large enough that the magnetic fields contained within the north and south pole conduits 252b and 252a respectively, do not magnetically couple so that essentially all of the magnetic field emanating from the north or south pole conduits is available for redirection into an adjacent pole conduit or the target. The optimal separation distance or gap can be approximated as equal to the Lm. The surface area of the contact interface between the south pole magnet face 203a and the adjacent south pole conduit magnet face 204a must be at least 25% of the surface area of the south pole magnet face 203a, depicted in FIG. 9B. The second dimensional requirement for the pole conduit is that the south pole conduit surface area 205a or north pole conduit surface area 205b that come into contact with either the target or an adjacent pole conduit in an adjacent carrier platter is ideally 75% of the surface area of the south pole magnet face 203a as depicted in FIG. 9B. This ratio of pole conduit magnet face area to the pole magnet face area is hereinafter referred to as the "Pole Surface Ratio of the Conduit." Exceeding the Pole Surface Ratio of the Conduit does so at the expense of performance and excessive weight of the apparatus. Using a smaller Pole Surface Ratio of the Conduit often results in an apparatus that fails to deactivate fully.

When using cylindrical or disk-shaped magnets that are diametrically polarized, as a rule of thumb the pole conduit surface area is best estimated as the pole surface area of a rectangular or square bar that completely contains the cylindrical or disk-shaped magnets, with a similarly located magnetic field line.

It should be stressed that the pole conduits need not cover the entire surface area of the magnet's pole surfaces. Pole conduits may also extend past the width of the magnetic pole face by as much as 200% or more.

The remaining criterion for the pole conduit is shape. Ideally, the shape of the pole conduit is such that it conducts the magnet field as efficiently as possible. Consequently, pole conduits should not be hollow or contain nonmagnetic soft obstructions such as holes or stainless steel screws. Care should be exercised to assure smooth field flow through the pole conduit in order to realize maximum field conduction efficiency. It is best to avoid reversal of directions, or sharp corners and turns. Semicircular or elliptical shapes that follow the natural field flow of the magnet are ideal.

A pole conduit is considered matched when the conduit is sized such that a pole conduit aligned out-of-phase negates the field to where magnetic grip is insignificant. The typical criterion is to have a Pole Surface Ratio of the Conduit of about 0.75. While this is a good starting point, this Ratio is dependent on several variables such as magnet grade, pole conduit composition, plating, machining quality, and other variables. Ratios less than optimal will result in less than full deactivation of the apparatus when the upper and lower pole conduits are aligned "out-of-phase," that is, north-south (N-S)/south-north (S-N). Pole Surface Ratio of the Conduit Ratios greater than optimal will not perform at maximum potential when aligned "in-phase;" that is, north-north (N-N)/south-south (S-S).

An additional consideration when configuring pole conduits, is that the distance between opposing pole conduits, particularly with a shared pole conduit configuration, also affects the magnetic depth of field. This can be used to help minimize field penetration through the target. When using thick materials, target saturation is unlikely to happen; the magnetic length Lm or magnet width can be substantially larger within the geometric constraints of the pole surface area. When target saturation is not possible, use of larger Lm magnets and larger separation between opposing pole conduits improve air-gap performance substantially, creating a safer lift.

Figure 10:
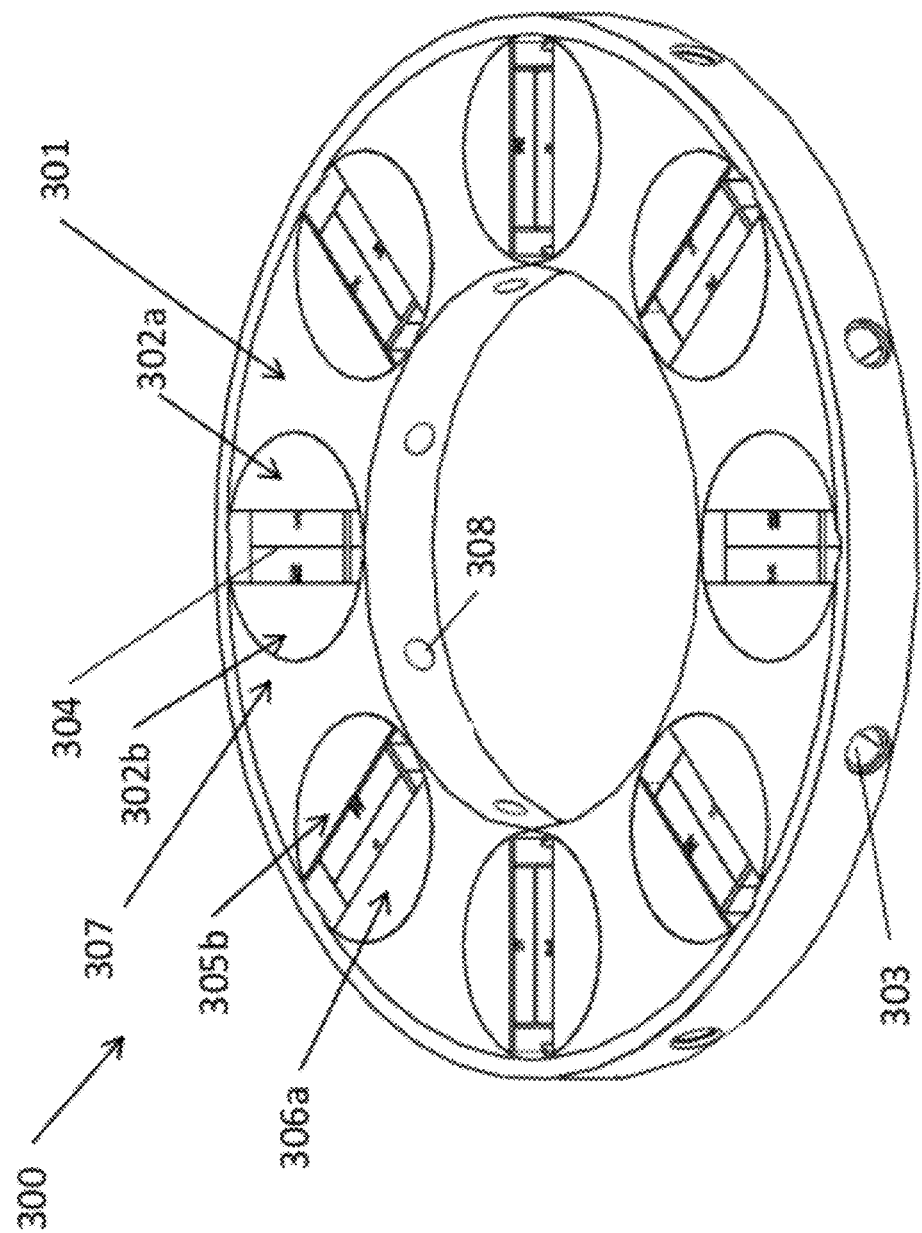
FIG. 10 is an oblique view of a nonferrous carrier platter assembly, comprising a nonferrous carrier platter containing eight core elements of the configuration shown in FIG. 9F oriented with like pole conduits facing each other.

Adjacent pole conduits have thus far been described as separate components; however, adjacent pole conduits may be combined into a single pole conduit between adjacent permanent magnets having like poles, in which case they are "shared." In the case of "shared" pole conduit matching, each permanent magnet is inset into a ferrous platter and shares the adjacent pole conduit with an adjacent permanent magnet having the same magnetic field polarity. "Shared" pole conduit matching is similar to individual pole conduit matching; however, regard must be given that there are now two magnetic pole surfaces on each pole conduit. In a typical core element, there are one or more permanent magnets with a pole conduit attached to the north pole face and the south pole face of the magnet. In the configuration shown in FIG. 14, permanent magnets 342 and 343 have a shared south pole conduit 345a in contact with the south poles of each of the permanent magnets 342 and 343. Permanent Magnets 343 and 344 similarly have a shared north pole conduit 345b in contact with the north poles of each permanent magnet. In this configuration, each of the "shared" pole conduits is in contact with two permanent magnets' north poles or two permanent magnets' south poles. This configuration yields essentially the same result one would obtain if one eliminated the non-ferrous portion of the carrier platter between north pole conduits 302b and 305b and merged the adjacent north pole conduits 302b and 305b into a single pole conduit having a surface area equal to the area of the of the combined north pole conduits 302b and 305b as shown in FIG. 10. By using pole conduits that are shared between adjacent permanent magnets instead of in direct contact with each other, one sees an increase in efficiency or the ability to contain and redirect the magnetic fields of the adjacent permanent magnets. This efficiency or synergy is a result of combining magnetic fields from permanent magnets located in different positions (left and right side of the shared pole conduit) as well as due to the "closed" nature of the magnetic field, i.e., the magnets and pole conduits form a magnetically contiguous circle. Experiments have shown that the optimal pole conduit surface area is around 0.70 to 0.75 times the combined magnet pole surface areas on opposite sides of the pole conduit (either a north-north (N-N) or south-south (S-S) magnetic pole surface). As with the individual pole conduits in non-ferrous platters, verification of the pole conduit matching is a necessity; by aligning out-of-phase upper pole conduits and their respective magnets with the lower pole conduit and their respective magnets, little to no magnetic grip or field is present on the pole conduit work surface.

As described in more detail under the heading Friction Reducing Means, an air gap is introduced when implementing a friction reducing means. This air gap prevents the apparatus from de-activating completely due to the degraded coupling of the fields contained in the pole conduits. Essentially, not as much of the magnetic field contained in the pole conduits is available to neutralize the magnetic field in the lower pole conduits. A simple solution is to increase the magnetic field contained in the upper pole conduits such that the magnetic field reaching the lower pole conduits is sufficient to completely neutralize the field contained in the lower pole conduit.

Several methods to increase the magnetic field of the upper pole conduits, for example and not by way of limitation, include:
Use of higher grade magnets (Neodymium magnets, readily available from an N35 Grade to over N52);
Increasing the magnet volume by either using:
A higher quantity of magnets;
Larger dimension permanent magnets; or
Different shaped magnets; or
The use of higher permeability metals.

Using one or more of these methods allows for complete neutralization or, if desired, a slight reversal of the magnetic pole conduit field emanating from the pole conduit which comes into contact with the work or target surface. However, there will be a slight residual magnetic field emanating from the core element not in contact with the work or target surface. Isolation of this residual magnetic field when deactivated can be achieved through a variety of methods, including without limitation, shrouding or encapsulating the exterior of the upper carrier platter assembly 432 of FIG. 22B with a non-magnetic material of sufficient thickness, adding an optional ferrous material around a thinner nonmagnetic casing, or simply ignoring the residual magnetic field since it is a relatively weak residual force. There are instances when a mild attractive force is desirable when the apparatus is deactivated; for example, maintaining in a small attractive force to prevent a deactivated unit from falling, or providing a small amount of lift or attraction until the device is positioned properly at which point the device is fully activated. If a small residual force is desired when the unit is deactivated, equal strength core elements may be used in the upper and lower carrier platters; however, it should be noted that these devices will slowly gather ferrous debris over time, and therefore either should be kept in contact with a ferrous target, encapsulated as earlier described, or occasionally wiped clean.

It may also be desirable to momentarily reverse the polarity of the lower magnet in an upper/lower magnet pair in an effort to "push" or demagnetize a ferromagnetic target that is not fully magnetically soft. Work-hardened or tempered target materials typically have a residual magnetism once the magnetic field is removed. By reversing the polarity of the lower magnet assembly through the use of a substantially stronger upper magnet assembly, some or most of the residual magnetism in a target can be removed. When the upper and lower assemblies of a carrier platter are in-phase, there is a strong attraction force to the target. When the upper and lower assemblies of a carrier platter are aligned out-of-phase, the upper assembly overwhelms the lower assembly resulting in a net reversed field flux into the target that demagnetizes the target and allows for easy release. By having a stronger magnet assembly in the upper platter, the OFF or deactivated position can be at a slight angular offset from 0° (1° or 2°) so that the magnetic flux of the upper magnet assembly cancels the magnetic field of the lower carrier platter (and overcomes any air gap losses as well). Complete in-phase alignment of the upper and lower carrier platters at 0° could result in a slight reversal of the magnetic polarity of the core elements in the lower carrier platter.

Designing the Core Elements

As describe earlier, a core element is a pair of magnetically matched pole conduits with one or more permanent magnets inset between the pole conduits. The magnetic field line of the permanent magnet(s) is oriented with the magnetic north (N) and south (S) pole faces in contact with the vertical sides of the pole conduits.

There are three basic types of core elements:
The first basic type of core element is for use in a nonferrous carrier platter comprised of one or more permanent magnets sandwiched between two pole conduits as depicted in FIGS. 9A, 9B, 9C, 9D, 9E, 9F, 9H, and 10. This first basic type of core element is depicted with multiple carrier platter assemblies in FIG. 19. Attachment means for attaching the permanent magnets to the pole conduits are varied and can include without limitation adhesive bonding, potting, incorporating recesses into the pole conduits to capture the permanent magnet(s) encapsulation, molding the entire assembly into a nonferrous carrier platter, or any combination thereof. One of the advantages of this style of pole conduit is that material costs are relatively inexpensive, ideal for limited production;

The second basic type of core element is for use in a nonferrous carrier platter comprised of a single piece pole conduit pair housing as depicted in FIGS. 9G and 11-13 that has one or more permanent magnets affixed to the housing. This second basic type of core element is depicted with multiple carrier platter assemblies in FIGS. 20A-D, 21A-D, and 23A-B. Regardless of the pole conduit housing shape, the style of housing should be designed so that a minimal amount of ferrous material is along the magnetic field separation line to avoid or reduce a short circuit of the north and south poles of the permanent magnet(s). Methods to reduce this short circuit include without limitation having thin side walls, drilling out or cutting away most of the material along the magnetic field lines, inserting a nonferrous material between the poles (welded, brazed or bonded) prior to machining, or any combination thereof. As with the first basic type of core element, this type of core element is designed for use with nonferrous carrier platters using similar attachment methods. Advantages of this type of core element include affording the ability to mass produce a few sizes of core elements that can be inset into many different platter sizes, and rapid production with very predictable performance; and The third basic type of core element for use in a ferrous carrier platter uses shared pole conduits and is comprised of the exemplar core elements depicted in FIGS. 14, 15, 16, 17, and 18. This third basic type of core element is depicted with multiple carrier platter assemblies in 22A-B, 24 and 26. In these designs, each core element's permanent magnet or magnets are inset directly into a matched cavity in a single piece carrier platter. The cavities in each carrier platter accommodate the core elements in each platter. This design can have exceptional performance-to-weight ratio. Furthermore, the carrier platter structure is quite strong as the carrier platter is made out of a single piece of magnetically soft steel. It has the deepest field penetration using the same magnets and is generally the most cost effective to produce since only the cavities and not the individual pole conduits must be machined. The carrier platter can be produced with much tighter tolerances, substantially reducing any potential misalignment between the carrier platters and maintains a contiguous upper and lower surface to minimize any interference between platters during activation or deactivation of the apparatus. By integrating the pole conduits into the carrier platter, assembly part count and manufacturing costs are substantially reduced.

The carrier platters shown in FIGS. 10, 11, 12, and 13 are made of aluminum, but can be made of plastics, ceramics, epoxies, brass, nonmagnetic stainless steels, or other appropriate materials. The manufacturing process can be readily adapted so that a carrier platter can be injection-molded or machined to contain or allow the magnet assemblies to be embedded. Care must be taken not to exceed the Curie point. As a magnet assembly does not move with respect to the pole conduits, it may be epoxy-coated, potted, or completely sealed. Efforts must be taken to minimize the air gaps between the carrier platters, and between the carrier platters and the target material as the magnetic force is inversely proportional to the square of the air gap.

Figure 25:
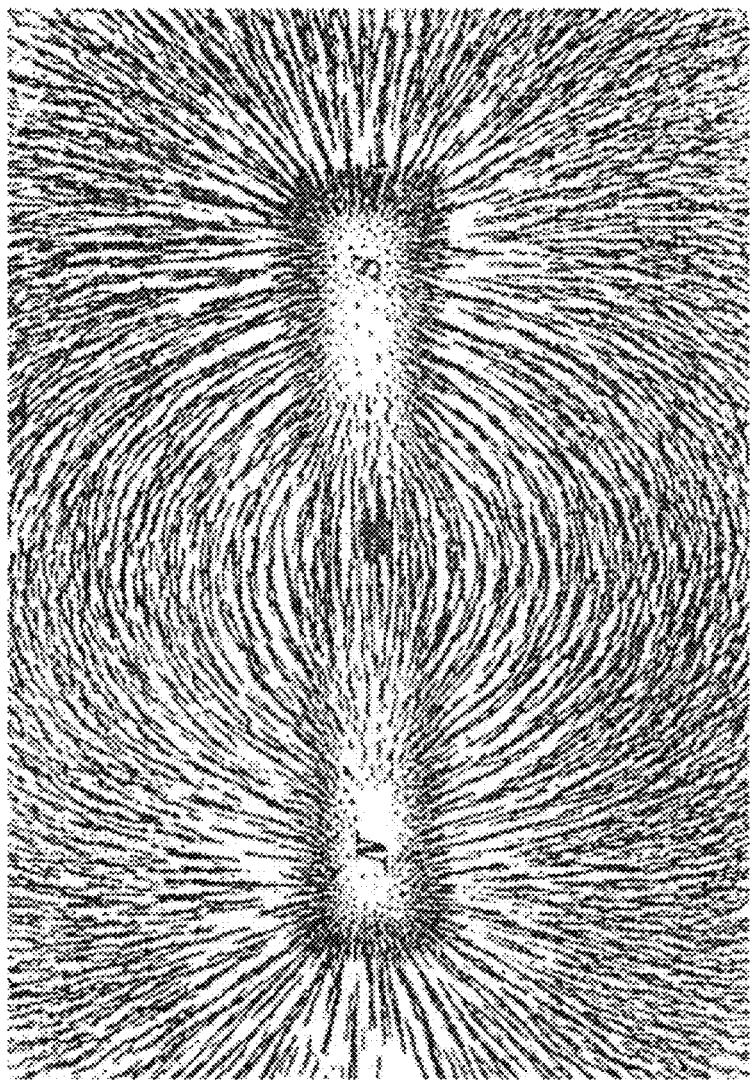
FIG. 25 is an image depicting the magnetic field lines of a permanent magnet.

Another consideration when designing the core element is that magnetic fields are unable to make sharp turns. To maximize performance, the pole conduits should have a curved, somewhat elliptical, shape that ideally matches the magnetic field lines as depicted in FIG. 25 based on peak strength emanating from the center of the magnetic pole face decreasing as it approaches the magnetic field line so that there is an hourglass shape with the most narrow point at the field line. Ferro fluid mapping can also be used to provide a visual of the ideal profile of the pole conduit. This somewhat elliptical shape on each pole face can be difficult to machine, so circular shapes or "Double D" shapes (depicted in FIG. 9G) are often used as a close approximation with good results. Designs must ensure adequate separation between the north and south poles of the permanent magnet(s). Increasing the number of core elements in a carrier platter will also dictate the relative angle of rotation to activate and deactivate the apparatus.

Determining the Carrier Platter Configuration

Regardless of carrier platter composition, ferrous or nonferrous, there are other key factors that influence the carrier platter configuration such as desired actuation angle, weight, cost, actuation method, actuation torque, positional detents, plating, and housing configuration, target size, desired footprint, and safety lifts.

Desired Actuation Angle. The actuation angle as described herein refers to the relative rotation of one carrier platter with respect to an adjacent carrier platter. There are two or more core elements in each carrier platter which are geometrically positioned and equally separated within the carrier platter. The relative rotation between adjacent carrier platters required to actuate or de-actuate the apparatus, that is, the actuation angle, is dependent on the number of adjacent core elements in each platter. The actuation angle is essentially 360° divided by the number of opposing core elements in the platter. For example a carrier platter with five equally spaced adjacent core elements would have an actuation angle of 360°/5 or 72°. Here, a 72° rotation of a carrier platter with respect to a fixed adjacent carrier platter results in full activation or deactivation of the magnetic fields, depending on the starting point. Likewise, a platter with 18 equally spaced adjacent core elements would have an actuation angle of 360°/18 or 20°. Here, a 20° rotation of a carrier platter with respect to a fixed adjacent carrier platter results in full actuation or deactuation, depending on the starting point. The core elements are positioned into the carrier platters such that if a first carrier platter is placed adjacent to a second carrier platter and rotated with respect to the second adjacent carrier platter by the actuation angle, the core element(s) in the first carrier platter would have an opposite magnetic pole orientation with the core element(s) in the second carrier platter; that is, N-S/S-N. This deactivates the magnetic fields emanating from the device. Rotating the first carrier platter again by the actuation angle, the core element(s) in the first carrier platter would have the same magnetic pole orientation as the core element in the second carrier platter, that is, N-N/S-S. This activates or actuates the device.

First and second carrier platters in a carrier platter assembly must have a matching magnetic pole orientation with respect to each other, but the carrier platters need not have the same shape. For example, a second carrier platter can have a square or other functional shape, while the first carrier platter could remain round. This is beneficial in that the carrier platter can be specifically optimized for a particular use, and a relative rotation of the core elements in the upper carrier platter would activate the core elements in the second functional shape carrier platter.

Figure 26:
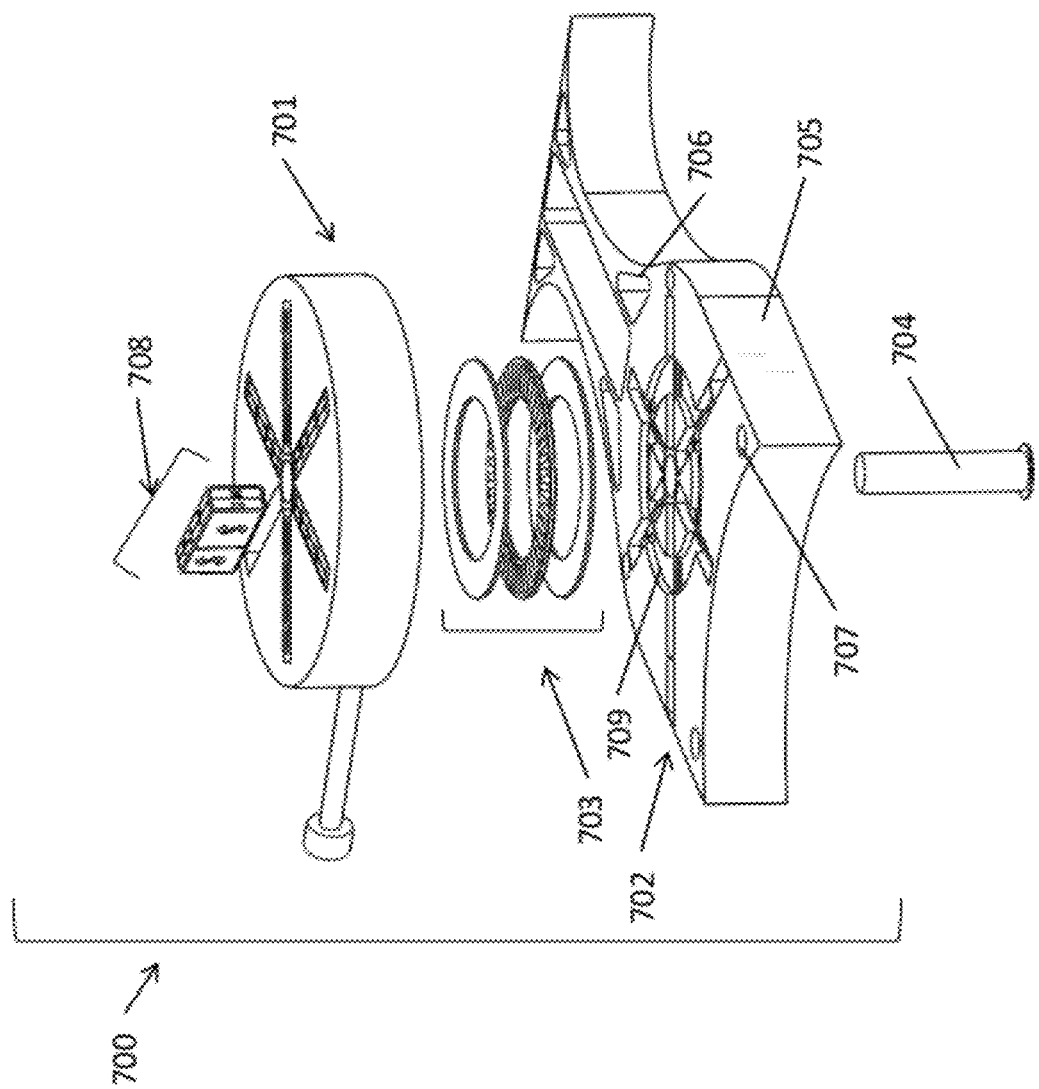
FIG. 26 is an oblique partially exploded view of stacked ferrous carrier platter assemblies (separated in the figure for clarity) with an integrated carrier platter housing assembly integrating a carrier platter assembly affixed therein and comprising a different shape than that of the rotatable carrier platter assembly. The integrated carrier platter housing assembly serves as a combined housing and carrier platter assembly.

FIG. 26 describes a configuration for use with a magnetic drill base. This design allows for the majority of the magnetic holding force to be located on one end and adds additional length to the assembly for improved moment loading. Material is strategically removed to minimize product weight and to maintain the proper Pole Surface Ratio of the Conduit.

Reference anywhere in this document to a first carrier platter and second carrier platter shall be deemed to be synonymous to reference to an upper and lower carrier platter. Reference to an upper and lower carrier platter is not intended, nor shall it be construed to limit, the relative positions of adjacent carrier platters; the gist of what is intended is that the carrier platters be adjacent to one another, regardless of their orientation in space.

It is important to note that multi-core element platter configurations can have core element configurations which alter the actuation angle. These unique configurations provide two or more step-ups in strength within the actuation angle. As an example, an 18-core element platter with the core elements changing magnetic pole direction every two core elements, would have an effective actuation angle of 360°/18×2 or every 40°; likewise, if the pole direction of the core elements changes every three adjacent core elements as depicted in FIGS. 21A, 21B, 21C and 21D, this configuration would have an effective actuation angle of 360°/18×3 or 60°. Starting from a fully de-actuated position, rotating the FIG. 21A-D carrier platter by 20° (360°/18) increments with core elements that have a change in direction every 60°, one-third of the core elements would actuate at 20°, two-thirds of the core elements would actuate at 40° and all of the core elements would actuate at 60°.

Other variations exist where the core elements are rotated by a fixed angle between adjacent core elements in a repeating pattern. An example would be an 18-core element platter with a repeating pattern where the first core element is oriented north-south radially; the second adjacent core element is rotated by 60°, and the third adjacent core element by 120°. In this example as depicted in FIG. 20A-D, the effective actuation angle is also 360°/18×3 or 60°; however, a 20° rotation would result in partial activation of the core elements as shown in 20B, a 40° rotation would result in a further increase in the activation as shown in 20C and a 60° rotation would fully activate all the core elements as shown in 20D. While this force is not directly proportional to the rotation angle, it can be defined so that a variable magnetic force can be attained by partially rotating one carrier platter with respect to the other and having detents or locking positions to hold the carrier platter position at the desired magnetic field level. Attaining this variable magnetic force may be useful when it is undesirable to have a strong residual magnet field emanating through a thinner target, to optimize the magnetic field based on material thickness, or for test lifting to ensure adequate breakaway performance, as well as reducing actuation torque requirements based on material saturation.

Weight. The switchable multi-core element architecture allows for nonferrous platters that use separate core elements (not the "shared" or ferrous core element platter) to be constructed out of a wide range of materials. While the core element composition is pre-determined, the composition of the carrier platter that the core elements are placed into is only restricted by cost and desired mechanical properties such as stiffness, density, friction coefficient, etc. Carrier platters can be configured out of wood, plastic, ceramics, nonferrous metals, etc. The material must be capable of handling the force placed on the carrier platter substrate by the core elements.

Cost. The switchable multi-core element is the lowest cost to performance, switchable array magnet available. However, using exotic materials for further performance gains can rapidly drive up the price. High temperature operational requirements can also increase the cost of the Neodymium magnets. Maximizing the grip strength in a small package would require higher grades of Neodymium. While pole conduits which are capable of being made from low carbon steels such as 1008 to 1018 are relatively inexpensive, for maximum performance high permeability steel alloys are available which allow much higher saturation flux density levels (magnetic grip to target). Most of these enhancements offer moderate gains at a substantial cost increase. Improving the corrosion resistance of a core element is important. The use of magnetic stainless steels or high permeability stainless steels can also be costly, though a viable option. Unless otherwise required, plating is usually acceptable for most commercial applications for corrosion resistance. It is important to note that the use of high permeability alloys will require modification of the optimal Pole Surface Ratio of the Conduit and performance should be verified as described in the Pole Conduit Matching section.

Figure 23A:
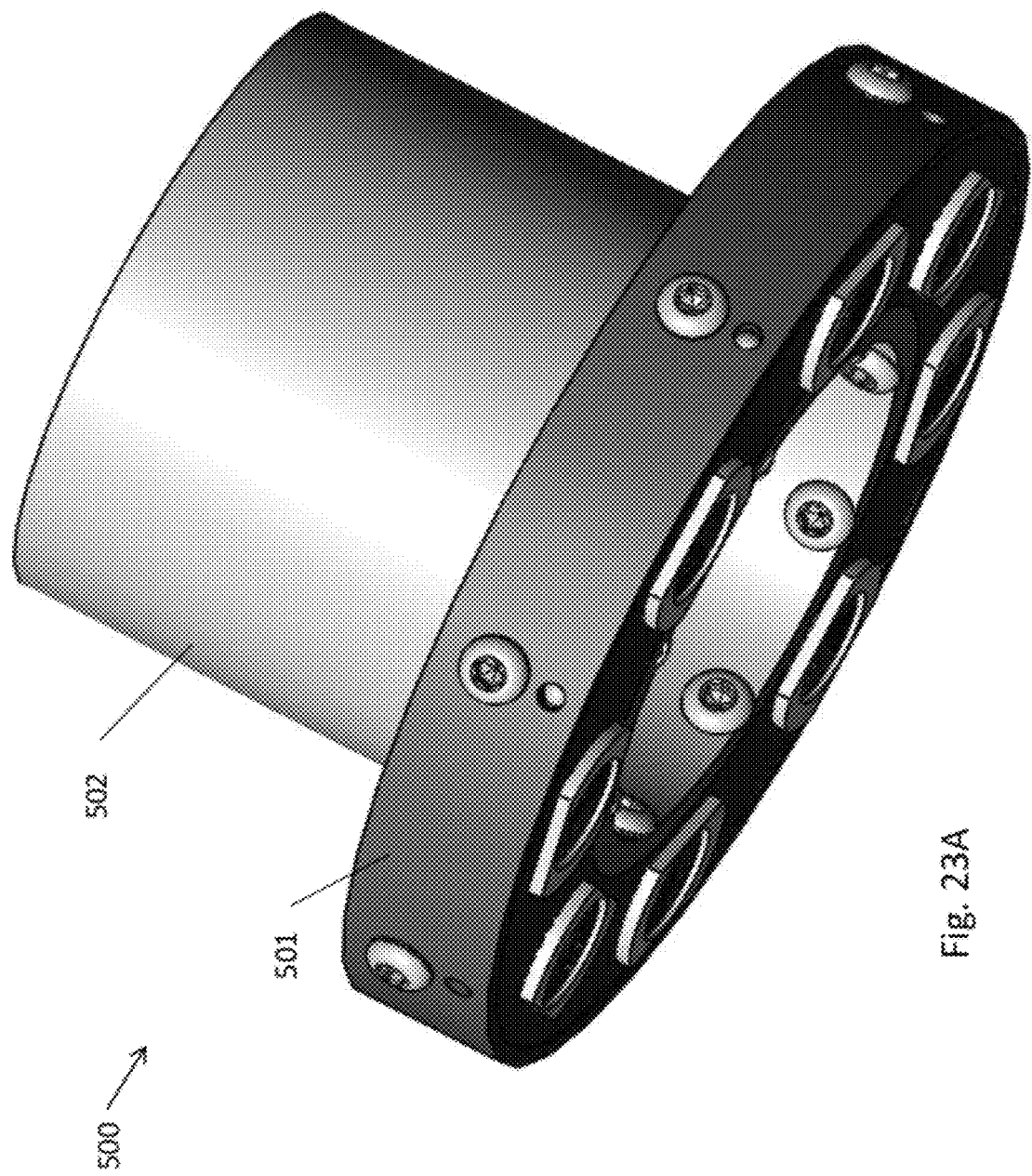
FIG. 23A is an oblique view of an apparatus comprised of an exterior housing, two non-ferrous carrier platter assemblies, detent means, and friction reducing means.
Figure 24:
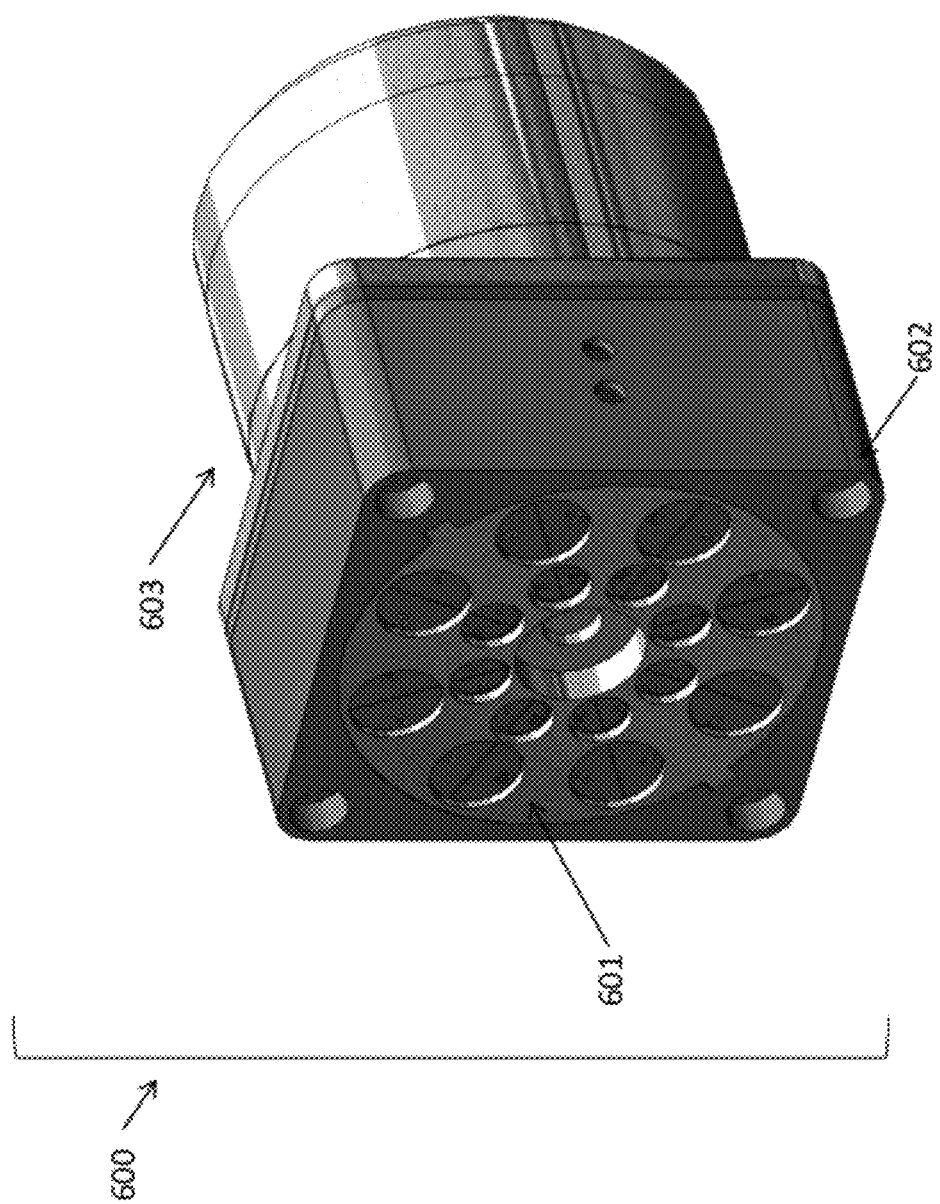
FIG. 24 is an oblique view of an apparatus comprised of a housing, two carrier platter assemblies, and automated actuation means.

Friction Reducing Means. When aligned out-of-phase the magnetic grip between the upper and lower pole conduits is essentially equivalent to the total magnetic grip available to the target when the apparatus is aligned in-phase. Shear force is the force that it would take to slide one object over the other. Shear force of a steel pole conduit in direct contact with another pole conduit is approximately 25% of the breakaway force. The breakaway force is defined as the force necessary to separate a magnet from a target by pulling the magnet in a perpendicular direction away from and off of the target. If a north and south pole conduit pair has a breakaway force of 240 pounds, the effort to slide one pole conduit with respect to the other could easily require 60 pounds of force. A four conduit pair's apparatus, which is relatively small, could require as much as 240 pounds of rotational force to overcome the shear force due to the attraction between the carrier platters when deactivated. Attempting to actuate this unit from the deactivated position using a typical 9" crescent wrench would require 180 foot pounds of torque! A friction reduction means must be incorporated to make the apparatus useable. There are many techniques which can minimize this force substantially; however, most will introduce a small air gap between the magnetic poles. This gap likely will prevent the apparatus from de-activating properly, even when minimized. Detailed methods on resolving these issues are identified in the section titled Matching of Pole Conduits. To address this issue, there must be a variation in the magnetic field strength between the upper and lower core element, so that when deactivated there is minimal magnetic grip or field present on the pole conduit work surface (if desired). This may be accomplished, for example and not by way of limitation, through the use of ball and roller bearings, air gaps, exotic or high performance lubricants, low friction finishes or coatings, polytetrafluoroethylene (PTFE) disks or rings, or other materials suitable for the desired number of life cycles and compressive force. The thickness of the selected material would introduce a small air gap which would require an increase in the upper core element permanent magnets' field strength as described earlier. However, the actuation torque required is not only reduced by the high performance friction reducer, but by the addition of an air gap as well. Attraction between upper and lower core elements decreases dramatically due to air gap. For example, a 0.5 mm thick Teflon® disk could reduce the attractive force between upper and lower core elements to 50% of the attractive force if an air gap is not present. Combined with the reduced coefficient of friction, the unit can now be easily activated by hand or attached lever. Compression strength of Teflon® is about 400 pounds per square inch (psi) though it has poor tensile strength. However cost for Teflon is relatively inexpensive and as long as the attractive forces between the upper and lower carrier platters is low enough not to damage the Teflon material, it is less expensive than needle or roller bearings as a friction reducing means Actuation Means. The RSM apparatus lends itself to many different actuation methods. Since an exterior housing is not required to constrain the platters, features can be incorporated to allow actuation of the device from on top as shown in FIG. 24 or from the sides as shown in FIGS. 23A and 23B. Furthermore, since there is often a hole or opening in the middle of embodiment depicted in FIG. 23A, actuation can be achieved through a hole in the target material, for applications such as a door lock. As with any manually actuated device, provision can be made for a myriad of actuation methods. Automated switching methods include mechanical, electromechanical, electrical and magneto-motive actuation, among others. Mechanical actuation include without limitation pneumatic, hydraulic, gear drive, belt drive, lever, spring, knob, and manual or by hand. Examples of electro-mechanical actuation include without limitation motors (gear, servo, stepper), solenoids and rotary solenoids. Electrical actuation examples include without limitation magnetic coils oriented so that the magnetic fields are aligned with the pole conduit fields in such a manner that the electromagnetic field can completely negate or reverse the permanent magnet generated field when energized. Reversing the polarity of the electromagnetic field can substantially augment the magnetic grip and depth of field while energized. Magneto-motive actuation includes without limitation the use of a magnetic field which can provide a rotational force exertion on the platter, similar to a spring.

Actuation Torque. As with all phase cancelling switchable magnets and arrays, actuation force is usually ten times higher on a nonferrous surface than it is on a ferrous target that does not fully saturate. N-N or S-S alignment of the magnets in the upper and lower core element pairs without a target for the magnetic field produces a repulsive force between the two carrier platters. This repulsive force between the two carrier platters diminishes when an activated switchable magnet apparatus comes into contact with a target. As the target thickness increases, the force necessary to actuate the magnetic field drops off considerably. One embodiment that allows for a lower actuation force is to allow a first carrier platter to separate from an adjacent carrier platter during actuation of the apparatus. An increased air gap will reduce the actuation force by reducing oversaturation of the target material. Target materials that are relatively thin compared to the core elements will exhibit a repulsion force greater than the attraction between the core elements. The actuation torque level as described above is directly proportional to the target material saturation. If the RSM is not positioned on a ferrous target, the actuation torque will be substantially higher than when positioned on a ferrous target. This variation in actuation torque is beneficial in that it is difficult to actuate the RSM unless it is positioned on a target, that is, the more difficult it is for the operator to actuate the apparatus, then the weaker the breakaway force. This can provide the user of the apparatus with valuable feedback as to the extent the apparatus is attracted to the target. Forced actuation of the RSM while not attached to a target allows the pole conduits to emit their magnetic field a considerable distance. While the health risks are thought to be very low with exposure to magnetic fields, the risk of pinching a body part between an already activated unit and a nearby steel surface is not.

Positional Detent Means. Provisions to limit the rotation angle can be incorporated into the upper and lower carrier platters as shown in FIGS. 23A and 23B. Ball detents or rotational stops may be incorporated to prevent unintended deactivation. In most cases, the carrier platters are separated with either a low friction sliding membrane or with an appropriately-sized ball bearing or roller bearing apparatus based on desired life and type of usage. In a configuration with an upper and lower carrier platter, rotation of the upper carrier platter(s) into an N-N/S-S alignment, that is, in an activated or actuated mode (ON position) when not on a ferrous target results in a spring-like resistance against rotation. If an apparatus is pulled off a target while it is activated, the repulsive forces between the carrier platters will increase (the same magnetic repulsion observed when no target is present) causing the carrier platter(s) to rotate back to a deactivated position unless restrained. It is thus important that a detent or lock feature be included in the apparatus if used on variable thickness targets or if actuation off-target is desirable. The examples cited herein with respect to provisions to limit the rotation angle of the carrier platters and other examples provided throughout this disclosure are by way of example and not limitation (whether such is explicitly stated with respect to given examples) as there are numerous methods not specifically cited that will accomplish the same desired limitation of rotation angle.

Constraining Means. In order to facilitate actuation and deactuation of the apparatus, a rotational constraint must be implemented to allow for proper rotational alignment of the core elements in the first carrier platter with the corresponding core elements in the second carrier platter. Rotational constraint of the apparatus is often done by affixing a second carrier platter relative to the target or work surface, and rotationally constraining the first carrier platter so that it can only rotate concentrically with respect to the second carrier platter. This can be accomplished in many ways and the examples herein are, by way of example and not limitation;

a center shaft affixed to the second carrier platter and provides radial clearance and subsequent concentric rotation of the first carrier platter, a center shaft affixed to the upper carrier platter with clearance to allow the first carrier platter and shaft to rotate concentrically within the lower carrier platter, a cylindrical perimeter affixed or integrated into the lower carrier platter, allowing for constrained concentric rotation of the first carrier platter within the cylindrical perimeter, a housing which affixes the second carrier platter and attaches to an external device which has a rotational inner shaft such as but not limited to a motor, pneumatic cylinder or rotary solenoid, and concentrically constrains the first carrier platter to the rotational inner shaft so that rotation of the shaft of the external device results in a relative concentric rotation of the first carrier platter with respect to the second carrier platter that is affixed to the exterior of the external device.

A housing which affixes one or more second carrier platters into a common base and has a corresponding number of center shafts which allows for the corresponding number of first carrier platters to rotate concentrically A housing which affixes one or more second carrier platters into a common base and has either an integrated or separate housing which provides perimeter concentric rotation o the corresponding first carrier platters.

Plating and Coating Means. Various coating and or surface plating's of the pole conduits or carrier platters may be used to enhance the product performance based on the intended application. As most magnetically soft steel oxidizes readily, a coating or plating is often necessary to protect the apparatus from corrosion. Several coatings have been identified in that they not only offer enhanced corrosion resistance, but they can also affect product performance in terms of shear force, breakaway strength, and electrical performance among other variables. As an example, black oxide coatings provide for an improvement in the ability for the magnetic field to conduct from adjacent core elements to each other and for the ability of the magnetic field to conduct to the work surface, thereby increasing breakaway force and subsequently shear force between the apparatus and the work surface. Titanium nitride coatings and their variants are often used to reduce friction on cutting tools. When used on the work surface contact area of the apparatus, the coating can dramatically increase the shear force performance of the apparatus; that is, the force to make the apparatus slide along a target. Copper, silver, gold and other highly conductive plating materials can be used to improve electrical conductivity of the apparatus when used in electrical applications. The use of these and other coating and plating methods such as zinc plating, copper plating, nickel plating, plasma coating (by way of example and not limitation), are expected and their use is anticipated based on the desired application for the apparatus.

Encapsulation Means. Encapsulation of the exterior of the apparatus can provide magnetic isolation of the exterior of the apparatus to avoid inadvertent attraction of ferrous debris during use. Encapsulation can also be used to provide electrical insulation or isolation of the product when used in areas having live exposed electrical contacts. Depending on the encapsulation method and material, corrosion resistance may also be enhanced. Encapsulation may be done at the carrier platter assembly level, at the apparatus level, core element level, magnet level, or around the exterior housing. Materials for encapsulation include but are not restricted to; thermoplastics, phenolics, epoxies, resins, rubber, synthetic or manmade materials.

Housing Configurations

Housings are traditionally used to contain and provide structure to carry one or more carrier platters. Since the carrier platters are a single piece construction (with attached or pressed-in core elements) and generally do not require a structural enclosure, housings can be used for dramatically different purposes. Housings can incorporate, by way of example and not limitation, actuation features, rotation limiting features, sensors, indicators, shielding, containment, external attachment or mounting features, increased structure, containment of multiple arrays in the same plane or different angles, and application environment protection. Furthermore, one or more carrier platters can be incorporated into a housing by incorporating final design shapes and mounting points into the housing. FIG. 26 depicts one possible configuration of an integrated carrier platter housing which serves as a combined housing and carrier platter assembly.

Figure 27:
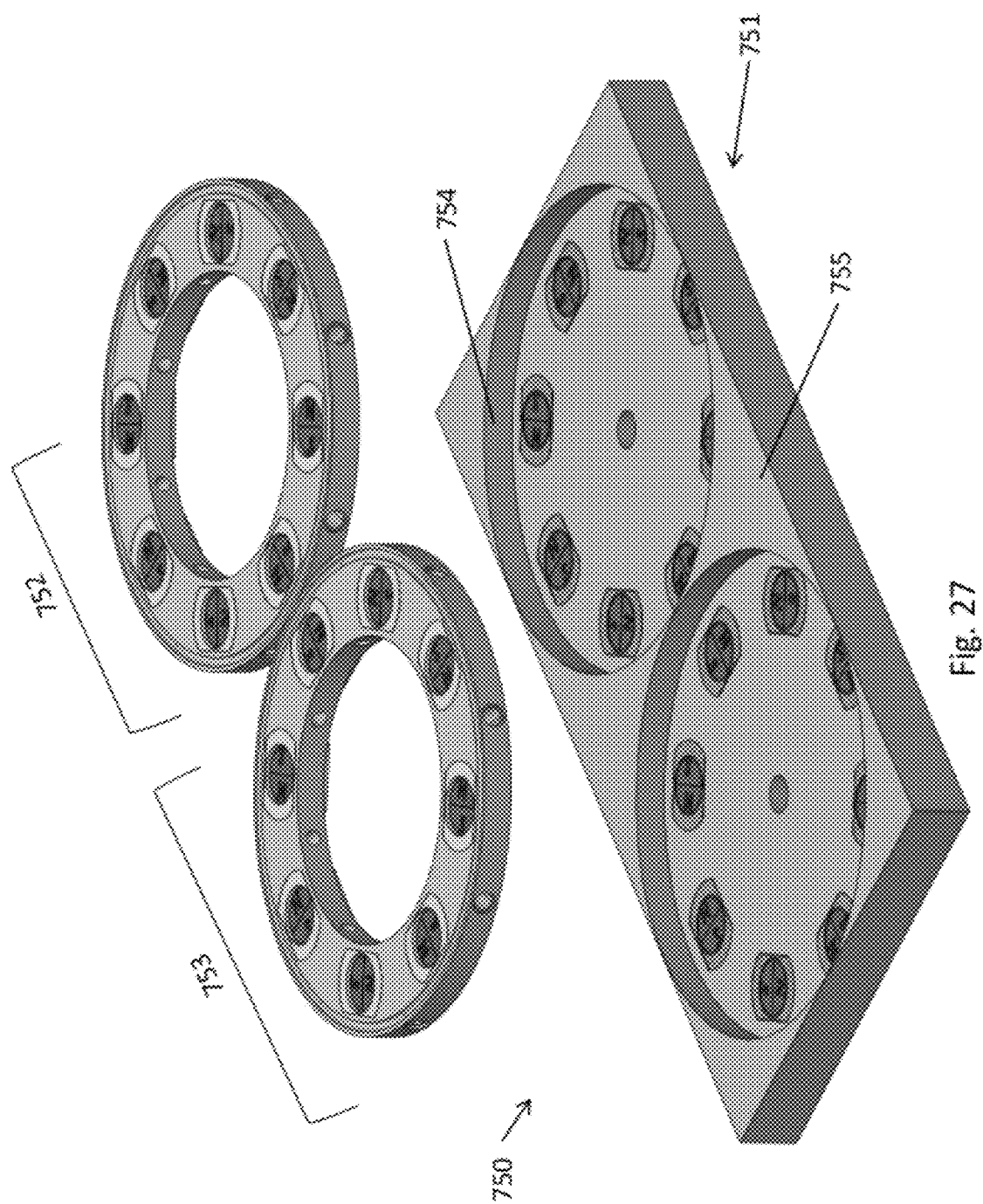
FIG. 27 is an oblique partially exploded view of a single layer array of nonferrous carrier platter assemblies featuring a nonferrous integrated carrier platter housing assembly integrating two carrier platter assemblies affixed therein and further comprising a different shape than that of two corresponding rotatable carrier platter assemblies. The nonferrous integrated carrier platter housing assembly serves as a combined housing for an array of multiple rotatable carrier platter assemblies.

A single housing may be comprised of one or more carrier platters. FIG. 27 depicts an exemplar housing comprised of two carrier platter assemblies integrated into a single housing. This integrated carrier platter assembly need not be comprised of carrier platters identical in shape, size, or the number of pole conduits. It may be comprised of more than two carrier platter assemblies.

Figure 28:
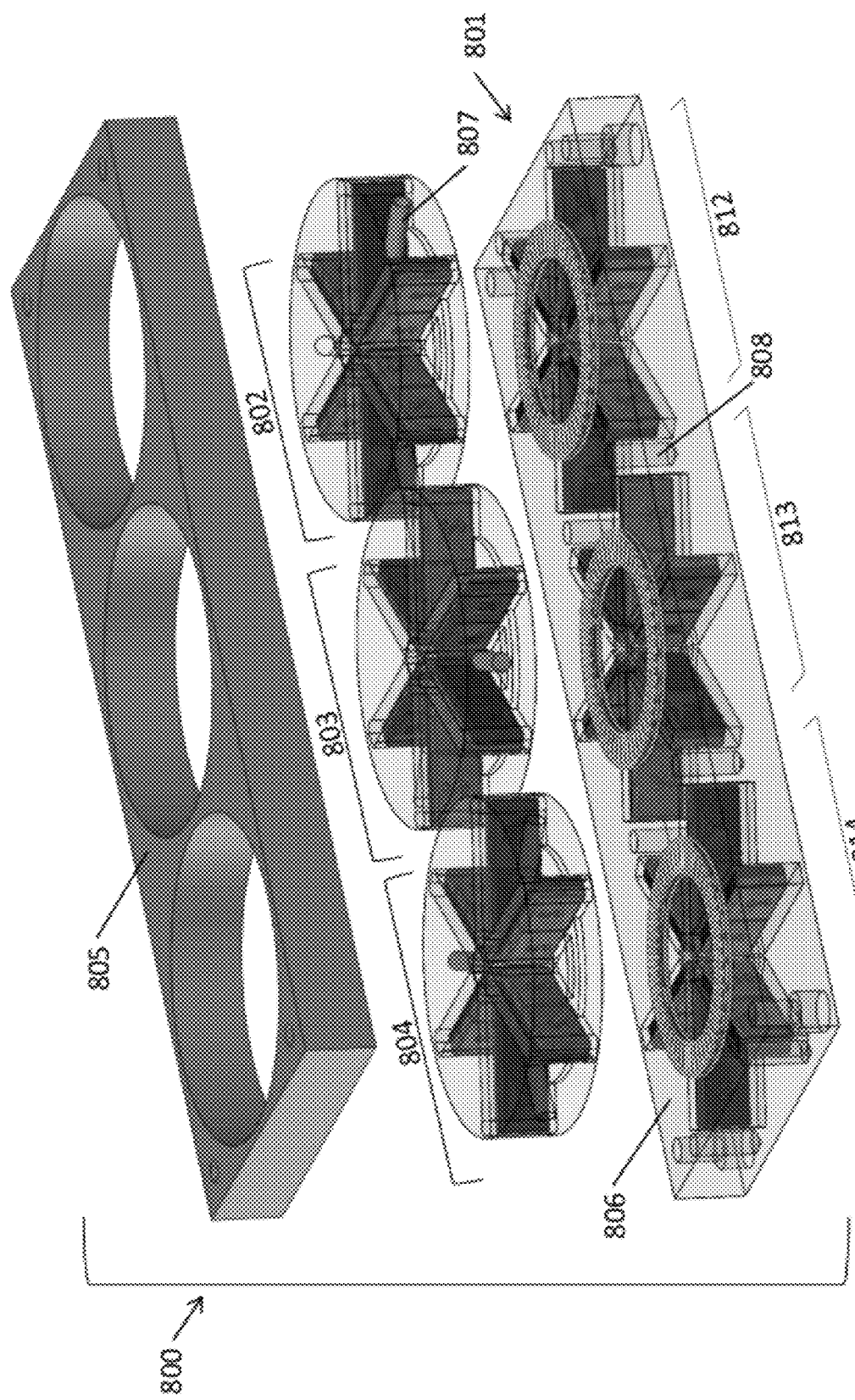
FIG. 28 is an oblique partially exploded view of a single layer array of ferrous carrier platter assemblies featuring an upper portion of the layer comprised of a rotatable platter housing with multiple rotatable carrier platter assemblies inset therein and a lower portion of the layer comprised of a ferrous integrated carrier platter housing assembly. The ferrous integrated carrier platter housing assembly integrates multiple carrier platter assemblies therein.

A first integrated carrier platter assembly comprised of multiple carrier platter assemblies in a first housing may be combined with multiple carrier platter assemblies that are separate or combined into their own integrated carrier platter assembly, as depicted in FIG. 28. This FIG. 28 illustrates a first integrated carrier platter assembly affixed in a housing combined with a corresponding number of rotatable carrier platter assemblies inset into a housing. Finally, more than two layers of one or more integrated carrier platter assemblies may be employed in a single integrated housing or in more than two separate housings. See FIG. 29.

With this invention a rotary switchable magnetic core element can be configured to do considerably more. The following housing integration uses, by way of example and not limitation, are a small fraction of the possibilities available: Welding ground clamps, woodworking feather-boards, magnetic drills, metal holding fixtures, magnetic tables, jigs, angle vises, emergency lighting, smoke detectors, manhole lifters, magnetic locks, electric door locks and latches, armor attachment, camera mounts, dial indicator stands and even refrigerator magnets. The housing may include provisions that allow the mounting of an array of two or more magnetic core element carrier platter assemblies with either a common actuation point or individual actuation points.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. All examples provided are without limitation, whether or not specifically provided for without limitation. The invention should therefore not be limited by the above described embodiments, methods, and examples, but by all embodiments and methods within the scope and spirit of the invention.

Applying the Above Steps

The above steps are now applied to the following example. Assume that the objective for the purposes of this example is to lift injection molding dies without having to attach eye-hooks or attachment points. The injection molding dies weigh up to 500 pounds and have a footprint of 6" deep by 16" wide and 16" tall. To keep proper orientation, the dies need to have an RSM attach to the top surface of the die, which is 6" deep×16" wide. The ranges of dies show that cavity features within the die stop about 0.5 inches for the top surface. This design and operational data thus far, describes the target sufficiently well enough to narrow the RSM design to:

1). 1500 lb breakaway force requirement, defined by the maximum weight of 500 lbs with a 3:1 factory of safety.

2). A magnetic field depth of 0.5 inches or less, and a maximum diameter of 6 inches (6"×16" top surface). Assume that the RSM has 0.5" thick deep field penetration.

3). Carrier Platter less than 6" in diameter.

Given the above requirements, a simple two carrier platter design is adequate as only the top surface of the target must be gripped. The carrier platters should be sufficiently rigid as to minimize flexing. A factor of safety of three times the maximum weight of die is prudent. Note: Higher factors of safety may be required depending upon environmental surroundings (overhead, public use, etc.). A ferrous core-element platter design is selected to maximize magnetic grip while minimizing cost. The "shared" ferrous core element platter design and concept is described further in Pole Conduit Matching below.

The length of the magnet must be less than the radius of the carrier platter. In this case, a selection of a magnet with a length of 2.5" allows it to remain within the 6" carrier platter diameter while allowing for a center shaft around which carrier platters can rotate. A pole face area of 1"×2.5"=2.5 square inches is now defined. This is the pole conduit work surface or the target contact area. Knowing that magnet length Lm is approximately equal to the magnetic field depth, a magnet with Lm=0.5 inches is optimal. As this magnet size is not readily available, we can select a combination of magnets which when combined would be the equivalent size. For this example, five magnets with dimensions of 1"×0.5"×0.5" where Lm=0.5" are adequate. The combination of multiple smaller magnets combined to form an effective single larger magnet of equivalent size, will be referred to as a "Magnet".

The number of Magnets located within the platter as well as actuation angle can now be determined. An evaluation of a four Magnet platter with Lm=0.5" (given a 2.5"×1"×0.5" permanent magnet) has a total permanent magnet pole surface area of 2.5 sq inches. Combine the adjacent like poles each with an area of 2.5" inches for a total of 5 sq inches and multiply by a 0.75 factor to get an optimal pole conduit surface area of 3.75 square inches. The total area of a 6 inch diameter platter is πD squared/4, less the area of the magnets 4×0.5"×2.5" and less the area of a center of rotation (about 0.5 square inches), yields 22.7 square inches. Dividing 22.7 square inches by four permanent Magnets yields a value of 5.7 sq. inches of pole conduit surface area, instead of the optimal 3.75 square inches. A four Magnet design is thus not ideal.

A six Magnet configuration is now evaluated. In order to accommodate 6 Magnets with Lm=0.5", a minimum center rotation diameter over 0.75" is required. Unfortunately this limits the Magnet length to less than 2.5 inches. A permanent Magnet of 1"×2.0"×0.5" (Lm=0.5") is selected. A calculation of the permanent magnet pole surface area indicates a total of 4 square inches between the adjacent like poles. Multiplying by the optimal 0.75 factor, an optimal pole conduit surface area of 3 square inches is required. Calculating the actual area of the platter, as describe above yields approximately 3.35 square inches of pole conduit surface area. The actual factor is 0.8375, 3.35 square inches (pole conduit area)/4 square inches (permanent magnet pole surface area). This is much closer to the optimal.

An eight permanent Magnet configuration, with Lm=0.5", requires a minimum center rotation diameter over 0.875". This configuration limits the Magnet length to less than 2.5 inches, so we select a permanent Magnet of 1"×2.0"×0.5" (Lm=0.5"). A calculation of the permanent magnet pole surface area indicates a total of 4 square inches between adjacent like poles. Multiplying by the optimal 0.75 factor gives an optimal pole conduit surface area of 3 square inches. Calculating the actual area of the pole conduits, as describe above yields approximately 2.5 square inches, less than the ideal ratio of 0.75. The actual factor is 0.62 (2.5 square inches pole conduit area/4 square inches permanent magnet pole surface area). This is closer to optimal. However, since the 8 permanent Magnet configuration dropped below the desired ratio, this configuration will not deactivate completely.

A 6 Magnet configuration is selected as it is relatively close to our desired ratio of 0.75. Further optimization is possible by reducing the Diameter of the platter to 5.75 inches. This yields a pole conduit surface area of 3.03 square inches, or a factor of approximately 0.76.

Most magnet suppliers identify the breakaway performance of magnets by magnet grade and size. Using this data or a readily available magnet calculator, an N42 Magnet with a 1"×2.0" pole face and Lm=0.5 inches is rated at 4×37.4 lbs=148 lbs. Note that current magnet calculators show that a single N42 magnet with dimensions of 1"×2.0"×0.5" (Lm=0.5") has a pull force of about 75 lbs, about ½ the pull force of the individuals. Data for a Magnet of equivalent size 0.5"×1"×2.0" with Lm=2.0 shows a pull force off of steel at 150 lbs. Using the data from the 4 individual magnets that are 0.5"×0.5"×1" Lm=1", shows 50 lbs of pull force per Magnet or 4×50 lbs=200 lbs total combined pull force. Depending upon the permanent magnet configuration and orientation selected, a range of 75 lbs to 200 lbs pull force is expected. The best estimate for performance, using a shared pole conduit configuration, is to use the highest pull force per magnet size irrespective of Lm length. This is primarily due to the influence of the pole conduits in redirecting the combined fields to a more effective direction.

Since there are 6 permanent Magnets in each carrier platter and two carrier platters (12 total Magnets), a breakaway force of 2400 lbs (12×200 lbs) is expected with this method (well in excess of the 1500 lb design criteria). It is important to note, that with the RSM shared pole conduit configuration, the pull force is often higher than the total sum of the individual magnets (2400 lbs). Performance should be verified after constructing the RSM.

Having calculated the performance of the RSM at over 2400 lbs, a friction reducing means must now be considered. Internal forces between the upper and lower carrier platters are substantial and easily in excess of 3000 lbs. Having 6 shared pole conduits, each with an area of approximately 3 square inches, the "friction reducing means" must be capable of supporting about 170 psi (3000 lbs/18 square inches). Depending on the number of activation and deactivation cycles anticipated over the expected life of the product, a friction reducing means can be selected. PTFE has a yield strength of approximately 400 psi; however its tear strength is considerably lower. In order to accommodate PTFE's properties, the surface between the upper and lower carrier platter assemblies must be very smooth to avoid tearing the PTFE during rotation of the upper carrier platter assembly. It is determined that a low profile roller thrust bearing is more suitable for this application. A rating of 4000 lbs is selected and integrated between the upper and lower carrier platter assembly. This will also reduce the actuation force substantially due to the reduced coefficient of friction over the PTFE layer.

A housing configuration, if required, must now be determined. A nonferrous shaft of up to 0.875" diameter attached to the lower carrier platter can be used as a main attachment feature to a hook or other lifting device. Alternatively, a housing can be attached to the exterior perimeter of the lower carrier platter. Consideration must be given to the platter, as a substantial amount of material was removed to accommodate the permanent magnets weakening its structure. A stress analysis must be performed on the lower carrier platter to assure that the breakaway force does not cause the lower carrier platter to flex excessively. If the objects to be lifted are known to not exceed 500 lbs, then the stress analysis can be performed using that number along with a desired factor of safety. If the use of the RSM is not limited to a specific weight, the maximum breakaway performance should be used to determine if an additional support structure is needed to accommodate the anticipated breakaway force. In the above example, it is determined that an external housing is unnecessary since a structural analysis indicates that the RMS configuration can accommodate a breakaway force greater than 1500 lbs (structural analysis calculation is not shown here).

Other considerations for the housing include items such as limiting residual magnetic field from the upper carrier platter and the environment that the RSM will be subjected to. In the injection molding house, it is determined that there is very little air-borne ferrous debris and the relatively small residual magnetic field emanating from the upper carrier platter assembly will not have a negative impact.

DETAILED DESCRIPTION OF THE DRAWINGS

The RSM provides for modular designs that are compact and comprised of two or more carrier platters with two or more core elements per carrier platter. The arrangement of carrier platters, comprised of relatively thin matched core elements contained within each carrier platter, provides for a variable angle, switchable (ON, OFF), high magnetic flux density device. In the ON position the magnetic fields emanating from the device are activated so that it will attract a target. In the OFF position the magnetic fields emanating from the device are deactivated so that it will not attract a target. The RSM provides for intermediate positions between ON and OFF wherein the magnetic fields emanating from the device are partially activated or deactivated.

The modular holding device comprises two or more geometrically similar carrier platters of interchangeable core elements. FIGS. 9A through 9G show several possible arrangements of pole conduits matched to permanent magnets by example and not by way of limitation.

FIGS. 9A and 9B demonstrate the highly flexible nature of the invention's architecture. The figures depict core element 200 comprised of magnetically soft matched south and north pole conduits 201a and 201b respectively, affixed to a permanent magnet group 206 that are all the same physical length and magnetic length Lm, contained within optional nonferrous holder 202. The combined south pole magnet faces of permanent magnet group 206 are affixed to the vertical face 204a of south pole conduit 201a thereby defining south pole conduit 201a as a "south pole conduit." Similarly, the combined north pole magnet faces of the permanent magnet group 206, opposite the south pole magnet face 203a are affixed to north pole conduit magnet face 204b thereby defining north pole conduit 201b as a "north pole conduit." The south pole surface area 205 (cross hatched) of south pole conduit 201a is ideally 75% of the permanent magnet groups 206 south pole magnet face 203a area (as noted above, the Pole Surface Ratio of the Conduit). In larger applications (largest magnet over 20 mm thick), substituting a plurality of magnets with a single larger magnet, while possible, is often more costly and not as desirable. The performance of a plurality of permanent magnets, equal to the same volume, often exceeds the performance of a single larger magnet due to the magnetizing inefficiencies described earlier. Substitution of permanent magnet group 206 with a longer magnetic length Lm as depicted in FIG. 9B does not alter the Pole Surface Ratio of the Conduit.

As an example, assume that all of the magnets depicted in FIG. 9B have a magnetic length Lm of 40 mm long. The south and north pole conduit surface areas 205a and 205b respectively, remain the same whether Lm is 10 mm or 50 mm long. While the optimal Pole Surface Ratio of the Conduit is identified here as 75%, variations in permeability of the materials used for the pole conduits and magnet geometries can impact the optimal Pole Surface Ratio of the Conduit. New configurations should be verified by ensuring that out-of-phase core elements properly deactivate the pole conduits.

Figure 9D:
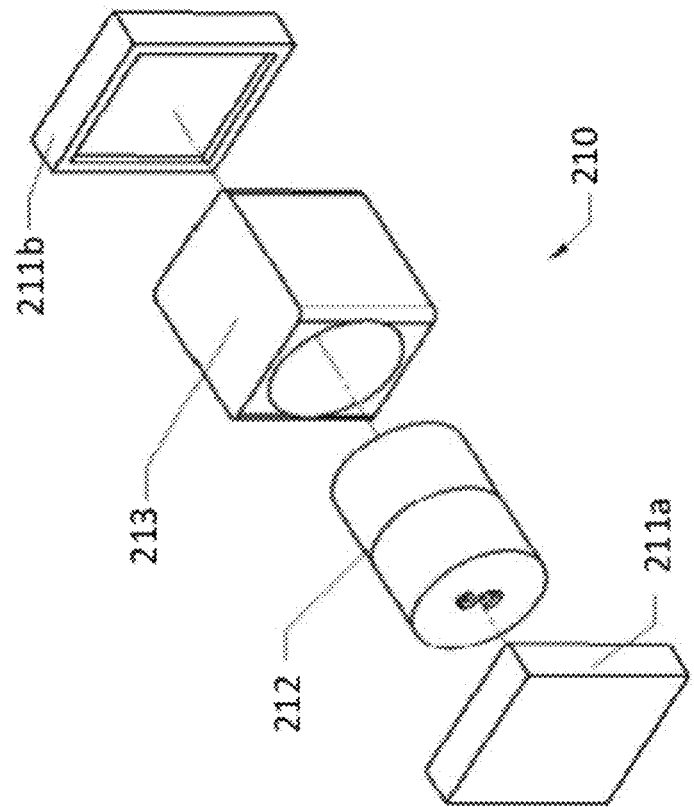
FIG. 9D is an oblique exploded view of the embodiment depicted in FIG. 9C.
Figure 9C:
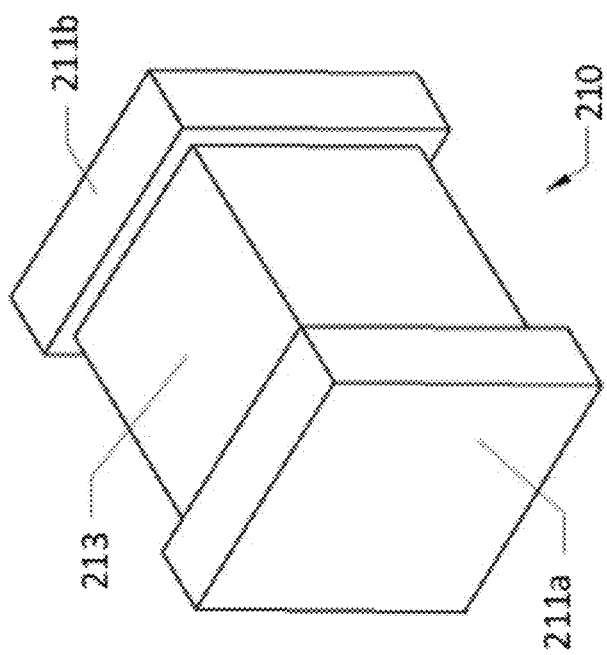
FIG. 9C is an oblique view of a core element, comprising a nonferrous holder and rectangular shaped pole conduits for use with nonferrous carrier platters.

FIGS. 9C and 9D depict a core element 210 that is effectively bar-shaped. The depicted device is comprised of permanent magnet 212, cylindrical in shape affixed to south pole conduit 211a and north pole conduit 211b with the cylindrical magnet encased in a protective optional nonferrous holder 213. This core element is another example of the flexible architecture of the invention in that virtually any shape of magnet may have its respective magnetic field contained and redirected into virtually any shape of pole conduit.

Figure 9F:
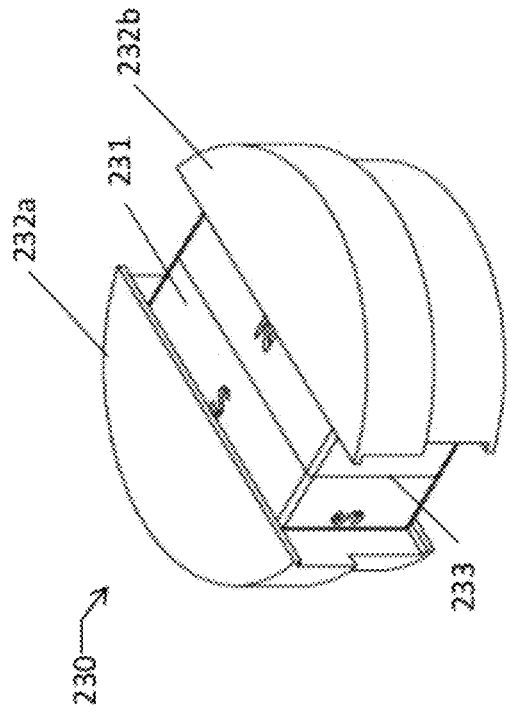
FIG. 9F is an oblique view of a core element, comprising bar shaped permanent magnets and two semi-cylindrical shaped pole conduits for use with nonferrous carrier platters.
Figure 9H:
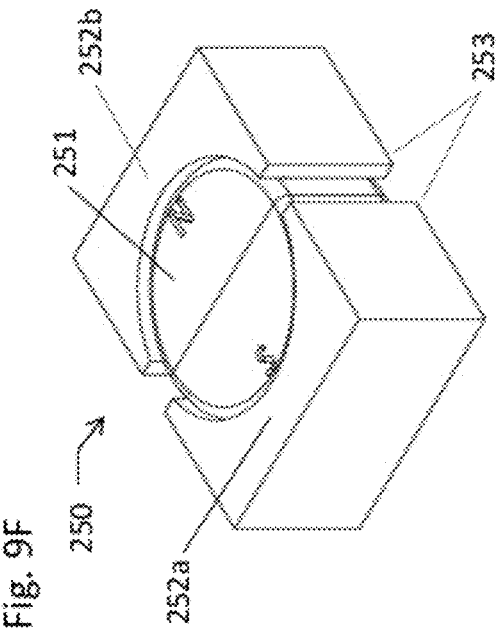
FIG. 9H is an oblique view of a single core element comprising a diametrically polarized disc shaped permanent magnet and two bar shaped pole conduits for use with nonferrous carrier platters.
Figure 9E:
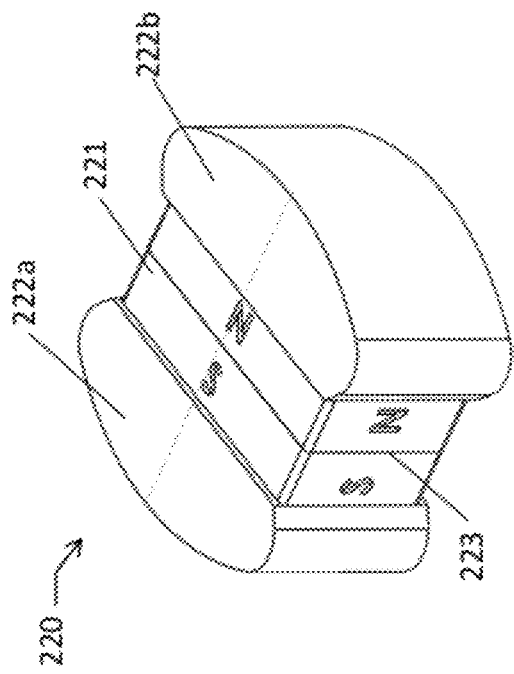
FIG. 9E is an oblique view of a core element, comprising a bar shaped permanent magnet and two elliptical shaped pole conduits for use with nonferrous carrier platters.

FIGS. 9E and 9F depict core elements 220 and 230. The embodiments show examples of two different pole conduit shapes (222a, 222b and 232a, 232b) that may be used with just one shape of permanent magnet 221 and 231 with permanent magnet field line 223 and 233 isolated from the south pole conduits 222a and 232a and the north pole conduits 222b and 232b. FIG. 9E has south pole conduit 222a and north pole conduit 222b shaped to maximize the magnetic performance. The curved shape attempts to mimic the magnetic field strength and shape emanating from the permanent magnets pole surface. FIG. 9F has south pole conduit 232a and north pole conduit 232b which are semi-circular in shape, designed for easy retention into a carrier platter and uses a circular shape for quicker production using standard hole or drill sizes in the carrier platter.

Figure 9G:
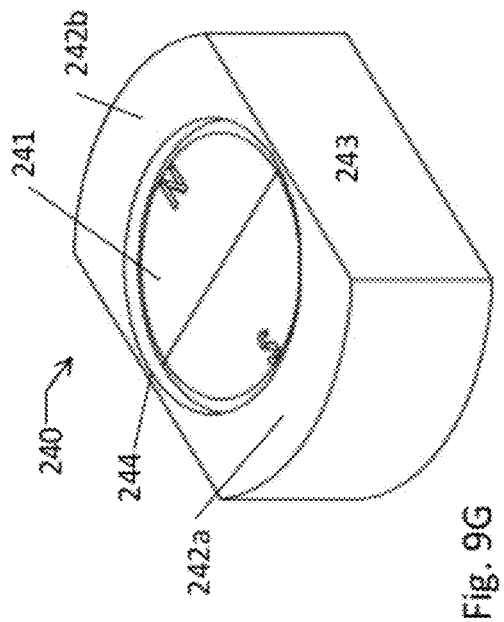
FIG. 9G is an oblique view of a single core element, comprising a diametrically polarized disc shaped permanent magnet, and a single piece housing, known as a "Double D" shape that functions as two separate pole conduits, for use with nonferrous carrier platters.

FIGS. 9G and 9H provide examples of core elements 240 and 250 that use permanent magnets 241 and 251 having a diametrically polarized disc shaped. FIG. 9G is a single piece housing 243 which incorporates south pole conduit 242a and north pole conduit 242b. The single pieces housing 243 functions essentially the same as if it had separate pole conduits. This is possible by making the material adjacent to the permanent magnet field line 244 very thin and therefore incapable of providing an effective magnetic coupling between south pole conduits 242a and north pole conduit 242b. FIG. 9G also provides for a circular shape that compromises between a magnetic field optimal pole conduit shape, (which is often elliptical in shape) and economic considerations. By using this shape, integration into a carrier platter can be facilitated by simply drilling or machining a hole of the same diameter into the platter. The cavities perpendicular to the material adjacent to the permanent magnet field line 244 can optionally be filled in with any nonferrous material. FIG. 9H depicts a similar south pole conduit 252a and north pole conduit 252b to that of FIG. 9G; however, in this case a rectangular shape can be used if the final design requires a right angled edge feature for guidance or material support. Gap 253 eliminates most or all potential magnetic coupling between south pole conduit 252a and north pole conduit 252b.

FIG. 10 depicts a carrier platter assembly 300 comprising a nonferrous carrier platter 301 with integrated features to capture or retain the eight core elements one of which is depicted by 307 of the type described in FIG. 9F. Each core element 307 has its permanent magnet field line 304 oriented radially with respect to the carrier platter's center of rotation, and has south pole conduit 302a oriented in the direction of an adjacent core element's south pole conduit 306a and north pole conduit 302b oriented in the direction of an adjacent core elements north pole conduit 305b; that is, the orientation of the core elements are north-north/south-south/north-north/south-south. Attachment features 303 and 308 are integrated into the carrier platter.

Figure 11:
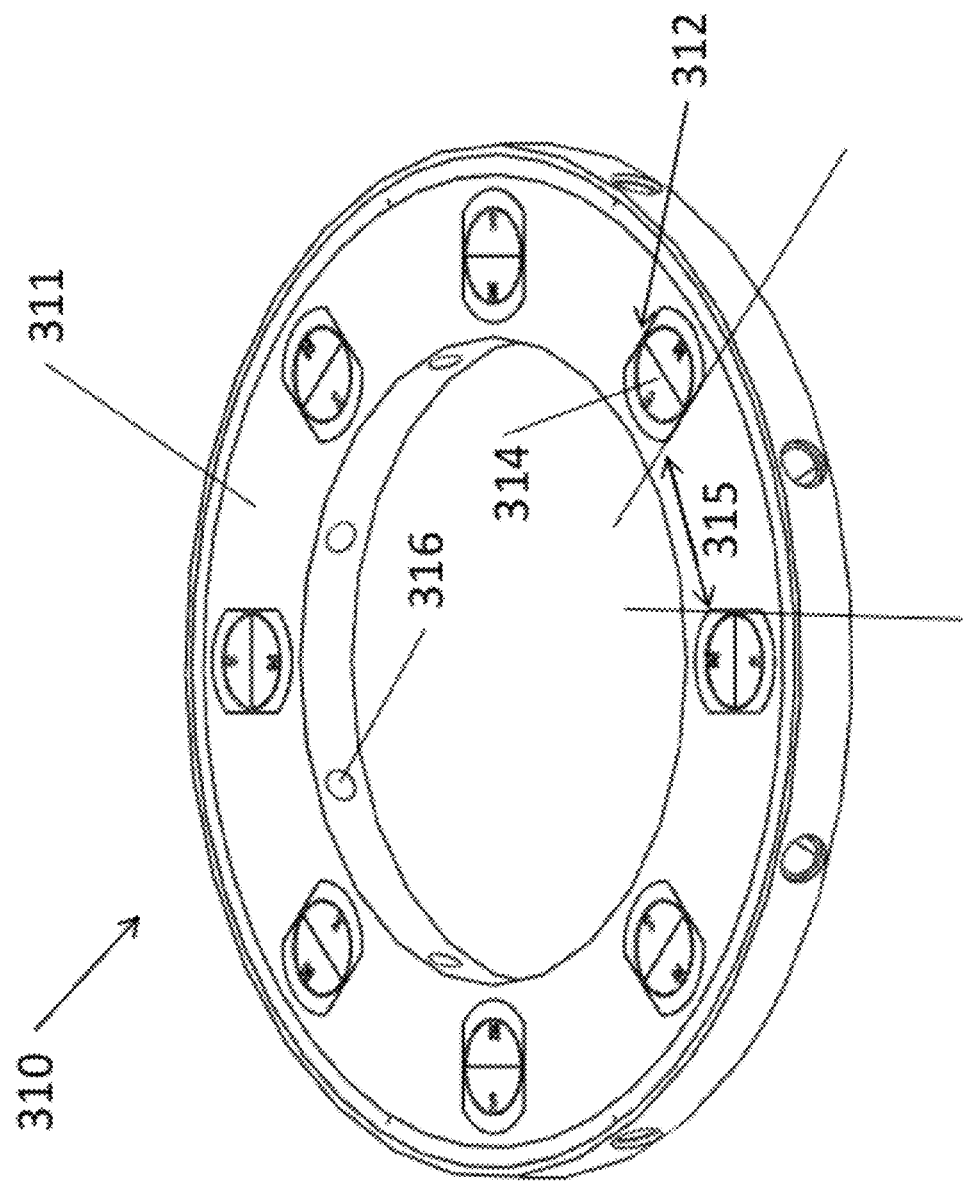
FIG. 11 is an oblique view of a nonferrous carrier platter assembly comprising a nonferrous carrier platter containing eight core elements of the configuration shown in FIG. 9G oriented with their permanent magnet field line perpendicular to the center of the carrier platter.

FIG. 11, a carrier platter assembly 310, comprises a nonferrous carrier platter 311 with integrated features to capture or retain the eight core elements one of which is depicted by 312 of the type described in FIG. 9G. Each core element 312 has its permanent magnet field line 314 oriented circumferentially with respect to the carrier platter's center of rotation and has adjacent core elements magnetic field poles, oriented in opposite direction so that the permanent magnets' north or south pole faces along the outer diameter have an alternating arrangement; that is, north/south-north/south. An important consideration when using this core element arrangement is to ensure that the spacing between opposite magnetic poles 315 is sufficient to avoid a substantial interaction which would degrade the performance of the core element. A minimum separation distance of the magnetic length of the permanent magnet or magnets (distance between the magnetic pole faces), or in this case the diameter of the magnet, is usually adequate.

Figure 12:
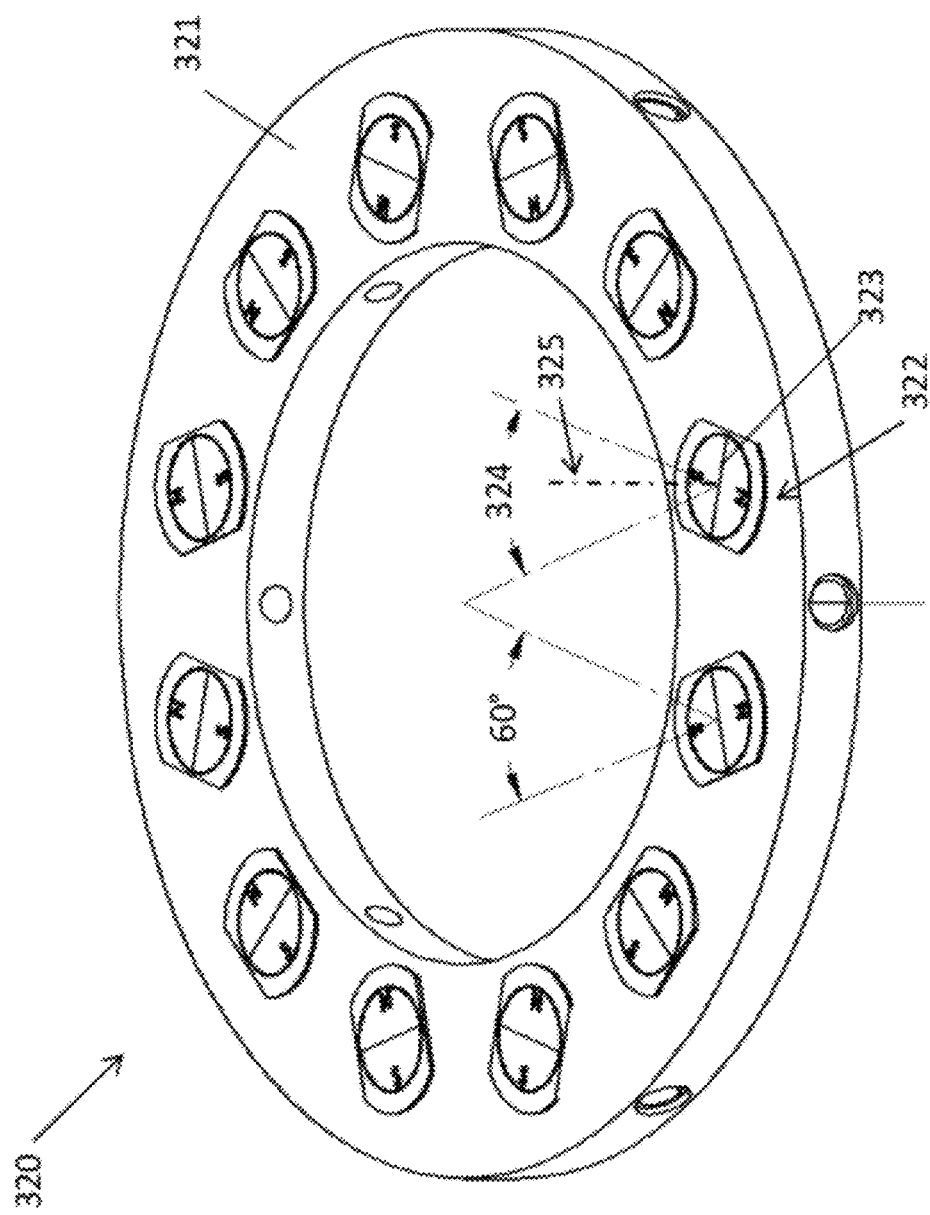
FIG. 12 is an oblique view of a nonferrous carrier platter assembly comprising nonferrous carrier platter containing 12 core elements of the configuration shown in FIG. 9G with each core element rotated 60° about its center with respect to an adjacent core element.

FIG. 12, a carrier platter assembly 320, comprises a nonferrous carrier platter 321 with integrated features to capture or retain 12 core elements 322 of the type described in FIG. 9G. Each core element 322 has its permanent magnet field line 323 oriented with a predetermined angle 324 defined by the number of core elements in the platter (in this example 12), and the number of revolutions the core elements rotate about their own axis 325 in the platter, in this example two revolutions or 720°. This provides us the precise relative rotation angle each magnet must be oriented, in this case 720°/12=60°. This configuration results in every core element having a respective 60° rotational shift between left and right adjacent core elements. As with the platter arrangement defined in FIG. 11, an important consideration when using this core element arrangement is to ensure that the spacing between opposite magnetic poles is sufficient to avoid a substantial interaction which would degrade the performance of the core element. A minimum separation distance of the magnetic length of the permanent magnet or magnets (distance between the magnetic pole faces), or in this case the diameter of the magnet, is usually adequate.

Figure 13:
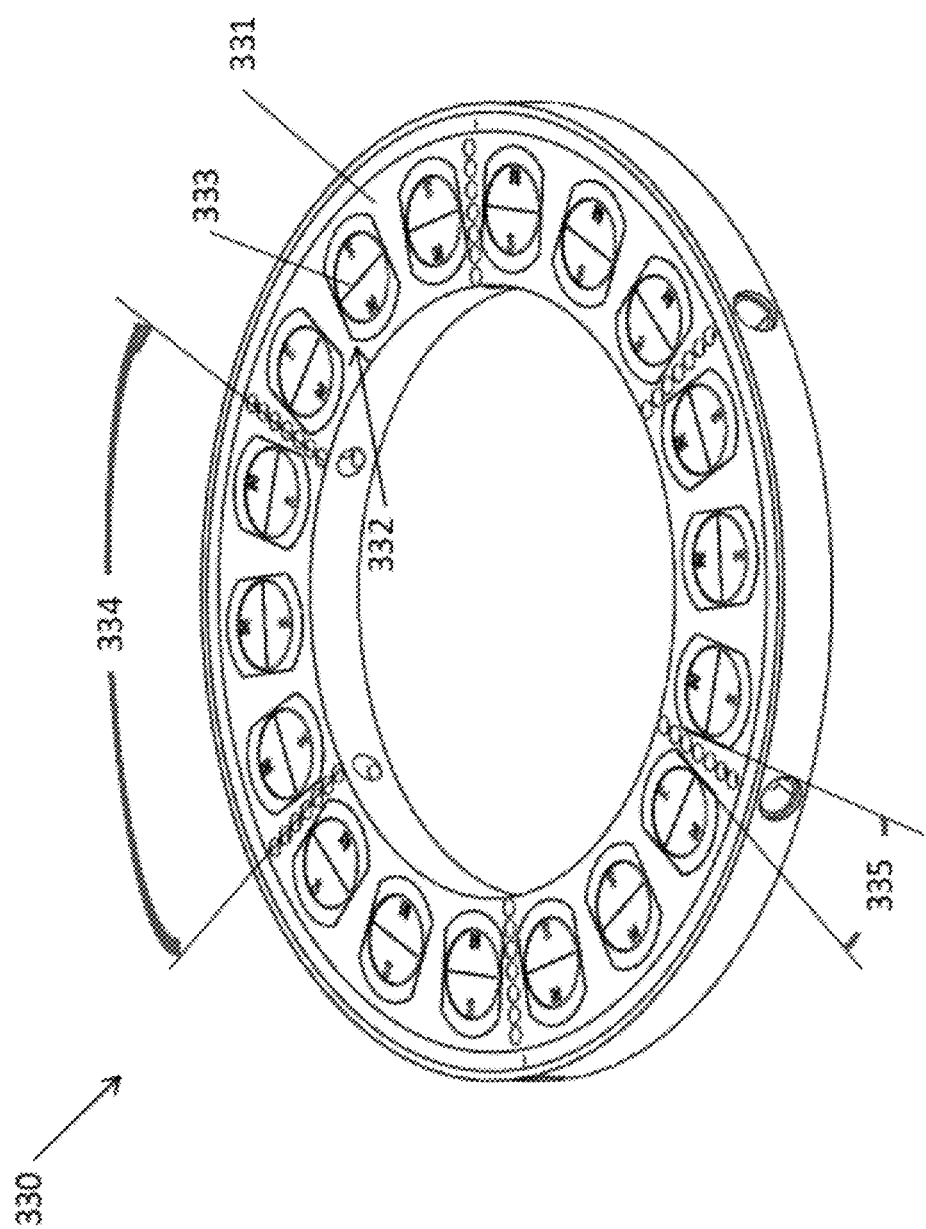
FIG. 13 is an oblique view of a nonferrous carrier platter assembly comprising a nonferrous carrier platter containing 18 core elements of the configuration shown in FIG. 9G oriented such that the magnetic poles alternate their orientation every three adjacent core elements.

FIG. 13, a carrier platter assembly 330, comprises a single piece nonferrous carrier platter 331 with integrated features to capture or retain the 18 core elements one of which is depicted by 332 of the type described in FIG. 9G. Each core element 332 has its permanent magnet field line 333 oriented circumferentially with respect to the platter. North and south magnetic poles of the permanent magnets alternate their orientation at a predetermined interval, the number of core elements in the platter being equal to the desired actuation angle and the number of like magnetic pole adjacent core elements. In this example, it is desired to have an alternating core element pattern every three core elements with an actuation angle of 120°. The actuation angle contains an equal number of alternating magnetic pole core elements followed by an equal number of core elements aligned out-of-phase (three with the north pole facing outward next to three with the south pole facing outward). If there are six core elements located every 120°, a total of 6×3 (360°/120°) or 18 core elements are required in a carrier platter. The actuation angle must be a divisible integer of 360° (1, 2, 3, 4, 5, 6 etc.). As with the platter arrangement defined in FIGS. 11 and 12, an important consideration when using this core element arrangement is to ensure that the space between opposite magnetic poles 335 is sufficient to avoid a substantial interaction which would degrade the performance of the core element. Space between opposite magnetic poles 335 is shown as a group of isolation holes between opposite magnetic poles only for clarity. In a nonferrous carrier platter 331, the isolation holes are not needed. Tithe platter were ferrous, the actuation angle 334 would have the isolation holes present to avoid short circuiting the opposite magnetic poles.

Figure 14:
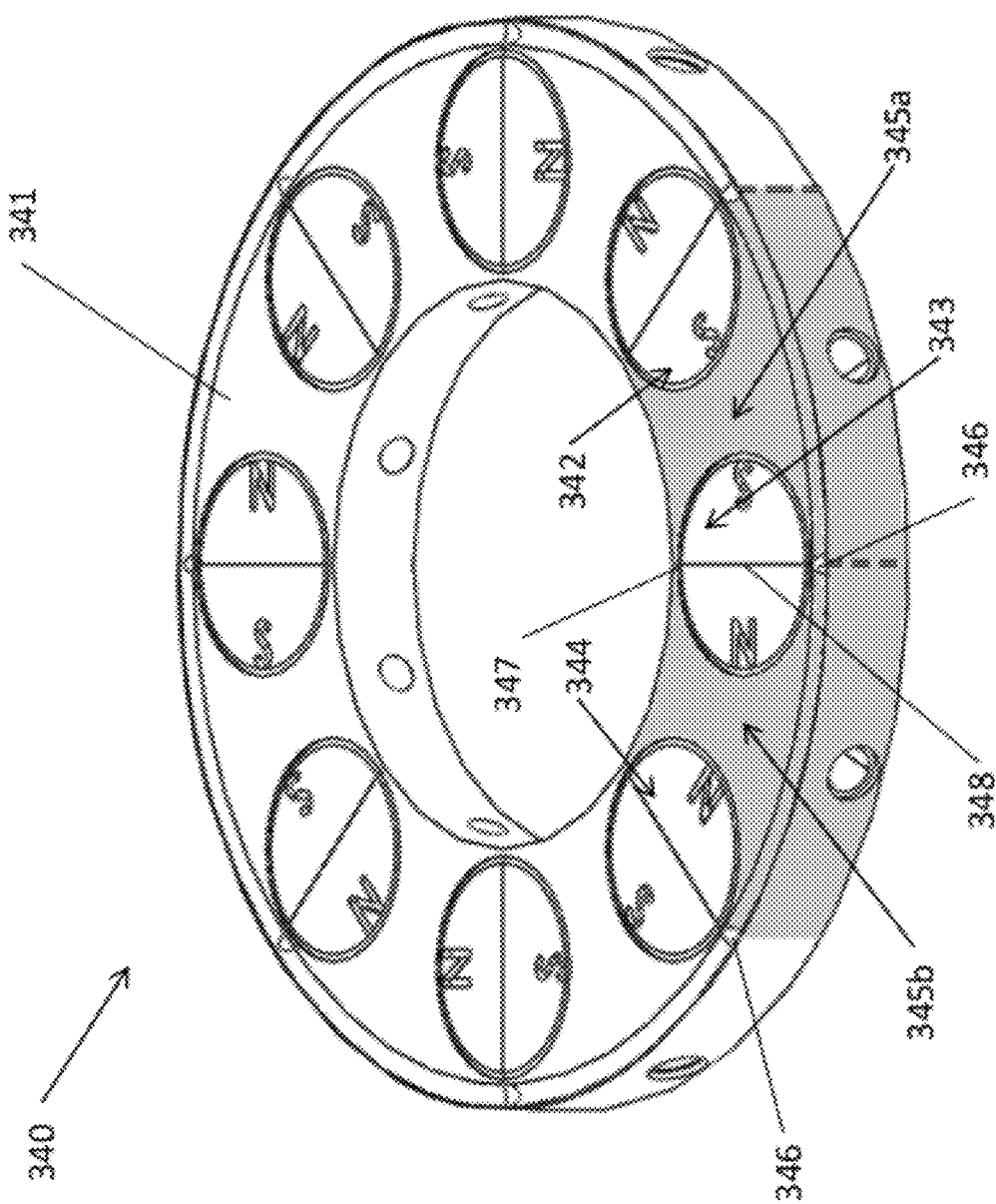
FIG. 14 is an oblique view of a ferrous carrier platter assembly comprising a ferrous carrier platter geometrically similar to the nonferrous carrier platter set forth in FIG. 10 except that the eight core elements shown in FIG. 10 are replaced by eight permanent magnets and the two pole conduits of each core element are an integral part of the ferrous carrier platter, shared between like magnetic poles of adjacent permanent magnets.

FIG. 14, a carrier platter assembly 340, consists of a single piece ferrous carrier platter 341 with integrated features to capture or retain 8 diametrically polarized permanent magnets, three of which are designated 342, 343, and 344. The magnets are oriented such that like poles of adjacent magnets are facing each other. Shared north pole conduit 345*b* and shared south pole conduit 345*a* are created by having material 346 and 347 adjacent to the permanent magnet field line 348 minimized to isolate opposing polarity magnetic fields along the permanent magnet field line 348. The area of the "shared" pole conduits are defined in the same fashion as when defining individual pole conduits. Note that the area of the "shared" north pole conduit 345*b* and shared south pole conduit 345*a* must now use the magnetic pole surface area of two adjacent permanent magnets when determining the appropriate spacing between permanent magnets. In doing so, a core element is effectively half the area of shared north pole conduit 345*b* and half the area of the shared south pole conduit 345*a* and a permanent magnet 342 magnetically matched in the method prescribed. Functionality of carrier platter assembly 340 is similar to the functionality of carrier platter assembly 300 described in FIG. 10, though carrier platter assembly 340 contains significantly fewer components compared to carrier platter assembly 300 and is considerably stronger in a smaller footprint. Advantages of carrier platter assembly 300 are primarily weight reduction, large footprint for stability and a shallower magnetic depth of field more suitable for thin materials.

Figure 15:
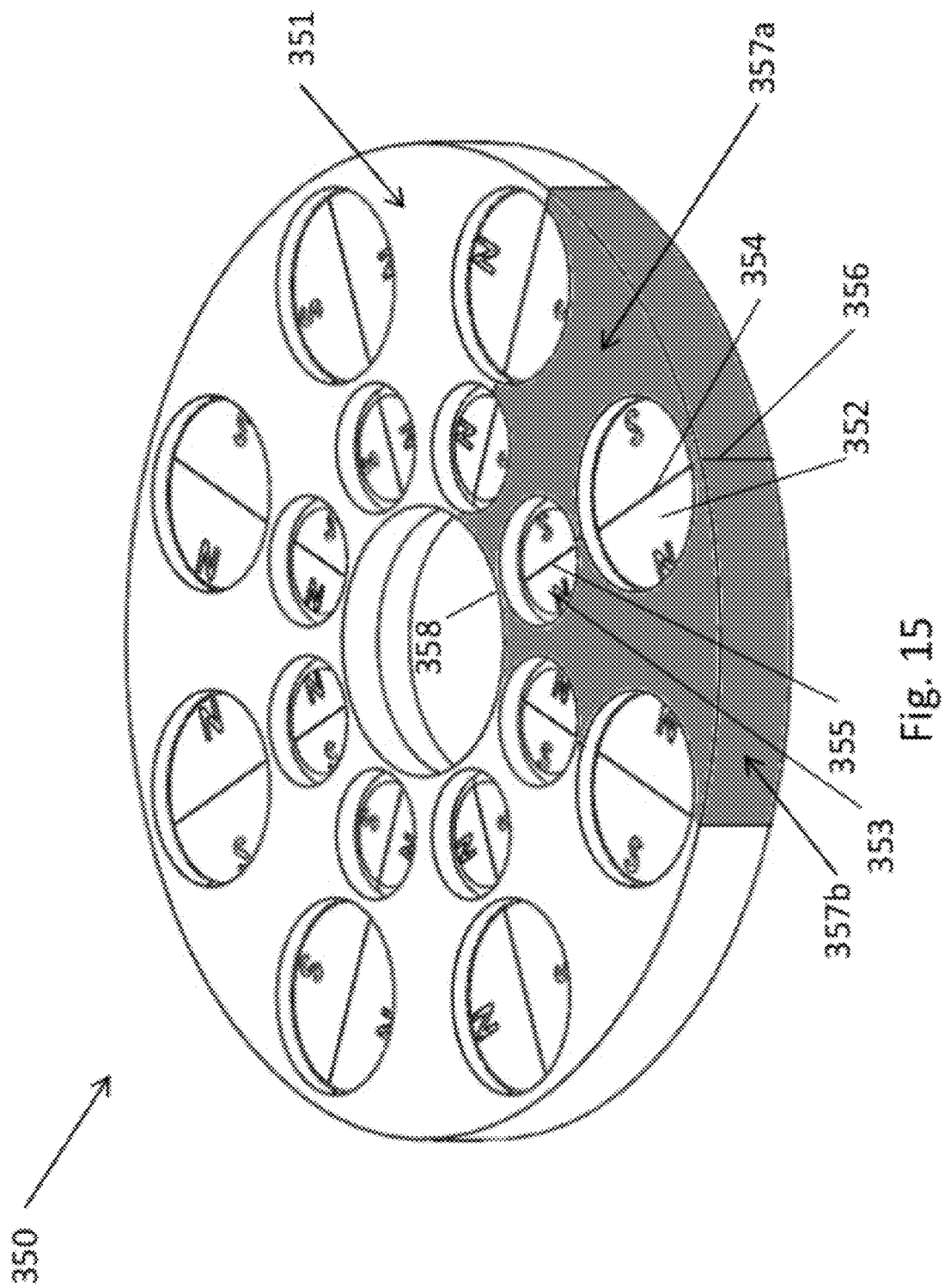
FIG. 15 is an oblique view of a ferrous carrier platter assembly comprising a ferrous carrier platter with eight core elements, each core element having two different diameter diametrically polarized disc shaped permanent magnets aligned along the permanent magnet field line and two pole conduits which are an integral part of the ferrous carrier platter shared between like magnetic poles of adjacent permanent magnets with the carrier platter having an equivalent outer diameter and smaller inner diameter than the carrier platter depicted in FIG. 14.

FIG. 15, a carrier platter assembly 350, comprises a single piece ferrous carrier platter 351 with integrated features to capture or retain 16 diametrically polarized permanent magnets, two of which are designated 352 and 353, of different diameters. Each permanent magnet 352 and 353 has its respective permanent magnet field line 354 and 355 oriented radially. The magnetic poles of the magnets are oriented such that like poles of adjacent permanent magnets are symmetrically facing like poles of adjacent permanent magnets so that the ferrous material between these magnets becomes "shared" north pole conduit 357*b* and "shared" south pole conduit 357*a*. Isolation between the "shared" north and south pole conduits 357*b* and 357*a* is achieved by minimizing the material 356 and 358 adjacent to the permanent magnet field line 354 and 355. The area of the "shared" pole conduits is defined in the same fashion as when defining individual pole conduits. Note that the area of the "shared" south pole conduit 357*a* and "shared" north pole conduit 357*b* uses the magnet pole surface area of four adjacent permanent magnets when determining the appropriate spacing between permanent magnets. In doing so, a core element can now be defined as the combination of half the area of the "shared" north pole conduit 357*b* combined with half the area of the "shared" south pole conduit 357*a* and permanent magnets 352 and 353 magnetically matched in the method prescribed. Functionality of carrier platter assembly 350 is similar to the functionality of carrier platter assembly 340 depicted in FIG. 14. Though carrier platter assembly 350 has the same outer diameter as carrier platter assembly 340, the inner diameter is smaller as it accommodates eight additional smaller diameter permanent magnets 353. This increases the magnetic work surface area of the platter, providing for a stronger magnetic breakaway force than carrier platter assembly 340. The method of adding additional different size permanent magnets allows for not only optimization of the ratio of magnet pole surface to pole conduit work surface area, but also precise sizing of the carrier platters to a desired inner or outer diameter requirement for integration into products or fixtures.

Figure 16:
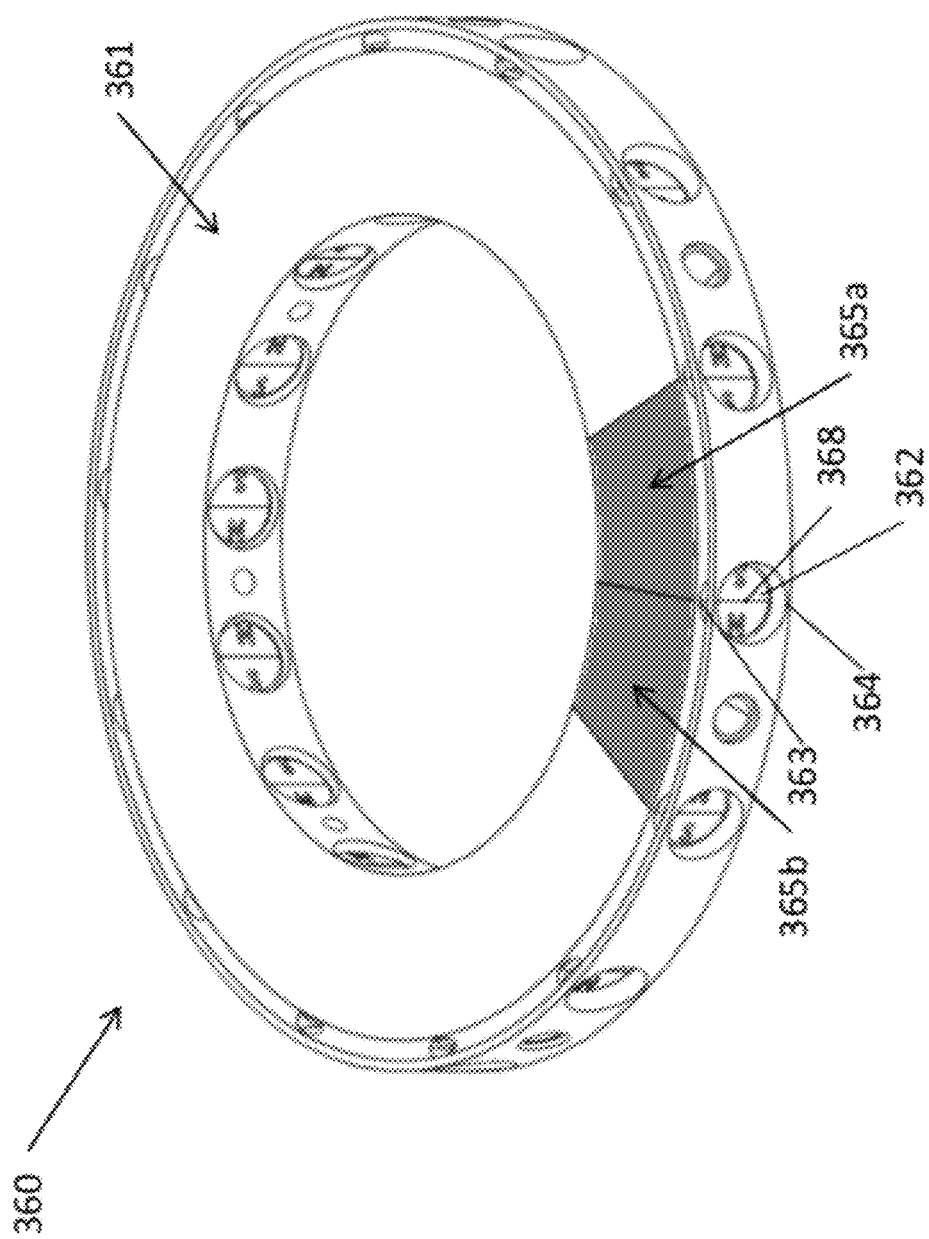
FIG. 16 is an oblique view of a ferrous carrier platter assembly comprising a ferrous carrier platter containing 14 core elements, each core element having a diametrically polarized cylindrical permanent magnet and two pole conduits which are an integral part of the ferrous carrier platter shared between like magnetic poles of adjacent permanent magnets.
Figure 17:
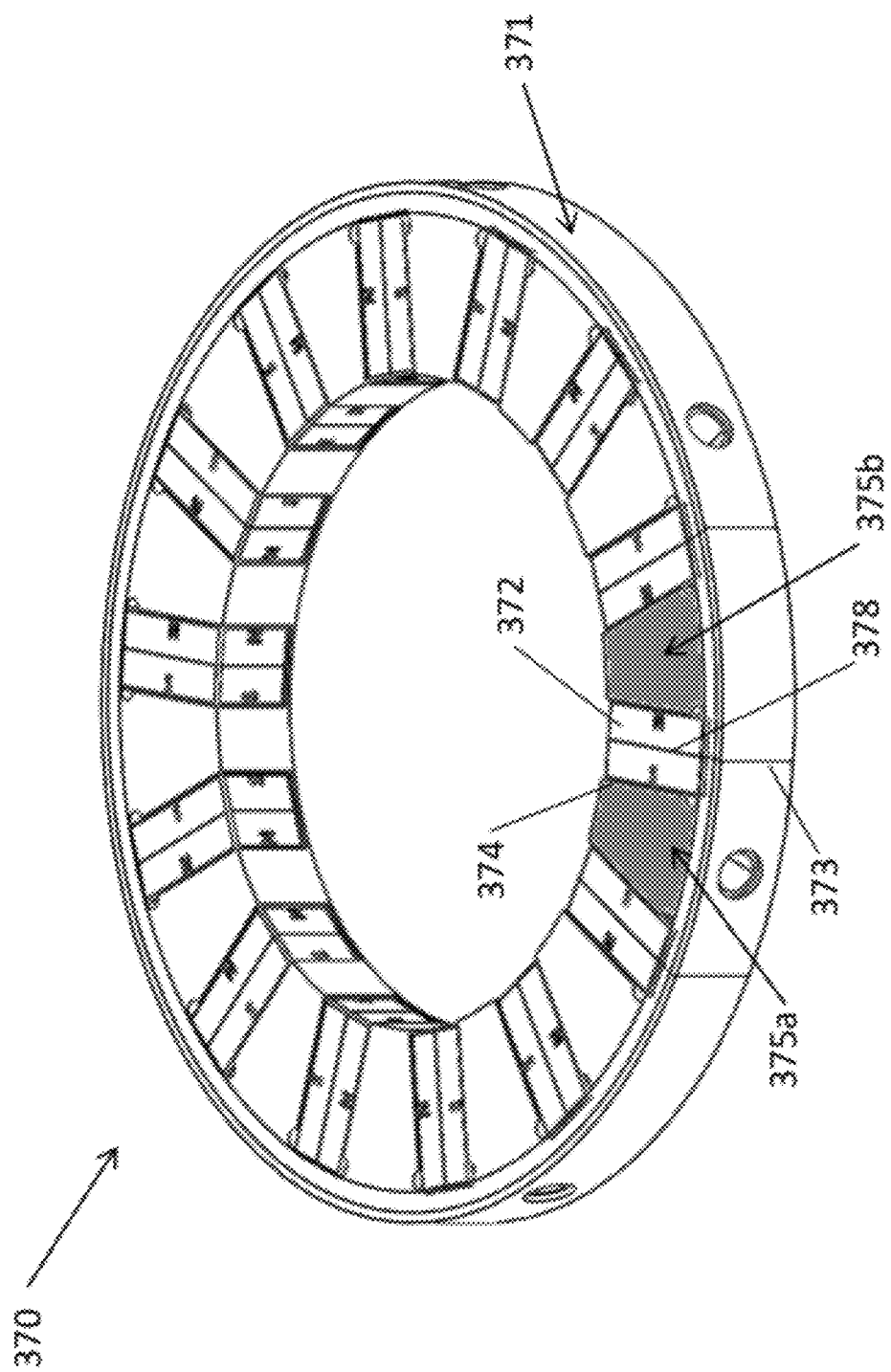
FIG. 17 is an oblique view of a ferrous carrier platter assembly comprising a ferrous carrier platter containing 14 core elements, each core element having a bar shaped permanent magnet and two pole conduits which are an integral part of the ferrous carrier platter shared between like magnetic poles of adjacent permanent magnets.

FIG. 16 depicts a carrier platter assembly 360 comprising a single piece ferrous carrier platter 361 with radially cored features to capture or retain 14 diametrically polarized cylindrical permanent magnets, one of which is denoted 362. Each of the permanent magnet is oriented such that like poles of adjacent magnets are facing each other. "Shared" north pole conduit 365*b* and "shared" south pole conduits 365*a* are created by having the material 363 and 364 adjacent to the permanent magnet field line 368 designed so as to minimize the material 363 and 364 adjacent to the permanent magnet field line 368 and above and below the permanent magnets along the permanent magnet field line 368. The reduced wall thickness of the material 363 and 364 adjacent to the permanent magnet field line 368 helps to isolate the opposing polarity magnetic fields along the permanent magnet field line 368. The area of the "shared" south pole conduit 365a and "shared" north pole conduit 365b is determined by the magnet pole surface area of two adjacent bar-shaped permanent magnets (instead of the cylindrical surface area) when determining the appropriate ratio of magnet pole surface to pole conduit work surface area. In doing so, a core element can now be defined as the combination of half the area of the "shared" north pole conduit 365b combined with half the area of the "shared" south pole conduit 365a and a permanent magnet 362 magnetically matched in the method prescribed. Functionality of carrier platter assembly 360 is similar to the other multi-core element "shared" platter assemblies such as those depicted in FIGS. 14 and 15, though this carrier platter assembly contains for purposes of illustration 14 core elements FIG. 17, a carrier platter assembly 370, comprises a single piece ferrous carrier platter 371 with radially positioned features to capture or retain 14 bar-shaped permanent magnets one of which is denoted 372. The bar-shaped permanent magnets are oriented such that like poles of adjacent permanent magnets are facing each other. "Shared" north pole conduit 375b and "shared" south pole conduit 375a are created by having the bar-shaped pockets, one of which is denoted 374, for the permanent magnets designed so as to minimize the material 373 adjacent to the permanent magnet field line 378 below the permanent magnets and the material 373 along the vertical edge of the permanent magnets, permanent magnet field line. The material 373 adjacent to the permanent magnet field line 378 helps to isolate the opposing polarity magnetic fields along the material adjacent to the permanent magnet field line Alternatively, the material 373 along the vertical edge can be removed by drilling a hole along the permanent magnet field line 378. Again, the area of the "shared" south pole conduit 375a and "shared" north pole conduit 375b is determined by the magnet pole surface area of two adjacent bar-shaped permanent magnets when determining the appropriate ratio of magnet pole surface to pole conduit work surface area. In doing so, a core element can be defined as the combination of half the area of the "shared" north pole conduit 375b combined with half the area of the "shared" south pole conduit 375a and a permanent magnet 372 magnetically matched in the method prescribed. Functionality of carrier platter assembly 370 is similar to that of the carrier platter assembly depicted in FIG. 16.

Figure 18:
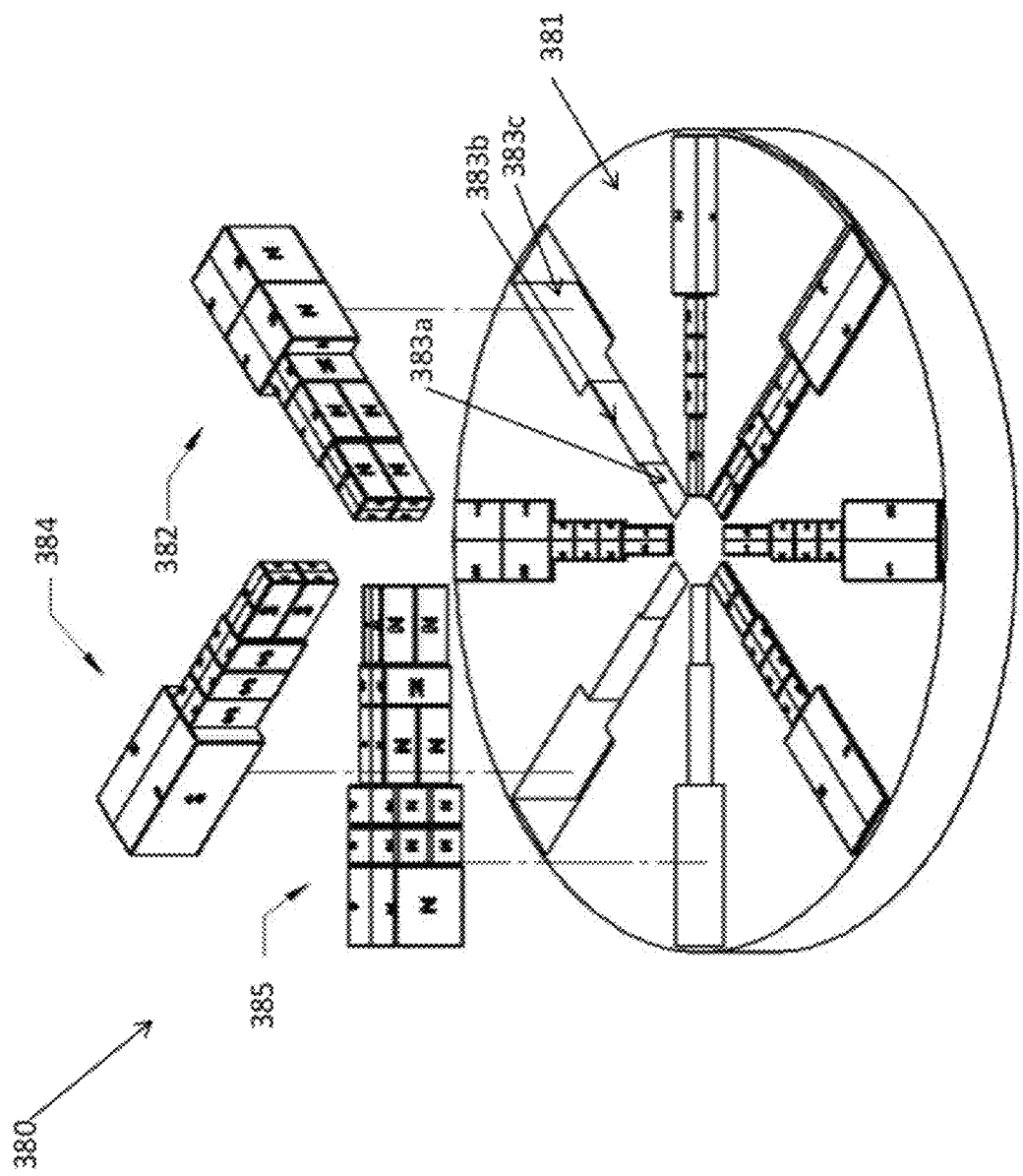
FIG. 18 is an oblique exploded view of a ferrous carrier platter assembly comprising a ferrous carrier platter containing eight core elements, each core element having multiple bar shaped different size permanent magnets and two pole conduits which are an integral part of the ferrous carrier platter shared between like magnetic poles of adjacent multiple bar shaped different size permanent magnets.

FIG. 18, a carrier platter assembly 380, comprises a single piece ferrous carrier platter 381 with radially positioned permanent magnet pockets, three of which are depicted by 383a, 383b, and 383c, incorporated to capture or retain eight groups of bar shaped permanent magnets, one of which is depicted by 382. Each group of bar shaped permanent magnets, three of which are depicted by 382, 384, and 385 contains the same volume and grade of permanent magnets oriented in the same direction along the permanent magnet field line with different magnetic lengths Lm contained in each of the permanent magnet pockets Each group of bar shaped permanent magnets effectively behave as a similarly shaped, larger individual magnet. Magnet groups are oriented such that like poles of adjacent magnet groups are facing each other. "Shared" north pole conduits and south pole conduits are created by having the permanent magnet pockets designed so as to minimize material thickness below the permanent magnet groups and the material along the vertical edge of permanent magnets as earlier described in FIG. 17. Functionality of carrier platter assembly 380 is similar to the carrier platter assembly depicted in FIG. 17; however, the use of multiple bar shaped permanent magnets is advisable when the carrier platter size is sufficiently large enough that single magnets of the same size are not readily available or are substantially reduced in efficiency due to difficulty of manufacturing large permanent magnets. This configuration is disclosed to demonstrate the highly flexible nature of this architecture, and the ability to make very large carrier platter configurations.

Figure 19:
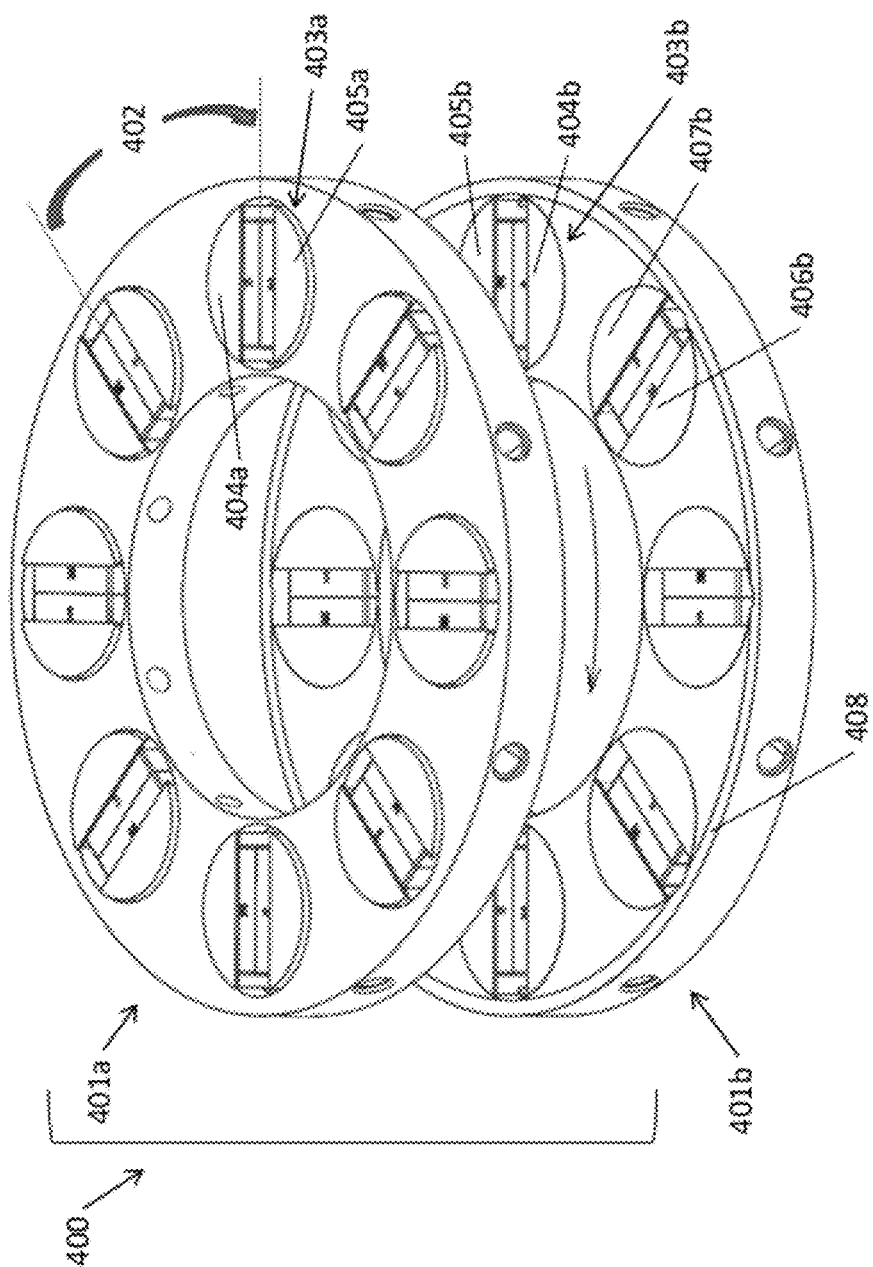
FIG. 19 is an oblique view of a stacked (separated in the figure for clarity) pair of nonferrous carrier platter assemblies, either of which is depicted in FIG. 10.

FIG. 19 illustrates a pair of nonferrous carrier platter assemblies 400 comprised of a first carrier platter assembly 401a and a second carrier platter assembly 401b, each carrier platter assembly basically as described earlier in FIG. 10. A relative rotation of actuation angle 402, equal to the angle between core elements, allows for alignment of the first core element 403 a in the first carrier platter assembly with the corresponding second core element 403b in the second carrier platter assembly. Rotation of the first carrier platter assembly by the actuation angle 402 between core elements so that the first north pole conduit 405a and upper south first pole conduit 404a are aligned with the second south pole conduit 404b and second north pole conduit 405b is considered an "out-of-phase" alignment, which deactivates the assembly. Subsequent realignment of the first north pole conduit 405a and first south pole conduit 404a with the second north pole conduit 406b and second south pole conduit 407b is considered an "in-phase" alignment, which activates the pair of nonferrous carrier platter assemblies. It is important to note that the arrangement of the magnetic poles in the carrier platter as described in FIG. 10 allows for the simultaneous activation of all of the core elements when aligned in-phase and conversely the simultaneous de-activation of all of the core elements when aligned out-of-phase. The activation/de-activation angle of the apparatus is defined by the rotation angle alternating between in-phase and out-of-phase, which in this figure is also the actuation angle 402 between core elements. The actuation angle 402 between core elements is also defined as 360°/number of alternating core-elements (eight) or 360°/8=45°. The machined groove 408 is designed to accommodate a "friction reducing means;" in this example, it could be a very low coefficient of friction o-ring made of polytetrafluoroethylene (PTFE or Teflon®) or a ball bearing arrangement. This is shown only for example and not by way of limitation as there are many methods devised to accomplish this friction-reducing means.

FIGS. 20A, B, C and D illustrate a pair of nonferrous carrier platter assemblies 410 comprised of upper carrier platter assembly 411a and lower carrier platter assembly 411b, each of which are basically depicted earlier in FIG. 12. Briefly re-capped and as shown in FIG. 12, the angle between each of the twelve adjacent core elements in each platter is 30° and the relative rotation of each adjacent core element about its axis 325 is 60°.

In FIG. 20A each of the core elements in the upper carrier platter assembly 411a is aligned out-of-phase with the corresponding core elements in the lower carrier platter assembly 411b. This results in de-activation of the pair of nonferrous carrier platter assemblies 410.

In FIG. 20B, the upper carrier platter assembly 411a has been rotated by the actuation angle 413 of 30° relative to the lower carrier platter assembly 411b. This allows for axial alignment of upper permanent magnet 412a with corresponding lower permanent magnet 412b and results in a partial alignment of the pole conduits surrounding upper permanent magnet 412a with the pole conduits in lower permanent magnet 412b, resulting in a slight activation of all of the core elements as the relative position of the individual upper core elements is 60° from being aligned out-of-phase with the individual lower core elements.

In FIG. 20C the upper carrier platter assembly 411a has been rotated again by the actuation angle 413 of 30° relative to the lower carrier platter assembly 411b. This results in a substantial activation of all of the core elements as the relative position of the individual upper core elements is 60° from being aligned in-phase with the individual lower core elements.

Figure 20D:
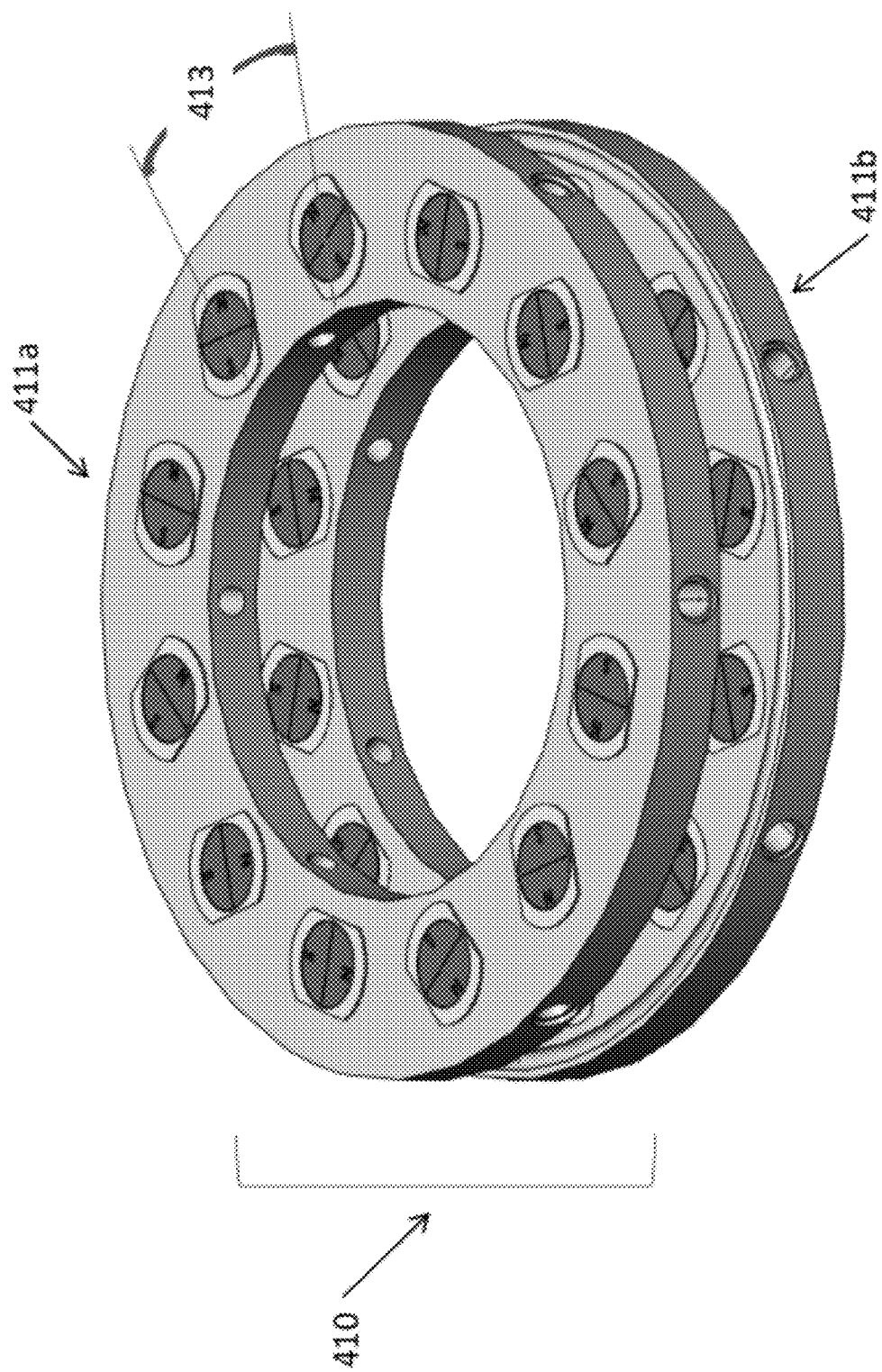
FIG. 20D is an oblique view of a stacked (separated in the figure for clarity) pair of nonferrous carrier platter assemblies as depicted in FIG. 20A-C, shown with the core elements aligned in-phase and the magnetic fields activated.

In FIG. 20D each of the core elements in the upper carrier platter assembly 411a is aligned in-phase or aligned with each of the corresponding core elements in the lower carrier platter assembly 411b. This results in activation of the pair of nonferrous carrier platter assemblies 410.

The configuration depicted by FIGS. 20A, B, C and D is intended to provide a variable step actuation force device. Calibration of the breakaway force is needed to confirm the performance level at each angle 413 between core elements from alignment out-of-phase to alignment in phase. The relative rotation of the predetermined angle 324 of core element 322 of FIG. 12 can be adjusted to provide a ratio of partial activation to full activation. This is useful when trying to meet safety standards that specify a factor of safety. Currently ASTM B 30 (ASTM International formerly known as American Society for Testing Materials) *Below the Hook Lifting* standard specifies a 3:1 factor of safety for switchable magnetic lifting. As an example, in a lifting device with a breakaway force of 3,000 pounds, a 3:−1 safety factor would indicate that the maximum lift with that device should not exceed 1,000 pounds. That works well as long as the operator knows the weight of the target, and that the target conforms to the ideal material thickness. With the proposed invention, an operator can simply place the device onto the material, lift a very small amount with it partially activated and calibrated for a 3:1 factor of safety. If the device remains attached, the operator would lower the material, and then fully activate the apparatus. He can then safely lift the material with a 3:1 factor of safety without knowing the precise weight of the material.

Figure 21A:
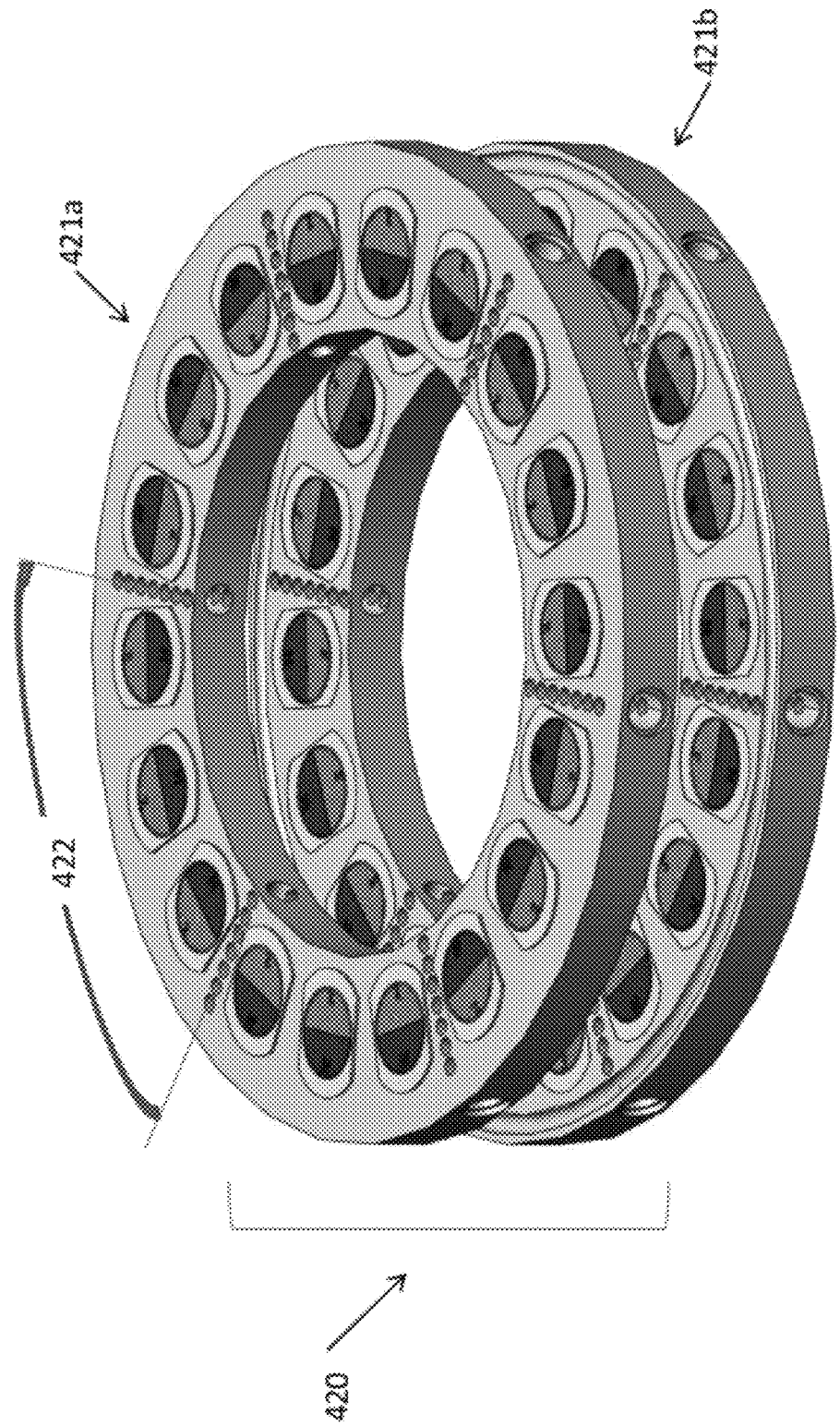
FIG. 21A is an oblique view of a stacked (separated in the figure for clarity) pair of nonferrous carrier platter assemblies, either of which is depicted in FIG. 13, shown with the core elements aligned out-of-phase and the magnetic fields deactivated.
Figure 21B:
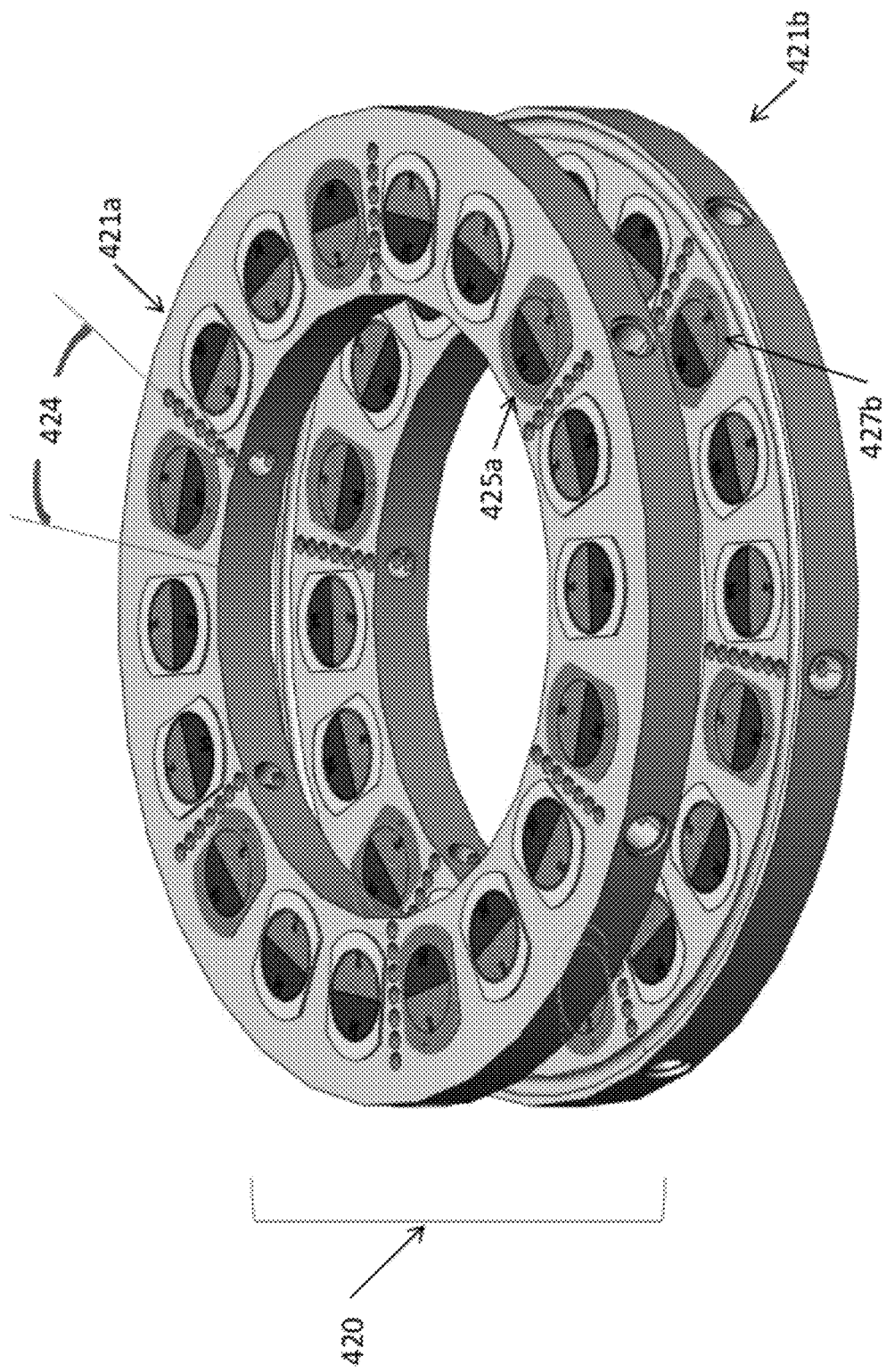
FIG. 21B is an oblique view of stacked (separated in the figure for clarity) pair of nonferrous carrier platters as depicted in FIG. 21A, shown with one-third of the core elements aligned out-of-phase, two-thirds of the core elements aligned in-phase, and the magnetic fields partially deactivated.

FIGS. 21A, B, C and D illustrate a pair of nonferrous carrier platter assemblies 420 comprised of upper carrier platter assembly 421a and lower carrier platter assembly 421b, each of which is basically described earlier in FIG. 13. Each of the carrier platter assemblies contains 18 core elements and has an angle between core elements of 20° with a polarity change every three adjacent core elements which defines the actuation angle 422, in this case 60°. In FIG. 21A each of the core elements in the upper carrier platter assembly 421a is aligned out-of-phase with the core elements in the lower platter carrier assembly 421b, resulting in de-activation of the pair of nonferrous carrier platter assemblies 420. In FIG. 21B, the upper carrier platter assembly 421a has been rotated 20° clockwise (the angle 424 between adjacent core elements) relative to the lower carrier platter assembly 421b. This results in an activation of every third core element pair, as exemplified in the Figure by upper core element 425a and the corresponding lower core element 427b.

Figure 21C:
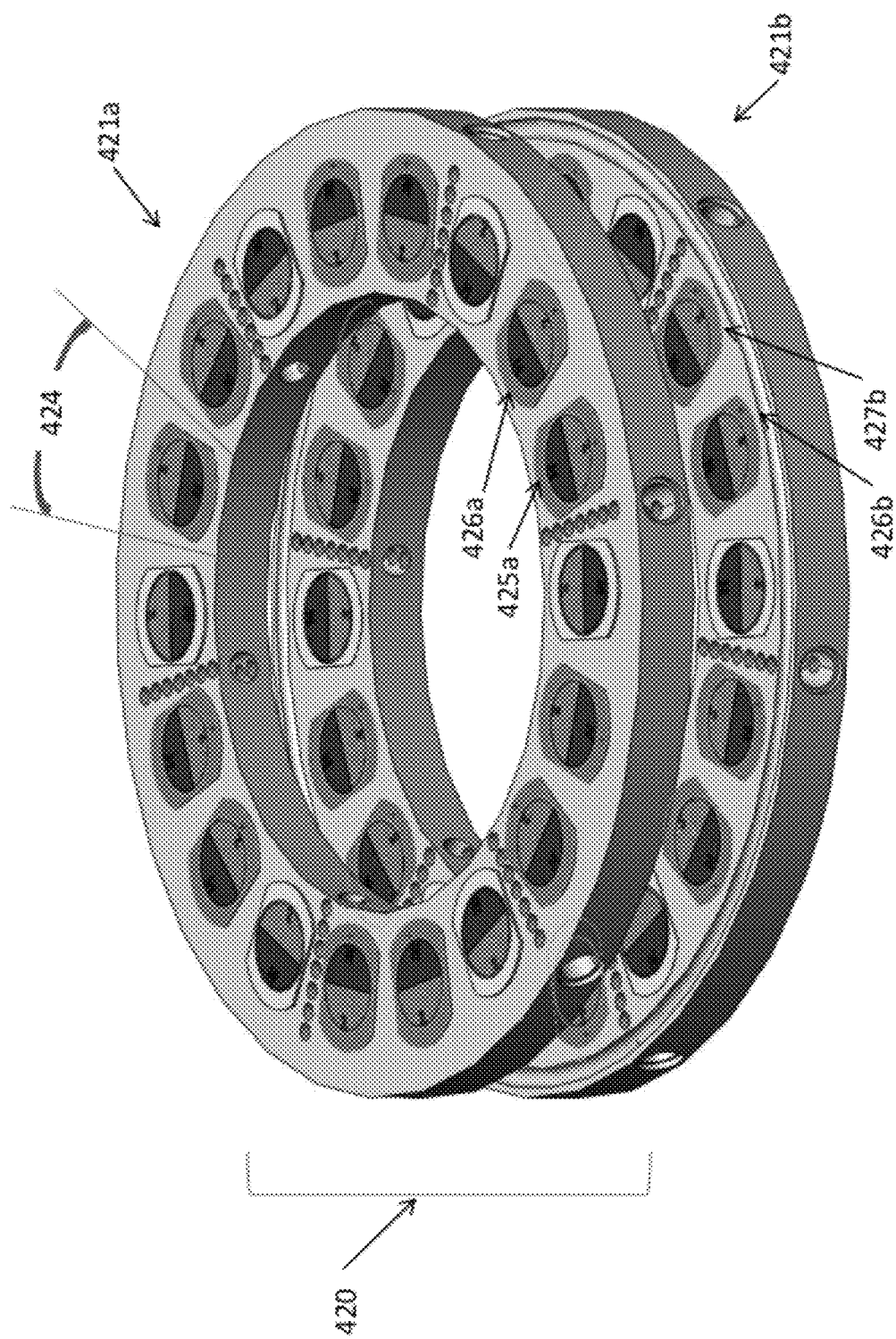
FIG. 21C is an oblique view of a stacked (separated in the figure for clarity) pair of nonferrous carrier platter assemblies as depicted in FIGS. 21A and B, shown with two-thirds of core elements aligned in-phase, one-third of the core elements aligned out-of-phase, and the magnetic fields partially activated.

In FIG. 21C, the upper carrier platter assembly 421a has been rotated clockwise once again from the position depicted in FIG. 21B by an angle 424 of 20° between core elements relative to the lower carrier platter assembly 421b. This results in activation of two-thirds of all of the upper core elements, two of which are depicted as 425a and 426a, as well as their corresponding lower core elements 426b and 427b, as the relative position of the individual core elements is 40° clockwise from the de-activated position or alignment out-of-phase.

Figure 21D:
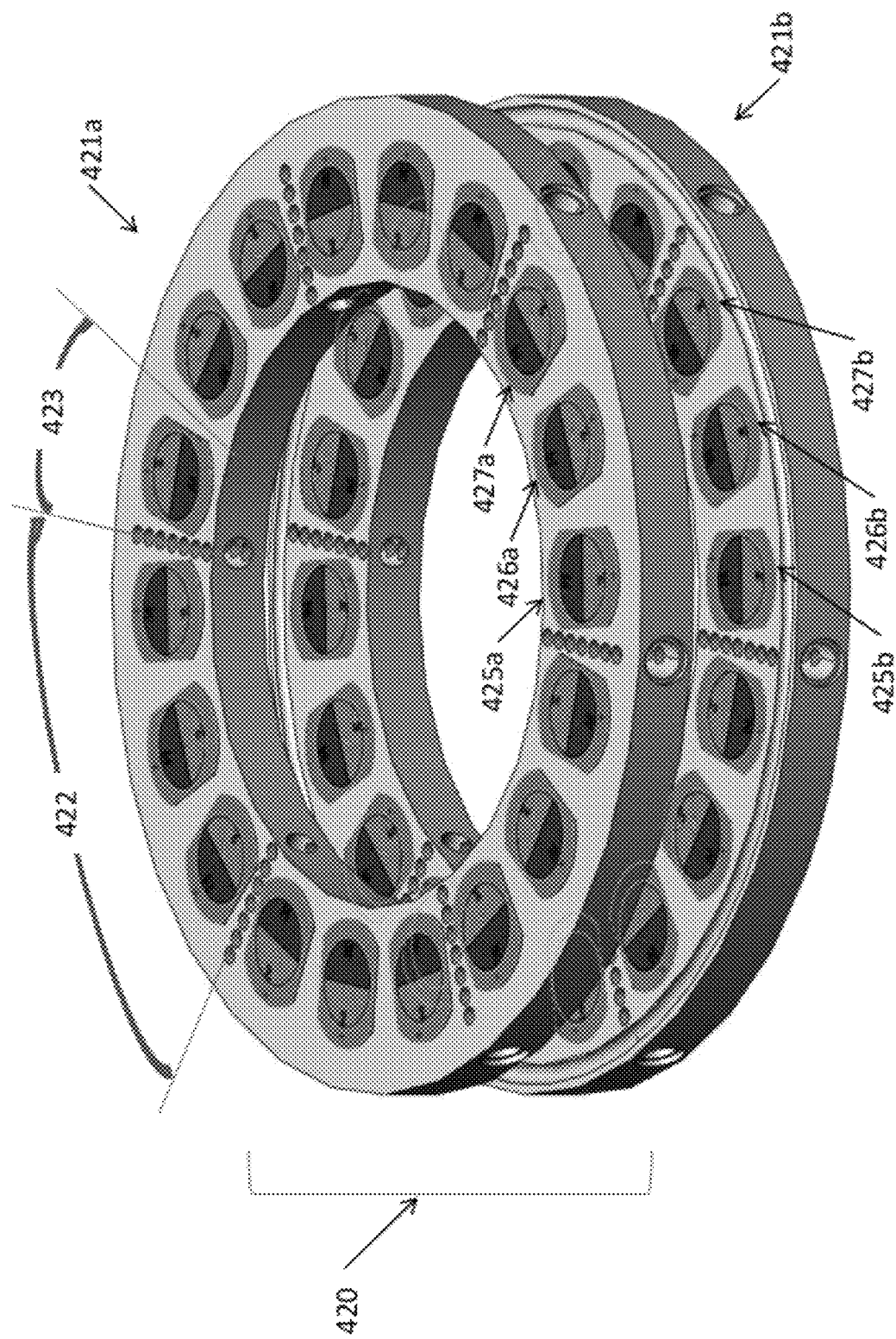
FIG. 21D is an oblique view of stacked (separated in the figure for clarity) pair of nonferrous carrier platter assemblies as depicted in FIGS. 21A-C, shown with all core elements aligned in-phase and the magnetic fields activated.

In FIG. 21D, the upper carrier platter assembly 421a has been rotated clockwise from the position depicted in FIG. 21C by an angle 424 of 20° relative to the lower carrier platter assembly 421b. This results in activation of all upper and lower core elements as exemplified by corresponding core element pairs 425a and 425b, 426a and 426b, and 427a and 427b as the upper carrier platter assembly 421a has rotated by actuation angle 422 so that the relative position of the individual core elements is 60° clockwise, from the aligned out-of-phase or de-activated position depicted in FIG. 21A. The pair of nonferrous carrier platter assemblies 420 is now fully activated.

The configuration depicted by FIGS. 21A, B, C and D are intended to provide a defined factor of safety lifting device. Unlike the device depicted in FIGS. 20A, B, C and D, calibration of the breakaway force is not needed. By activating one-third of the core elements as describe in FIG. 21B, the breakaway force is precisely one-third of the breakaway performance of the fully activated device. This apparatus is ideally suited to meet the 3:1 safety specifications identified by ASTM B 30 *Below the Hook Lifting Standard*, without the operator knowing the weight of the target material being lifted or whether the target material is magnetically oversaturated which could result in diminished lifting performance as observed with current switching magnet technology lifters.

With the proposed invention, an operator can simply place the device onto the material (even if it is thinner than ideal thickness) and lift it a short distance with one third of the core elements activated as shown in FIG. 21B. If the device remains attached, the operator may then lower the material and fully activate the apparatus by rotating the upper carrier platter assembly 421a to the position shown in FIG. 21D. Now the material can be lifted with the prescribed 3:1 factor of safety without knowing the precise weight or saturation capability of the material.

As an example, assume that an operator is lifting a piece of 400 series magnetic stainless steel; the operator is aware that the target weighs 600 pounds and the lifting magnet is rated at 3,000 pounds. The operator believes that he is within the 3:1 safety level and proceeds to lift the material, which falls shortly afterwards during movement. What the operator did not know is that the magnetic strength is based on the composition and surface finish of the material being lifted. 400 series stainless steel has about 50% of the attachment force as mild steel. Cast iron has about 40% of said attachment force, while rough-surface finishes can impact performance by over 50%. The apparatus is only capable of lifting 1,500 pounds on 400 series stainless steel and around 1200 pounds on cast iron. Had the operator used the configuration specified in FIG. 21A and performed a test lift with the device as shown in FIG. 21B, he would have seen the device break away from the material since it exceeded 500 pounds. At that point he would have needed to augment the lift with a second apparatus or stronger unit.

The configuration shown in FIG. 21A is shown by way of for example and not by way of limitation, and is just one of many possible different configurations. The concept works with "shared" pole conduits (ferrous carrier platters) as well as with a myriad of different magnet shapes and sizes, as well as pole conduit shapes and sizes or core element configurations. The configuration also lends itself to be adapted readily for many different factors of safety by simply adjusting the number of individual core elements contained in the actuation angle 422.

Figure 22A:
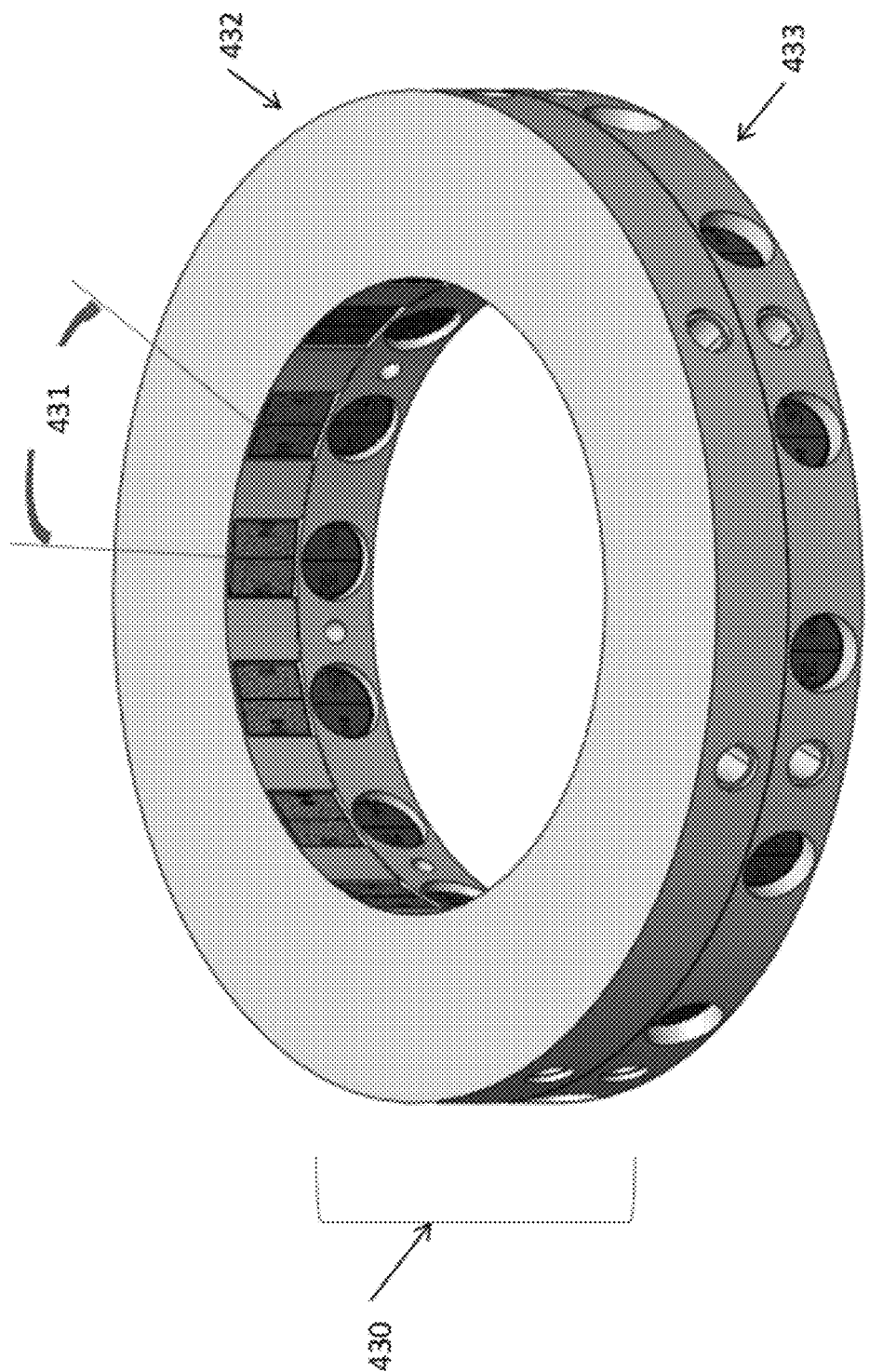
FIG. 22A is an oblique view of a stacked pair of different configuration carrier platter assemblies, each of which is individually depicted by FIGS. 16 and 17.

FIGS. 22A and B illustrate a pair of ferrous carrier platter assemblies 430 comprised of upper carrier platter assembly 432 and lower carrier platter assembly 433, each of which is basically described earlier in FIGS. 17 and 16, respectively. A relative rotation equal to the actuation angle 431 between core elements allows for a re-alignment of the core elements in the upper carrier platter assembly with the corresponding core elements in the lower carrier platter assembly. As in FIG. 19, the activation/de-activation angle of the apparatus is defined by the rotation angle alternating between alignment in-phase and out-of-phase, which in this Figure is also actuation angle 43. Actuation angle 431 is also defined as 360°/number of alternating core-elements (14) or 360°/14=25.71°.

FIGS. 22A and B also illustrate a combination of two different carrier platters using different shaped permanent magnets. While the work surface areas of upper carrier platter assembly 432 and lower carrier platter assembly 433 are not identical, the arrangement will still function properly as long as the Pole Surface Ratio of the Conduit is met for each of the carrier platter assemblies, and the combined fields are neutralized when each of the upper core elements is combined with a lower core element. Furthermore, the ferrous carrier platter assembly 430 depicts a potentially ideal configuration in that the "shared" pole conduits in upper carrier platter assembly 432 have a higher magnetic field strength than the "shared" pole conduits in lower carrier platter assembly 433. Core elements in upper carrier platter assembly 432 can be designed to have a different flux density than those in lower carrier platter assembly 433 to compensate for anticipated distance of the air gap between the carrier platters due to use of friction reducing means (such as PTFE o-ring 434 or ball bearings between the platters). When the carrier platter assemblies are aligned out-of-phase, the core elements in the upper carrier platter assembly 432 can potentially overwhelm the core elements in the lower carrier platter assembly 433 and reverse the field flux into the target that would demagnetize the target and allows for easy release. In essence, this carrier platter assembly configuration can create a repelling magnetic field which can be used to separate the target from the Rotary Switchable Magnet. When using stronger core element magnet assemblies in the upper carrier platter assembly, the fully deactivated position can be at a slight angular offset from 0° so that the magnetic flux of the upper core element magnet assembly completely cancels the magnetic field of the lower core element magnet assembly as well as overcoming the air gap losses. Complete alignment at 0° results in a slight reversal of the magnetic polarity of the core elements in the lower carrier platter assembly.

The machined groove 435 of FIG. 22B is designed to accommodate a "friction reducing means." There are many ways to effect such friction reducing means, including without limitation a very low coefficient of friction o-ring made of polytetraflouroethylene (PTFE or Teflon®), ball or roller bearings, etc. This is shown only for example and not by way of limitation as there are many methods that one of ordinary skill in the art may employ to accomplish this friction reducing means.

FIGS. 23A and 23B illustrate a simple RSM device 500. The RSM device 500 consists of eight core elements contained in an upper carrier platter assembly 503a and eight corresponding core elements contained in a lower carrier platter assembly 503b, friction reducing means 508, protective enclosure 501 and recessed hole features one of which is depicted as 505, designed to allow access to the open area between the stationary integration component 502. Friction reducing means 508 is positioned between the upper carrier platter assembly 503a and the lower carrier platter assembly 503b. The protective enclosure 501 is attached via integration attachment means two of which are depicted as 507 to the upper carrier platter assembly 503a. Integration component 502 is attached to the inner circumference of lower carrier platter assembly 503b by way of attachment means, one of which is depicted as 509. Positional detent means, one of which is depicted as 504, are inset into recessed hole features in the lower carrier platter assembly 503b, which are used to engage with detent points, one of which is depicted as 506, located in the protective enclosure. When RSM device 500 is on a target, a relative rotation of protective enclosure 501 with respect to the stationary integration component 502, will consequently rotate the upper carrier platter assembly 503a to adjacent detent points 506 where the positional detent means 504 engage, thereby activating or deactivating the device. FIG. 23A is a simple illustration by way of example and not limitation, which demonstrates the product concept manually activated with a feature for integration into other products or fixtures. In this example, the integration component could be incorporated or substituted for another attachment method.

FIG. 24 is an RSM apparatus 600 for use in automated or robotic applications and is demonstrative of the highly flexible architecture of the device. Essentially any of the combinations of carrier platter assembly 601 with another carrier platter assembly not shown but disclosed herein or that may be employed by one with ordinary skill in the art, can be incorporated into a housing 602 which constrains a first carrier platter assembly, while allowing for a second carrier platter assembly, attached to actuation means 603, to rotate the required actuation angle to activate and deactivate the apparatus. The actuation means 603 depicted may be motorized, hydraulic, pneumatic or solenoid driven unit, though many other actuation methods may be used, including without limitation temporary electrical methods which can momentarily deactivate or augment the device through the use of an electromagnet with similar magnetic pole arrangement which can be used to activate or deactivate a single carrier platter assembly or combination of carrier platter assemblies.

FIG. 26 illustrates stacked ferrous carrier platter assemblies 700 comprised of rotatable carrier platter assembly 701 and integrated carrier platter housing assembly 702. A relative rotation between the rotatable carrier platter assembly and the integrated carrier platter housing assembly allows for re-alignment of the core elements in the rotatable carrier platter assembly with respect to the corresponding core elements in the integrated carrier platter housing assembly. FIG. 26 further illustrates a combination of a rotatable carrier platter assembly with an integrated carrier platter housing having substantially different shapes. In this configuration an integrated carrier platter housing is used to minimize the number of parts needed for assembly while providing attachment features and an ergonomic or aesthetic design. Integrated housing 705 is constructed of a single piece of ferrous steel, with mounting holes 707 incorporated. Magnetic isolation features, one of which is depicted as 706, are essentially material cutouts designed to constrain the shape and area of the pole conduits, allowing for alignment of the pole conduits in the rotatable carrier platter assembly 701 and the integrated carrier platter housing assembly 702. In this configuration a needle thrust bearing assembly 703 is used due to high attractive forces. A recessed area 709 is incorporated into the integrated housing 705 to accommodate the needle thrust bearing assembly and provides for a minimal air-gap between the rotatable carrier platter assembly 701 and the integrated carrier platter housing assembly 702 along the majority of the pole conduit surface. A common center of rotation 704 is used to maintain precise alignment between the rotatable carrier platter assembly 701 and the integrated carrier platter housing assembly 702. As with other carrier platter assemblies depicted earlier, the use of multiple magnets 708 in place of a single larger magnet provides for flexibility in magnet selection, strength optimization, use of off-the-shelf parts, as well as other benefits described earlier.

FIG. 27 illustrates a single layer array of nonferrous carrier platter assemblies 750, comprised of nonferrous integrated carrier platter housing assembly 751 and corresponding multiple rotatable carrier platter assemblies 752 and 753. Nonferrous integrated carrier platter housing assembly 751 comprises a nonferrous integrated carrier platter housing assembly 755 which incorporates recessed features, one of which is depicted as 754, and provides constraining means while accommodating the insetting of the rotatable carrier platter assemblies 752 and 753. Each combination of rotatable carrier platter assemblies and corresponding portion of the nonferrous integrated carrier platter housing assembly may be activated individually or together.

FIG. 28 illustrates a single layer array 800 of ferrous carrier platter assemblies, the lower portion of the layer comprised of a ferrous integrated carrier platter housing assembly 801 and the upper portion of the layer comprised of a rotatable platter housing 805 with multiple rotatable carrier platter assemblies 802, 803, and 804 inset therein. The ferrous integrated carrier platter assemblies 812, 813 and 814 are integrated into a ferrous integrated housing 806. Rotatable carrier platter assemblies 802, 803, and 804 are contained within rotatable platter housing 805. A relative rotation of one or more rotatable carrier platter assemblies 802, 803, or 804 activates or deactivates the magnetic fields emanating from the corresponding portion of the ferrous integrated carrier platter housing assembly. Magnetic isolation features, one of which is depicted as 808, are used to prevent opposing magnetic fields from neutralizing each other. Threaded holes, one of which is depicted as 807, provide for an attachment point on rotatable carrier platter assembly 802, as one possible means to rotate the rotatable carrier platter assembly 802 relative to the corresponding portion of ferrous integrated carrier platter housing assembly 801.

FIG. 29 illustrates a dual layer array of ferrous carrier platter assemblies 850 comprising a first layer array of ferrous carrier platter assemblies 851 and a second layer array of ferrous carrier platter assemblies 861. The first layer array 851 comprises a first layer of ferrous integrated carrier platter housing assembly 852 and a first layer of corresponding rotatable carrier platter assemblies 853, 854, and 855. The second layer array of ferrous carrier platter assemblies 861 comprises a second layer of ferrous integrated carrier platter housing assembly 862 and a second layer of corresponding rotatable carrier platter assemblies 863, 864, and 865. Rotatable carrier platter assemblies 853, 854, and 855 are inset within the dual layer rotatable platter housing 870 and are paired with the corresponding carrier platter assemblies in the first layer of ferrous integrated carrier platter housing assembly 852. Rotatable carrier platter assemblies 863, 864, and 865 are inset within the dual layer rotatable platter housing 870 and are paired with the corresponding second layer of ferrous integrated carrier platter housing assembly 862. The first and second layer of ferrous integrated carrier platter housing assemblies 852 and 862 respectively, are fixed in their respective ferrous integrated housings 856 and 866. A relative rotation of one or more rotatable carrier platter assemblies 853, 854, or 855 activates or deactivates the magnetic fields emanating from the corresponding portion of the first layer of ferrous integrated carrier platter housing assembly 852. A relative rotation of one or more carrier platter assemblies 863, 864, or 865 activates or deactivates the magnetic fields emanating from the corresponding portion of the second layer of ferrous integrated carrier platter housing assembly 862. Magnetic isolation gap 875 provides for magnetic isolation between the rotatable carrier platter assemblies. Rotation limiting slots, one of which is depicted as 871, allows for a shaft to be inserted into rotatable carrier platter assembly 853 to extend through the rotation limiting slot 871 allowing for activation or deactivation of the respective portion of the first layer 851 of carrier platter assemblies.

What is claimed is:

1. A rotary switchable multi-core element permanent magnet-based apparatus for attaching, holding, or lifting a desired target, comprised of:

A plurality of core elements integrated into a carrier platter, each core element comprised of one or more permanent magnets with a magnetic north pole and a magnetic south pole and two magnetically soft or hard pole conduits, the magnetic poles of the permanent magnet or permanent magnets each having a magnetic pole face and each being adjacent and affixed to the two pole conduits, the permanent magnet or permanent magnets within each core element oriented such that the magnetic north pole of the permanent magnet or the magnetic north poles of the permanent magnets are adjacent and affixed to one pole conduit and the magnetic south pole of the permanent magnet or the magnetic south poles of the permanent magnets are adjacent and affixed to the other pole conduit, said pole conduits being capable of containing and redirecting the magnetic fields of the permanent magnet or permanent magnets;

A plurality of carrier platter assemblies, each of which is comprised of a carrier platter and a plurality of core elements integrated therein;

The carrier platter assemblies adjacent to one another and in different geometric planes wherein each carrier platter assembly constrains or holds multiple core elements such that the north and south pole conduits of the core elements in a carrier platter assembly correspond to or align with the north and south pole conduits of the core elements in an adjacent carrier platter assembly in order to redirect the contained magnetic fields from the permanent magnet's or permanent magnets' magnetic poles to an adjacent carrier platter assembly's corresponding core elements or the desired target;

Wherein each carrier platter assembly is constrained by constraining means to the adjacent carrier platter assembly so that one or more of the carrier platter assemblies may rotate concentrically by rotation means with respect to the adjacent carrier platter assembly;

Wherein each carrier platter assembly is separated from an adjacent carrier platter assembly by friction reducing means for the purpose of reducing the friction between adjacent carrier platter assemblies and facilitating the rotation of a carrier platter assembly with respect to an adjacent carrier platter assembly;

Such that the magnetic field emanating from the pole conduits adjacent to the target:

deactivates when the pole conduits are aligned out-of-phase, that is, all or substantially all of the magnetic fields emanating from the pole conduits in a carrier platter assembly are deactivated or reduced to a desired level, such that the south pole conduits (S) of the core elements in a carrier platter assembly are juxtaposed with the corresponding north pole conduits (N) of the core elements in the adjacent carrier platter assembly (S-N) and the north pole conduits (N) of the core elements in a carrier platter assembly are juxtaposed with the corresponding south pole conduits (S) of the core elements in the adjacent carrier platter assembly (N-S);

activates when the pole conduits are aligned in-phase, that is, substantially all of the magnetic fields emanating from the pole conduits in a carrier platter assembly are activated or increased to a desired level, such that the south pole conduits (S) of the core elements in a carrier platter assembly are juxtaposed with the corresponding south pole conduits (S) of the core elements in the adjacent carrier platter assembly (S-S) and the north pole conduits (N) of the core elements in a carrier platter assembly are juxtaposed with the corresponding north pole conduits (N) of the core elements in the adjacent carrier platter assembly (N-N); and partially activates or deactivates when the pole conduits are partially aligned either in-phase or out-of-phase, that is, the magnetic fields emanating from the pole conduits in a carrier platter assembly are adjusted to a desired level.

2. The rotary switchable multi-core element permanent magnet-based apparatus for attaching, holding, or lifting a desired target of claim 1 wherein each core element is comprised of separate structures for each pole conduit and integrated into a nonferrous carrier platter, means for isolating the north pole conduit from the south pole conduit, and means for restraining and positioning the individual pole conduits with respect to the permanent magnet or permanent magnets contained therein.

3. The rotary switchable multi-core element permanent magnet-based apparatus for attaching, holding, or lifting a desired target of claim 1 wherein each core element is comprised of a single structure and integrated into a nonferrous carrier platter, means for isolating the north pole conduit from the south pole conduit, and means for restraining and positioning the individual pole conduits with respect to the permanent magnet or permanent magnets contained therein.

4. The rotary switchable multi-core element permanent magnet-based apparatus for attaching, holding, or lifting a desired target of claim 1 wherein the pole conduits of each core element are an integral part of a ferrous carrier platter, means for isolating the north pole conduit from the south pole conduit, and means for restraining and positioning the individual pole conduits with respect to the permanent magnet or permanent magnets contained therein, said north pole conduit shared with a north pole conduit of an adjacent permanent magnet or permanent magnets and said south pole conduit shared with a south pole conduit of an adjacent permanent magnet or permanent magnets.

5. The rotary switchable multi-core element permanent magnet-based apparatus for attaching, holding, or lifting a desired target of claim 1 wherein the core elements are integrated into a combination of nonferrous and ferrous carrier platters and wherein each core element is comprised of any combination of:
   a. Separate structures for each pole conduit integrated into a nonferrous carrier platter; or
   b. A single structure integrated into a nonferrous carrier platter; or
   c. the pole conduits of each core element are an integral and shared part of a ferrous carrier platter, said north pole conduit shared with a north pole conduit of an adjacent permanent magnet or permanent magnets and said south pole conduit shared with a south pole conduit of an adjacent permanent magnet or permanent magnets; together with means for isolating the north pole conduit from the south pole conduit, and means for restraining and positioning the individual pole conduits with respect to the permanent magnet or permanent magnets contained therein.

6. The rotary switchable multi-core element permanent magnet-based apparatus for attaching, holding, or lifting a desired target of claim 1 wherein said one or more permanent magnets are comprised of electro-magnets thereby creating a magnetic north pole or magnetic north poles and a magnetic south pole or magnetic south poles.

7. The rotary switchable multi-core element permanent magnet-based apparatus for attaching, holding, or lifting a desired target of claim 1 wherein the deactivating, activating, and partially activating or deactivating the magnetic field emanating from the pole conduits adjacent to the target are incrementally accomplished by positional detent means.

8. The rotary switchable multi-core element permanent magnet-based apparatus for attaching, holding, or lifting a desired target of claim 1 wherein plating and coating means are employed to any of the permanent magnets, the core elements, the pole conduits, and the carrier platter assemblies.

9. The rotary switchable multi-core element permanent magnet-based apparatus for attaching, holding, or lifting a desired target of claim 1 wherein encapsulation means are employed to any of the permanent magnets, the core elements, the pole conduits, and the carrier platter assemblies.

10. The rotary switchable multi-core element permanent magnet-based apparatus for attaching, holding, or lifting a desired target of claim 1 wherein one or more carrier platter assemblies are either affixed within or integrated into one or more housings and one or more corresponding carrier platter assemblies are rotatable.

11. The rotary switchable multi-core element permanent magnet-based apparatus for attaching, holding, or lifting a desired target of claim 10 wherein the carrier platter assemblies that are affixed within or integrated into one or more housings are either in the same geometric plane or in parallel geometric planes and the corresponding rotatable carrier platter assemblies are in one or more parallel geometric planes adjacent to the corresponding affixed or integrated carrier platter assemblies.

12. The rotary switchable multi-core element permanent magnet-based apparatus for attaching, holding, or lifting a desired target of claim 10 wherein multiple adjacent carrier platter assemblies are either affixed within or integrated into one or more housings and are oriented in different geometric planes and the corresponding rotatable carrier platter assemblies are in one or more parallel geometric planes adjacent to the corresponding affixed or integrated carrier platter assemblies.

13. A method for making a rotary switchable multi-core element permanent magnet-based apparatus for attaching to or holding a work surface or lifting a desired target, comprising the steps of:
   a. Configuring core elements to be integrated into a carrier platter, each core element comprised of one or more permanent magnets, with a magnetic north pole and a magnetic south pole and two magnetically soft or hard pole conduits, the magnetic poles of the permanent magnet or permanent magnets each having a magnetic pole face and each being adjacent and affixed to the two pole conduits, the permanent magnet or permanent magnets within each core element oriented such that the magnetic north pole of the permanent magnet or the magnetic north poles of the permanent magnets are adjacent and affixed to one pole conduit and the magnetic south pole of the permanent magnet or the magnetic south poles of the permanent magnets are adjacent and affixed to the other pole conduit, said pole conduits being capable of containing and redirecting the magnetic fields of the permanent magnet or permanent magnets, wherein:
1. Each core element is comprised of separate structures for each pole conduit and integrated into a nonferrous carrier platter, means for isolating the north pole conduit from the south pole conduit, and means for restraining and positioning the individual pole conduits with respect to the permanent magnet or permanent magnets contained therein; or
2. Each core element is comprised of a single structure and integrated into a nonferrous carrier platter, means for isolating the north pole conduit from the south pole conduit, and means for restraining and positioning the individual pole conduits with respect to the permanent magnet or permanent magnets contained therein; or
3. The pole conduits of each core element are an integral part of a ferrous carrier platter, means for isolating the north pole conduit from the south pole conduit, and means for restraining and positioning the individual pole conduits with respect to the permanent magnet or permanent magnets contained therein, said north pole conduit shared with a north pole conduit of an adjacent permanent magnet or permanent magnets and said south pole conduit shared with a south pole conduit of an adjacent permanent magnet or permanent magnets;

b. Wherein:
1. A Pole Magnet Face is the surface area of a permanent magnet's or permanent magnets' north or south pole magnetic face, which contact the Pole Conduit Magnet Face;
2. A Pole Conduit Magnet Face is the surface area of a pole conduit, perpendicular to the carrier platter surface into which it is integrated, which comes into contact with the permanent magnet's or permanent magnets' north or south Pole Magnet Face;
3. The Pole Conduit Surface Area is the surface area of a pole conduit which is parallel to the carrier platter surface used to direct the magnetic field to either a work surface or to the adjacent corresponding Pole Conduit Surface Area within the core element in an adjacent parallel carrier platter;
4. The Work Surface Area is the surface area of a pole conduit which is used to direct the magnetic field of combined core elements of carrier platters to one or more work surfaces;
5. The Pole Surface Ratio of the Conduit is the ratio of the Pole Conduit Surface Area to the Pole Magnet Face;
6. Breakaway Performance is the force required to pull the apparatus off of the target or work surface in a direction perpendicular to the target surface or work surface; and
7. The Core Element Area is the combined surface area of the Pole Conduit Surface Area of both pole conduits of a core element together with the surface area of the permanent magnet or permanent magnets within a core element;

c. Choosing one or more permanent magnets with north and south Pole Magnet Faces which may be of different geometric shapes;

d. Encapsulating the north and south Pole Magnet Faces within the pole conduits such that no more than ¼ of the length between the north and south Pole's Magnet Faces is inset into the Pole Conduit Magnet Faces;

e. Constraining the Pole Conduit Magnet Face to a height that is equal to or more than the height of the north or south Pole Magnet Face of the permanent magnet or magnets;

f. Constraining the north and south Pole Conduit Magnet Face width to between about 25% and about 200% of the north and south Pole Conduit Magnet Face width;

g. Constraining the Pole Surface Ratio of the Conduit such that the Pole Conduit Surface Area is a multiple of between about 0.5 and 1.50 of the north and south Pole Magnets' Face;

h. Matching configured core elements by verifying that the magnetic field emanating from the Pole Conduit Surface Area that is directed to the work surface is acceptably deactivated or reduced to a desired level when aligned out-of-phase, that is when the Pole Conduit Surface Areas of two adjacent and corresponding core elements are in close proximity or contact with other such that the north Pole Conduit Surface Area of a first core element is positioned against a south Pole Conduit Surface Area of a second core element and the south Pole Conduit Surface Area of the first core element is positioned against the north pole Conduit Surface area of the second core element, and adjusting if necessary the core elements' magnetic field strength to further neutralize the magnetic field emanating from the Work Surface Area, by:
1. Modifying, if desired or required, a core element to have a different strength magnetic field than a corresponding adjacent core element, such that the residual magnetic field emanating from the work surface of the combined core elements has the minimal or desired residual magnetic field by using:
(a) A higher strength permanent magnet or magnets in a core element;
(b) A larger permanent magnet mass for one or more of the permanent magnets in a core element;
(c) A different geometric shape for one or more of the permanent magnets in a core element;
(d) A different geometric size, composition, or shape of pole conduit; or
(e) Using any combination of steps h.1.(a)-(d) above;

i. Determining the carrier platter configuration by:
1. Defining the number of core elements by:
(a) Using the desired height of the apparatus and the desired Work Surface Area so that the number of core elements is determined by dividing the Work Surface Area by the Core Element Area and rounding the result to the nearest even numbered integer value; or
(b) Determining whether the rotation of a rotatable carrier platter adjacent to another carrier platter has a practical limitation due to design, mounting, operational, manufacturing, or other constraints and, if so, identifying the maximum rotation angle as equal to or less than the Actuation Angle; and
(i) Setting the number of core elements to be integrated into a carrier platter by dividing 360° by the Actuation Angle;
2. Confirming Breakaway Performance will be at the desired level if required by determining the product of the maximum published or calculated value of the combined permanent magnet or permanent magnets within said core element, regardless of magnet orientation, and the number of core elements contained with the carrier platter;
3. Positioning the core elements equally and symmetrically into a carrier platter, said carrier platter and integrated core elements comprising a carrier platter assembly;
4. Identifying if required the desired weight of the carrier platter assembly by evaluating the desired surface area of the carrier platter assembly with respect to desired performance;
5. Identifying, if required, the desired composition of the carrier platter, selecting a non-ferrous carrier platter, a ferrous carrier platter, or a combination thereof, based upon without limitation the apparatus weight, desired Breakaway Performance, the composition of the product, if any, into which the apparatus is integrated, the target surface area, the footprint of the product, if any, into which the apparatus is integrated;
6. Identifying, if required, the desired cost of the carrier platter assembly considering without limitation:
   (a) Volume, that is the desired number of carrier platters to be made;
   (b) Ease of assembly of the carrier platter assembly;
   (c) Feasibility of integration of the apparatus into the desired end product, if any, or combining the core elements directly into the end product such that a carrier platter assembly becomes an integral part of the end product;
   (d) Environmental requirements, if any; and
   (e) Regulatory requirements, if any;
7. Determining whether a given carrier platter assembly is to be fixed within a housing or rotatable;
j. Identifying and implementing the desired actuation means, by incorporating attachment or other such features into the fixed or rotatable carrier platter assembly which allow for implementing the desired actuation means, that is, the means by which the apparatus will have a carrier platter assembly rotated relative to a stationary carrier platter assembly, by using mechanical, electro-mechanical, electrical and magneto-motive means, or any combination thereof;
k. Determining the need, if any, for positional decent means whereby said carrier platter assemblies that rotate may contain rotation limiting features that facilitate core element alignment, in-phase or out-of-phase of the north and south pole conduits contained within adjacent carrier platter assemblies;
l. Determining the need if any, for plating, coating or encapsulation means for improving performance by:
   1. Adding conductive coatings for the purpose of improving electrical connectivity by applying a conductive low resistance finish through plating and coating means;
   2. Adding friction altering coatings for the purpose of altering the friction and or Breakaway Performance of the apparatus with respect to the work surface, through the use of plating and coating means;
   3. Adding corrosion resistance plating and coatings to protect the apparatus and ensure its operation is suitable for the environment where the product is intended for use, through the use of plating and coating means;
   4. Adding insulative coating designed to electrically insulate the rotary switchable multi-core element permanent magnet-based apparatus exterior from the work surface or other electrical sources, through the use of plating and coating means;
   5. Adding encapsulation means to provide magnetic isolation of the apparatus' exterior from ferrous particles and other such debris as well as to provide corrosion resistance; or
   6. The combination of any of the means described in l 1-6 above;
m. Constraining or holding in a carrier platter the north and south pole conduits of the core elements in a carrier platter assembly so that they correspond or align with the north and south pole conduits of the core elements in an adjacent carrier platter assembly in order to redirect the contained magnetic fields from the permanent magnet's or permanent magnets' magnetic poles to an adjacent carrier platter assembly's corresponding core elements or the desired target;
n. Selecting, positioning, and aligning a plurality of carrier platter assemblies adjacent to one another in one or more geometric planes, such that the pole conduits of said carrier platters assemblies are:
   1. Aligned out-of-phase or the magnetic field emanating from the pole conduits adjacent to the target is deactivated, that is, all or substantially all of the magnetic fields emanating from the pole conduits in a carrier platter assembly are deactivated or reduced to a desired level, such that the south pole conduits (S) of the core elements in a carrier platter assembly are juxtaposed with the corresponding north pole conduits (N) of the core elements in the adjacent carrier platter assembly (S-N) and the north pole conduits (N) of the core elements in a carrier platter assembly are juxtaposed with the corresponding south pole conduits (S) of the core elements in the adjacent carrier platter assembly (N-S);
   2. Aligned in-phase or the magnetic field emanating from the pole conduits adjacent to the target is activated, that is, substantially all of the magnetic fields emanating from the pole conduits in a carrier platter assembly are activated or increased to a desired level such that the south pole conduits (S) of the core elements in a carrier platter assembly are juxtaposed with the corresponding south pole conduits (S) of the core elements in the adjacent carrier platter assembly (S-S) and the north pole conduits (N) of the core elements in a carrier platter assembly are juxtaposed with the corresponding north pole conduits (N) of the core elements in the adjacent carrier platter assembly (N-N); and
   3. Partially aligned out-of-phase or in-phase thereby partially deactivating or activating the magnetic field emanating from the pole conduits adjacent to the target, that is, the magnetic fields emanating from the pole conduits in a carrier platter assembly are adjusted to a desired level;
   4. Positioned adjacent to one another wherein each carrier platter assembly constrains or holds multiple core elements such that the north and south pole conduits of the core elements in a carrier platter assembly correspond to or align with the north and south pole conduits of the core elements in an adjacent carrier platter assembly in order to redirect the contained magnetic fields from the permanent magnet's or permanent magnets' magnetic poles to an adjacent carrier platter assembly's corresponding core elements or the desired target;

5. Constrained by constraining means to the adjacent carrier platter assembly so that one or more of the rotatable carrier platter assemblies may rotate concentrically by rotation means with respect to the adjacent carrier platter assembly;

6. Separated from an adjacent carrier platter assembly by friction reducing means for the purpose of reducing the friction between adjacent carrier platter assemblies and facilitating the rotation of a rotatable carrier platter assembly with respect to an adjacent carrier platter assembly;

7. Comprised of multiple core elements which correspond to an equal number of core elements in an adjacent carrier platter assembly; and 8. Sized such that the core elements are appropriately constrained within a carrier platter assembly's dimensions; and o. Determining the need, if any, to integrate or affix a plurality of carrier platter assemblies into a housing with a corresponding number of rotatable carrier platter assemblies in one or more geometric planes.

* * * * *